US012536905B2

(12) United States Patent
Mondello et al.

(10) Patent No.: US 12,536,905 B2
(45) Date of Patent: *Jan. 27, 2026

(54) VERIFYING IDENTITY OF AN EMERGENCY VEHICLE DURING OPERATION

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,333

(22) Filed: May 11, 2022

(65) Prior Publication Data

US 2022/0277650 A1 Sep. 1, 2022

Related U.S. Application Data

(63) Continuation of application No. 16/363,088, filed on Mar. 25, 2019, now Pat. No. 11,361,660.

(51) Int. Cl.
*G08G 1/0965* (2006.01)
*G08G 1/017* (2006.01)
(Continued)

(52) U.S. Cl.
CPC ........... *G08G 1/0965* (2013.01); *G08G 1/017* (2013.01); *G08G 1/096725* (2013.01);
(Continued)

(58) Field of Classification Search
CPC .... G08G 1/017; G08G 1/0962; G08G 1/0965; G08G 1/096725; G08G 1/096791;
(Continued)

(56) References Cited

U.S. PATENT DOCUMENTS 6,119,105 A 9/2000 Williams
6,911,898 B2 6/2005 Chung
(Continued)

FOREIGN PATENT DOCUMENTS

CN 101399663 4/2009
CN 105337725 A 2/2016
(Continued)

OTHER PUBLICATIONS

Buchenscheit, Andreas et al., "A VANET-based emergency vehicle warning system", 2009 IEEE Vehicular Networking Conference (VNC), Date of Conference: Oct. 28-30, 2009, Paper No. 28-4-1, 8 pages (Year: 2009).*

(Continued)

*Primary Examiner* — David A Testardi
(74) *Attorney, Agent, or Firm* — Greenberg Traurig

(57) ABSTRACT

A method includes: receiving, by a computing device of a first vehicle, a command from a host device; in response to receiving the command, storing a new device secret in memory; generating, by the computing device using the new device secret, a triple comprising an identifier, a certificate, and a public key; and sending, by the computing device, the triple to a second vehicle, where the second vehicle is configured to verify an identity of the first vehicle using the triple.

20 Claims, 24 Drawing Sheets

(51) Int. Cl.
*G08G 1/0967* (2006.01)
*H04L 9/32* (2006.01)
*H04W 4/40* (2018.01)
*H04W 12/069* (2021.01)
*H04W 12/71* (2021.01)

(52) U.S. Cl.
CPC ..... *G08G 1/096791* (2013.01); *H04L 9/3247* (2013.01); *H04L 9/3263* (2013.01); *H04W 4/40* (2018.02); *H04W 12/069* (2021.01); *H04W 12/71* (2021.01); *H04L 2209/84* (2013.01)

(58) Field of Classification Search
CPC ........... H04W 4/40; H04W 4/42; H04W 4/44; H04W 4/46; H04W 12/069; H04L 9/0866; H04L 9/3236; H04L 9/3247; H04L 9/3263; H04L 9/3268; H04L 63/0442; H04L 63/0823; H04L 2209/84
See application file for complete search history.

(56) References Cited

U.S. PATENT DOCUMENTS

| | | |
|---|---|---|
| 6,958,676 B1 | 10/2005 | Morgan et al. |
| 7,095,855 B1 | 8/2006 | Collins |
| 7,613,891 B2 | 11/2009 | Rudelic |
| 8,484,486 B2 | 7/2013 | Deierling et al. |
| 8,525,169 B1 | 9/2013 | Edelstein et al. |
| 8,869,448 B1 | 10/2014 | Lee |
| 8,886,943 B2* | 11/2014 | Kiessling ............... H04L 9/3236 713/168 |
| 9,467,293 B1 | 10/2016 | Brainard et al. |
| 9,555,771 B2 | 1/2017 | Oohara |
| 9,604,651 B1 | 3/2017 | Amireddy et al. |
| 9,613,201 B1 | 4/2017 | Dotan et al. |
| 9,806,883 B2 | 10/2017 | Falk |
| 9,830,637 B2 | 11/2017 | Betancourt et al. |
| 9,935,937 B1 | 4/2018 | Potlapally et al. |
| 9,996,997 B2 | 6/2018 | Lambert et al. |
| 10,009,325 B1* | 6/2018 | David ....................... H04L 9/16 |
| 10,311,731 B1 | 6/2019 | Li et al. |
| 10,326,797 B1 | 6/2019 | Murray et al. |
| 10,360,363 B1 | 7/2019 | Grosberg |
| 10,425,401 B1* | 9/2019 | Pecen .................. H04L 63/0815 |
| 10,484,351 B2 | 11/2019 | Romansky et al. |
| 10,762,183 B1 | 9/2020 | Charan et al. |
| 10,904,015 B2 | 1/2021 | Loreskar et al. |
| 11,024,104 B2 | 6/2021 | Gaddam et al. |
| 11,074,773 B1 | 7/2021 | Morris |
| 11,212,330 B2 | 12/2021 | Vanblon et al. |
| 11,218,330 B2 | 1/2022 | Mondello et al. |
| 11,233,650 B2* | 1/2022 | Mondello ............. H04L 9/0894 |
| 11,323,275 B2* | 5/2022 | Mondello ........... H04L 63/0442 |
| 11,361,660 B2* | 6/2022 | Mondello ............. H04L 9/3242 |
| 11,456,880 B2* | 9/2022 | Mondello ............ G05D 1/0022 |
| 11,962,701 B2 | 4/2024 | Mondello et al. |
| 2001/0037438 A1 | 11/2001 | Mathis |
| 2002/0038420 A1* | 3/2002 | Collins ................. H04L 9/3249 713/156 |
| 2002/0165912 A1* | 11/2002 | Wenocur ................. H04L 51/00 709/203 |
| 2002/0199001 A1* | 12/2002 | Wenocur ............... H04L 69/329 709/227 |
| 2003/0043021 A1 | 3/2003 | Chung |
| 2003/0109263 A1 | 6/2003 | Sziraki et al. |
| 2003/0147534 A1* | 8/2003 | Ablay .................. H04L 9/3271 713/170 |
| 2004/0003227 A1* | 1/2004 | Reinold ................... H04L 9/40 713/155 |
| 2004/0003229 A1* | 1/2004 | Reinold .................. H04L 67/12 713/155 |
| 2004/0003231 A1* | 1/2004 | Levenson ........... B60R 16/0234 713/155 |
| 2004/0003234 A1* | 1/2004 | Reinold .................. H04L 67/12 713/155 |
| 2004/0003249 A1* | 1/2004 | Dabbish ................ H04L 9/3247 713/170 |
| 2004/0061629 A1 | 4/2004 | Banerjee et al. |
| 2004/0172535 A1 | 9/2004 | Jakobsson et al. |
| 2004/0199785 A1 | 10/2004 | Pederson |
| 2005/0268099 A1 | 12/2005 | Cusey et al. |
| 2006/0221863 A1 | 10/2006 | Ishimoto et al. |
| 2007/0030122 A1 | 2/2007 | Rickrode |
| 2007/0106894 A1 | 5/2007 | Zhang et al. |
| 2007/0113077 A1 | 5/2007 | Brickell |
| 2007/0283151 A1 | 12/2007 | Nakano et al. |
| 2008/0027602 A1 | 1/2008 | Yeap et al. |
| 2008/0083039 A1 | 4/2008 | Choi et al. |
| 2008/0114984 A1 | 5/2008 | Srinivasan et al. |
| 2008/0232583 A1 | 9/2008 | Di Crescenzo et al. |
| 2009/0160604 A1 | 6/2009 | Nguyen |
| 2009/0179775 A1 | 7/2009 | Bos |
| 2009/0259841 A1* | 10/2009 | Laberteaux ......... H04L 63/0823 713/156 |
| 2009/0323967 A1 | 12/2009 | Peirce et al. |
| 2010/0031042 A1* | 2/2010 | Di Crescenzo ........... H04L 9/32 713/168 |
| 2010/0040234 A1* | 2/2010 | Alrabady ............ H04W 12/069 380/278 |
| 2010/0156630 A1 | 6/2010 | Ainsbury |
| 2010/0191973 A1 | 7/2010 | Huntzicker et al. |
| 2011/0083194 A1 | 4/2011 | Shen-orr et al. |
| 2011/0235806 A1 | 9/2011 | Fukuda |
| 2011/0238898 A1 | 9/2011 | Honda |
| 2011/0238986 A1 | 9/2011 | Kherani et al. |
| 2012/0036364 A1 | 2/2012 | Yoneda et al. |
| 2012/0038489 A1 | 2/2012 | Goldshmidt |
| 2012/0144206 A1 | 6/2012 | Ebihara |
| 2012/0155636 A1 | 6/2012 | Muthaiah |
| 2012/0159170 A1* | 6/2012 | Lee ..................... H04W 12/069 713/169 |
| 2012/0318624 A1 | 12/2012 | Dickson et al. |
| 2012/0324310 A1 | 12/2012 | Oshida et al. |
| 2013/0010954 A1 | 1/2013 | Falk et al. |
| 2013/0054946 A1 | 2/2013 | Thom et al. |
| 2013/0073865 A1 | 3/2013 | Kornafeld et al. |
| 2013/0129087 A1 | 5/2013 | Qi et al. |
| 2013/0142329 A1 | 6/2013 | Bell et al. |
| 2013/0191884 A1 | 7/2013 | Leicher et al. |
| 2013/0195266 A1 | 8/2013 | Fischer |
| 2013/0293349 A1 | 11/2013 | Templ et al. |
| 2014/0006777 A1 | 1/2014 | Amiri |
| 2014/0025951 A1 | 1/2014 | Ho et al. |
| 2014/0032933 A1 | 1/2014 | Smith et al. |
| 2014/0093074 A1 | 4/2014 | Gotze et al. |
| 2014/0108787 A1 | 4/2014 | Ando et al. |
| 2014/0164778 A1* | 6/2014 | Sherbakov ............ H04L 9/0894 713/175 |
| 2014/0185795 A1 | 7/2014 | Gotze et al. |
| 2014/0189890 A1 | 7/2014 | Koeberl et al. |
| 2014/0245010 A1 | 8/2014 | Nagai et al. |
| 2014/0258736 A1 | 9/2014 | Merchan et al. |
| 2014/0270383 A1 | 9/2014 | Pederson |
| 2014/0359288 A1 | 12/2014 | Jensen et al. |
| 2015/0050879 A1 | 2/2015 | MacDuff et al. |
| 2015/0052352 A1* | 2/2015 | Dolev .................. H04L 9/3278 713/156 |
| 2015/0092939 A1 | 4/2015 | Gotze et al. |
| 2015/0113266 A1 | 4/2015 | Wooten et al. |
| 2015/0113275 A1* | 4/2015 | Kim ..................... H04L 9/0877 713/169 |
| 2015/0207624 A1 | 7/2015 | Laver et al. |
| 2015/0242691 A1 | 8/2015 | Ottlik et al. |
| 2015/0256347 A1 | 9/2015 | Tseng et al. |
| 2015/0256522 A1 | 9/2015 | Jeffrey |
| 2015/0331463 A1 | 11/2015 | Obie et al. |
| 2015/0372811 A1 | 12/2015 | Le Saint et al. |
| 2016/0006570 A1 | 1/2016 | Falk et al. |
| 2016/0072808 A1 | 3/2016 | David et al. |
| 2016/0140785 A1 | 5/2016 | Lee et al. |
| 2016/0142383 A1 | 5/2016 | Asano |

(56) References Cited

U.S. PATENT DOCUMENTS

| | | | |
|---|---|---|---|
| 2016/0210858 A1* | 7/2016 | Foster | G08G 1/0965 |
| 2016/0255154 A1 | 9/2016 | Kim et al. | |
| 2016/0261555 A1* | 9/2016 | Niemasz | H04L 67/563 |
| 2016/0297401 A1 | 10/2016 | Haga et al. | |
| 2016/0315766 A1 | 10/2016 | Ujiie et al. | |
| 2017/0011571 A1 | 1/2017 | Boles et al. | |
| 2017/0041302 A1 | 2/2017 | Oxford et al. | |
| 2017/0046652 A1 | 2/2017 | Haldenby et al. | |
| 2017/0063842 A1 | 3/2017 | Ahn et al. | |
| 2017/0104580 A1 | 4/2017 | Wooten et al. | |
| 2017/0111175 A1 | 4/2017 | Oberhauser et al. | |
| 2017/0111178 A1 | 4/2017 | Winkelvos et al. | |
| 2017/0111332 A1 | 4/2017 | Tschache et al. | |
| 2017/0134176 A1 | 5/2017 | Kim et al. | |
| 2017/0141926 A1* | 5/2017 | Xu | H04L 63/0209 |
| 2017/0213456 A1 | 7/2017 | Finschi | |
| 2017/0236343 A1 | 8/2017 | Leboeuf et al. | |
| 2017/0310489 A1 | 10/2017 | Van Der Sluis et al. | |
| 2017/0324567 A1* | 11/2017 | Matsuo | H04L 9/3247 |
| 2018/0006829 A1* | 1/2018 | Kravitz | H04W 12/06 |
| 2018/0026949 A1 | 1/2018 | Kimn et al. | |
| 2018/0027600 A1 | 1/2018 | Lawlis et al. | |
| 2018/0060813 A1 | 3/2018 | Ford | |
| 2018/0063199 A1* | 3/2018 | Lara | H04L 63/1458 |
| 2018/0084412 A1 | 3/2018 | Alfred et al. | |
| 2018/0091498 A1 | 3/2018 | Kekicheff et al. | |
| 2018/0097637 A1 | 4/2018 | Weinfield | |
| 2018/0158329 A1 | 6/2018 | Benhammou et al. | |
| 2018/0205539 A1 | 7/2018 | Le Saint | |
| 2018/0205743 A1 | 7/2018 | Mciver et al. | |
| 2018/0241557 A1 | 8/2018 | Maes et al. | |
| 2018/0248690 A1 | 8/2018 | Fukuda et al. | |
| 2018/0248702 A1 | 8/2018 | Wu et al. | |
| 2018/0267904 A1 | 9/2018 | Kurian et al. | |
| 2018/0279105 A1* | 9/2018 | Huber | H04W 4/025 |
| 2018/0285602 A1 | 10/2018 | Mersh | |
| 2018/0287806 A1* | 10/2018 | Carboni | H04W 12/06 |
| 2018/0295147 A1 | 10/2018 | Haga et al. | |
| 2018/0295518 A1 | 10/2018 | Alloche et al. | |
| 2018/0302422 A1 | 10/2018 | Kishikawa et al. | |
| 2018/0307848 A1 | 10/2018 | Leiseboer et al. | |
| 2018/0307867 A1* | 10/2018 | Dover | G06F 21/78 |
| 2018/0342036 A1 | 11/2018 | Zachary | |
| 2018/0374347 A1* | 12/2018 | Silver | G06F 16/683 |
| 2019/0027044 A1 | 1/2019 | Laur et al. | |
| 2019/0044957 A1 | 2/2019 | David et al. | |
| 2019/0056925 A1 | 2/2019 | Komano et al. | |
| 2019/0080059 A1 | 3/2019 | Takumi et al. | |
| 2019/0089687 A1 | 3/2019 | Fiske | |
| 2019/0095598 A1 | 3/2019 | Kobayashi | |
| 2019/0108700 A1 | 4/2019 | Chelnik | |
| 2019/0135312 A1* | 5/2019 | Kaede | B61L 27/70 |
| 2019/0140850 A1* | 5/2019 | Ambrosin | H04L 9/0869 |
| 2019/0149324 A1* | 5/2019 | Kong | H04L 9/0819 713/171 |
| 2019/0156603 A1 | 5/2019 | Breer et al. | |
| 2019/0182267 A1 | 6/2019 | Aher et al. | |
| 2019/0205555 A1 | 7/2019 | Duffy et al. | |
| 2019/0213883 A1 | 7/2019 | Kim | |
| 2019/0236948 A1 | 8/2019 | Wang et al. | |
| 2019/0238343 A1* | 8/2019 | Racklyeft | H04L 9/3268 |
| 2019/0319790 A1 | 10/2019 | Fenner | |
| 2019/0392543 A1 | 12/2019 | Bautista et al. | |
| 2020/0005568 A1 | 1/2020 | Qiu et al. | |
| 2020/0053061 A1* | 2/2020 | Cambou | H04L 63/0457 |
| 2020/0053112 A1 | 2/2020 | Torisaki et al. | |
| 2020/0105140 A1 | 4/2020 | Wang et al. | |
| 2020/0118201 A1 | 4/2020 | Kaneichi et al. | |
| 2020/0145191 A1 | 5/2020 | Qi et al. | |
| 2020/0153636 A1 | 5/2020 | Takada et al. | |
| 2020/0177398 A1 | 6/2020 | Takemori et al. | |
| 2020/0205006 A1 | 6/2020 | Denis | |
| 2020/0235946 A1 | 7/2020 | Lee et al. | |
| 2020/0312136 A1 | 10/2020 | Mondello et al. | |
| 2020/0313890 A1 | 10/2020 | Mondello et al. | |
| 2020/0313907 A1 | 10/2020 | Mondello et al. | |
| 2020/0313908 A1 | 10/2020 | Mondello et al. | |
| 2020/0313909 A1 | 10/2020 | Mondello et al. | |
| 2020/0313911 A1 | 10/2020 | Mondello et al. | |
| 2020/0322135 A1 | 10/2020 | Kupwade Patil et al. | |
| 2020/0389453 A1 | 12/2020 | Kamir et al. | |
| 2021/0075800 A1 | 3/2021 | Paraskevas et al. | |
| 2021/0209881 A1 | 7/2021 | Lemberger et al. | |
| 2021/0250184 A1 | 8/2021 | Simplicio, Jr. et al. | |
| 2021/0281986 A1 | 9/2021 | Zhu et al. | |
| 2021/0328782 A1* | 10/2021 | David | H04W 12/0471 |
| 2021/0359845 A1 | 11/2021 | Troia et al. | |
| 2022/0078035 A1 | 3/2022 | Mondello et al. | |
| 2022/0116221 A1 | 4/2022 | Mondello et al. | |
| 2022/0224550 A1 | 7/2022 | Mondello et al. | |
| 2022/0237971 A1 | 7/2022 | Alhazmi | |

FOREIGN PATENT DOCUMENTS

| | | | | |
|---|---|---|---|---|
| CN | 106649632 | | 5/2017 | |
| CN | 108683491 | | 10/2018 | |
| CN | 109525396 | | 3/2019 | |
| EP | 2003813 | | 12/2008 | |
| EP | 2003813 | A1 * | 12/2008 | H04L 9/3236 |
| EP | 3417395 | | 12/2018 | |
| JP | 2008312213 | | 12/2008 | |
| JP | 2012181645 | | 9/2012 | |
| JP | 2014158105 | | 8/2014 | |
| JP | 2016076996 | | 5/2016 | |
| JP | 2017046080 | | 3/2017 | |
| JP | 2018037988 | | 3/2018 | |
| JP | 2018525891 | | 9/2018 | |
| KR | 20150007573 | A | 1/2015 | |
| KR | 20170065172 | | 6/2017 | |
| TW | M356972 | | 5/2009 | |
| TW | 201136266 | | 10/2011 | |
| WO | 2015001600 | | 1/2015 | |
| WO | 2017194335 | A2 | 11/2017 | |
| WO | 2018125989 | A2 | 7/2018 | |
| WO | 2019040651 | | 2/2019 | |
| WO | 2020074933 | | 4/2020 | |
| WO | 2020074934 | | 4/2020 | |

OTHER PUBLICATIONS

Dolev, Shlomi et al., "Optical PUF for Non-Forwardable Vehicle Authentication", Computer Communications 93 (2016), pp. 52 to 67 (Year: 2016).*

Aigner, Ronald, et al., "Device Identity with DICE and RIoT: Keys and Certificates." Microsoft Corporation, Sep. 2017.

Extended European Search Report, EP20777381.3, mailed on Nov. 21, 2022.

Extended European Search Report, EP20778971.0, mailed on Nov. 22, 2022.

Siddiqui, Ali Shuja, et al., "A Secure Communication Framework for ECUs." Advances in Science, Technology, and Engineering Systems Journal, Aug. 1, 2017.

Suh, G. Edward, et a., "Design and Implementation of the AEGIS Single-Chip Secure Processor Using Physical Random Functions." 2013 21st International Conference on Program Comprehension (ICPC), IEEE, May 1, 2005.

Dolev, Shlomi, et al., "Optical PUF for Non-Forwardable Vehicle Authentication." Elsevier Science Publishers BV, Jun. 1, 2016.

Extended European Search Report, EP20780010.3, mailed on Nov. 3, 2022.

Asselin-Miller, Nick, "Study on the Deployment of C-ITS in Europe: Final Report." Ricardo Energy & Environment: European Commission, Oct. 2016.

Extended European Search Report, EP20777658.4, mailed on Nov. 22, 2022.

GSMA, "Cellular Vehicle-to-Everything (C-V2X) enabling intelligent transport." GSMA, Dec. 28, 2017.

Mondello, Antonino, et al., "Using Cryptography Techniques as a Safety mechanism Applied to Components in Autonomous Driving." Springer International Publishing, Sep. 13, 2018.

(56) References Cited

OTHER PUBLICATIONS

Technical Specification, "Intelligent Transport Systems (ITS); V2X Applications; Part 1: Road Hazard Signalling (RHS) application requirements specification." European Telecommunications Standards Institute (ETSI), Apr. 11, 2013.
Technical Specification, "Intelligent Transport Systems (ITS); Security; ITS communications security architecture and security management." European Telecommunications Standards Institute (ETSI), Apr. 16, 2018.
Verification of Identity Using a Secret Key, U.S. Appl. No. 16/363,196, filed Mar. 25, 2019, Antonino Mondello et al., Patented Case, Aug. 3, 2021.
Verification of Identity Using a Secret Key, U.S. Appl. No. 17/710,591, filed Mar. 31, 2022, Antonino Mondello et al., Application Undergoing Preexam Processing, Mar. 31, 2022.
Generating an Identity for a Computing Device Using a Physical Unclonable Function, U.S. Appl. No. 16/363,204, filed Mar. 25, 2019, Antonino Mondello et al., Patented Case, May 27, 2021.
Generating an Identity for a Computing Device Using a Physical Unclonable Function, U.S. Appl. No. 17/529,587, filed Nov. 18, 2021, Antonino Mondello et al., Docketed New Case—Ready for Examination, Dec. 2, 2021.
Verifying Identity of a Vehicle Entering a Trust Zone, U.S. Appl. No. 16/363,211, filed Mar. 25, 2019, Antonino Mondello et al., Patented Case, Jul. 2, 2021.
Verifying Identity of a Vehicle Entering a Trust Zone, U.S. Appl. No. 17/558,371, filed Dec. 21, 2021, Antonino Mondello et al., Docketed New Case—Ready for Examination, Jan. 6, 2022.
Verifying Identity of an Emergency Vehicle During Operation, U.S. Appl. No. 16/363,088, filed Mar. 25, 2019, Antonino Mondello et al., Notice of Allowance Mailed—Application Received in Office of Publications, Aug. 19, 2021.
Atmel, "Application Note: AT02333 Safe and Secure Bootloader Implementation for SAM3/4," 42141A-SAM-06/2013, Atmel Corp., 2013.
Buchenscheit, Andreas, et al., "A VANET-based Emergency Vehicle Warning System," IEEE Vehicular Networking Conference (VNC), IEEE, Oct. 28-30, 2009.
Curry, Ian., "Version 3 X.509 certificates," Version 1, Entrust Technologies, 1997.
International Search Report and Written Opinion, PCT/US2020/020781, mailed Jun. 23, 2020.
International Search Report and Written Opinion, PCT/US2020/020909, mailed Jun. 29, 2020.
International Search Report and Written Opinion, PCT/US2020/020906, mailed Jun. 26, 2020.
International Search Report and Written Opinion, PCT/US2020/020907, mailed on Jun. 26, 2020.
Mundhenk, et al., "Security in Automotive Networks: Lightweight Authentication and Authorization." ACM Transactions on Design Automation of Electronic Systems, Mar. 2017.
Papadimitratos, Panagiotis, et al., "Secure Vehicular Communication Systems: Design and Architecture," IEEE Communications Magazine, IEEE, Nov. 2008.
Pappala, et al., "FPGA Based Device Specific Key Generation Method using Physically Uncloanble Functions and Neural Networks." IEEE, 2021.
Qian, Yi, et al., "A Secure VANET MAC Protocol for DSRC Applications," IEEE Globecom 2008—2008 IEEE Global Telecommunications Conference, IEEE, Nov. 30-Dec. 4, 2008.
Wallrabenstein, John Ross, "Practical and Secure IoT Device Authentication using Physical Unclonable Functions." IEEE, 2016.
Wikipedia, "X.509," retrieved from the Internet on Oct. 16, 2020: <https://en.wikipedia.org/w/index.php?title=X.509&oldid=885189092>, Feb. 26, 2019.
Buchenscheit, Andreas, et al., "A VANET-based EmergencyVehicleWarningSystem." 2009 IEEE Vhicular Networking Conference (VNC), 2009.
Dolev, Shlomi, et al., "Optical PUF for Non-Forwardable Vehicle Authentication." Elsevier, 2016.

\* cited by examiner

VERIFYING IDENTITY OF AN EMERGENCY VEHICLE DURING OPERATION

RELATED APPLICATIONS

The present application is a continuation application of U.S. patent application Ser. No. 16/363,088 filed Mar. 25, 2019 and issued as U.S. Pat. No. 11,361,660 on May 25, 2022, the entire disclosures of which application are hereby incorporated herein by reference.

This application is related to U.S. patent application Ser. No. 15/970,660, filed May 3, 2018, issued as U.S. Pat. No. 10,742,406 on Aug. 11, 2020, and entitled "KEY GENERATION AND SECURE STORAGE IN A NOISY ENVIRONMENT," by Pisasale et al., the entire contents of which application is incorporated by reference as if fully set forth herein.

This application is related to U.S. patent application Ser. No. 15/853,498, filed Dec. 22, 2017, issued as U.S. Pat. No. 10,715,321 on Jul. 14, 2020, and entitled "PHYSICAL UNCLONABLE FUNCTION USING MESSAGE AUTHENTICATION CODE," by Mondello et al., the entire contents of which application is incorporated by reference as if fully set forth herein.

This application is related to U.S. patent application Ser. No. 15/965,731, filed 27 Apr. 2018, issued as U.S. Pat. No. 10,778,661 on Sep. 15, 2020, and entitled "SECURE DISTRIBUTION OF SECRET KEY USING A MONOTONIC COUNTER," by Mondello et al., the entire contents of which application is incorporated by reference as if fully set forth herein.

TECHNICAL FIELD

At least some embodiments disclosed herein relate to identity for computing devices in general and more particularly, but not limited to verifying an identity for a vehicle during operation.

BACKGROUND

A physical unclonable function (PUF) provides, for example, a digital value that can serve as a unique identity for a semiconductor device, such as a microprocessor. PUFs are based, for example, on physical variations which occur naturally during semiconductor manufacturing, and which permit differentiating between otherwise identical semiconductor chips.

PUFs are typically used in cryptography. A PUF can be, for example, a physical entity that is embodied in a physical structure. PUFs are often implemented in integrated circuits, and are typically used in applications with high security requirements. For example, PUFs can be used as a unique and untamperable device identifier. PUFs can also be used for secure key generation, and as a source of randomness.

In one example related to device identification, the Microsoft™ Azure™ IoT platform is a set of cloud services provided by Microsoft. The Azure™ IoT platform supports Device Identity Composition Engine (DICE) and many different kinds of Hardware Security Modules (HSMs). DICE is an upcoming standard at Trusted Computing Group (TCG) for device identification and attestation which enables manufacturers to use silicon gates to create device identification based in hardware. HSMs are used to secure device identities and provide advanced functionality such as hardware-based device attestation and zero touch provisioning.

DICE offers a scalable security framework that uses an HSM footprint to anchor trust for use in building security solutions like authentication, secure boot, and remote attestation. DICE is useful for the current environment of constraint computing that characterizes IoT devices, and provides an alternative to more traditional security framework standards like the Trusted Computing Group's (TCG) and Trusted Platform Module (TPM). The Azure™ IoT platform has HSM support for DICE in HSMs from some silicon vendors.

In one example related to trust services, the Robust Internet-of-Things (RIoT) is an architecture for providing trust services to computing devices. The trust services include device identity, attestation, and data integrity. The RIoT architecture can be used to remotely re-establish trust in devices that have been compromised by malware. Also, RIoT services can be provided at low cost on even very small devices.

Improving security techniques have created a need for more frequent software updates to products in the field. However, these updates must be administered and verified without human involvement. RIoT can be used to address these technical problems.

RIoT provides a foundation for cryptographic operations and key management for many security scenarios. Authentication, integrity verification, and data protection require cryptographic keys to encrypt and decrypt, as well as mechanisms to hash and sign data. Most internet-connected devices also use cryptography to secure communication with other devices.

The cryptographic services provided by RIoT include device identity, data protection, and attestation. Regarding device identity, devices typically authenticate themselves by proving possession of a cryptographic key. If the key associated with a device is extracted and cloned, then the device can be impersonated.

Regarding data protection, devices typically use cryptography to encrypt and integrity protect locally stored data. If the cryptographic keys are only accessible to authorized code, then unauthorized software is not be able to decrypt or modify the data.

Regarding attestation, devices sometimes need to report code they are running and their security configuration. For example, attestation is used to prove that a device is running up-to-date code.

If keys are managed in software alone, then bugs in software components can result in key compromise. For software-only systems, the primary way to restore trust following a key compromise is to install updated software and provision new keys for the device. This is time consuming for server and mobile devices, and not possible when devices are physically inaccessible.

Some approaches to secure remote re-provisioning use hardware-based security. Software-level attacks can allow hackers to use hardware-protected keys but not extract them, so hardware-protected keys are a useful building block for secure re-provisioning of compromised systems. The Trusted Platform Module, or TPM, is an example of security module that provides hardware protection for keys, and also allows the device to report (attest to) the software it is running. Thus, a compromised TPM-equipped device can be securely issued new keys, and can provide attestation reports.

TPMs are widely available on computing platforms (e.g., using SoC-integrated and processor-mode-isolated firmware TPMs). However, TPMs are often impractical. For example, a small IoT device is not be able to support a TPM without substantial increase in cost and power needs.

RIoT can be used to provide device security for small computing devices, but it can also be applied to any processor or computer system. If software components outside of the RIoT core are compromised, then RIoT provides for secure patching and re-provisioning. RIoT also uses a different approach to cryptographic key protection. The most-protected cryptographic keys used by the RIoT framework are only available briefly during boot.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
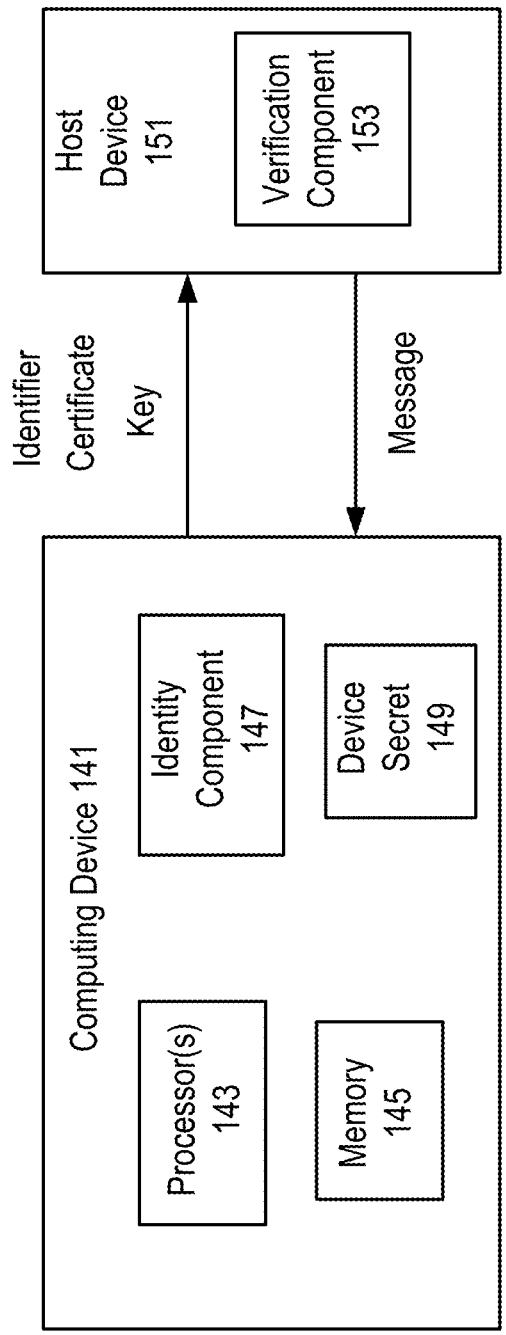
FIG. 1 shows a host device that verifies the identity of a computing device, according to one embodiment.

At least some embodiments herein relate to verification of identity for one or more computing devices. In various embodiments, a host device verifies the identity of a computing device by sending a message to the computing device. The computing device uses the message to generate an identifier, a certificate, and a key, which are sent to the host device. The host device uses the generated identifier, certificate, and key to verify the identity of the computing device.

Other embodiments relate to generating an identity for a computing device using a physical unclonable function (PUF). In various embodiments described below, prior to the host device verifying the identity as described above, the computing device above can generate its self-identity using at least one PUF. Various embodiments regarding generating an identity using one or more PUFs are described in the section below titled "Generating an Identity for a Computing Device Using a PUF".

Yet other embodiments relate to assigning an identity to a first vehicle, and using a second vehicle to verify the identity of the first vehicle. In one embodiment, the first vehicle is an emergency vehicle. In other embodiments, the first vehicle can be a vehicle associated with a state of operation and/or a class of vehicles. Various embodiments regarding assigning and verifying the identity of a vehicle (e.g., an emergency vehicle) are described in the section below titled "Assigning and Verifying Identity for a Vehicle".

In some examples related to verification of identity, the computing device can be a flash memory device. In some examples, flash memory is leveraged to add a strong level of security capability in a computing system (e.g., an application controller of an autonomous vehicle).

Flash memory is used in numerous computer systems. Various types of flash memory exist today, including serial NOR, parallel NOR, serial NAND, parallel NAND, eMMC, UFS, etc. These sockets are used in most embedded systems across various industries and applications.

For example, serial NOR is used in a wide array of applications like medical devices, factory automation boards, automotive ECUs, smart meters, and internet gateways. Given diversity of chipset architectures (processors, controllers or SoCs), operating systems, and supply chains used across these applications, flash memory is a common denominator building block in these systems.

Computer system resilience today is typically characterized by the location of roots of trust integrated into devices and leveraged by the solution for the security functions they provide. For more information on roots of trust, see the definition created by the National Institute of Technology (NIST) in Special Publication 800-164. Existing industry uses varied implementations of roots of trust at the system level, using a mix of hardware and software capabilities, resulting in the technical problems of fragmentation of approaches and confusing level of security. This perplexing array of options also suffers from the key limitation of how to defend the non-volatile memory where critical code and data is stored.

Existing approaches rely on the processor and other secure elements like hardware security modules (HSMs) to offer critical security services to their systems. This has created a security gap at the lowest levels of boot in many systems where discrete flash memory components store system-critical code and data. The flash has become the target for many hackers to create Advanced Persistent Threats (APT's) that can mask themselves from higher levels of code and resist removal. In many of these cases, flash memory is re-imaged or rewritten with new malicious code, which undermines the integrity of that device.

Various embodiments of the present disclosure related to verification of identity provide a technological solution to the above technical problems. In some embodiments, a computing device integrates hardware-based roots of trust into a flash memory device, enabling strong cryptographic identity and health management for IoT devices. By moving essential security primitives in-memory, it becomes simpler to protect the integrity of code and data housed within the memory itself. This approach can significantly enhance system level security while minimizing the complexity and cost of implementations.

In one embodiment, a new IoT device management capability leverages flash memory by enabling device onboarding and management by the Microsoft™ Azure™ IoT cloud using flash memory and associated software. In one example, the solutions provide a cryptographic identity that becomes the basis for critical device provisioning services (e.g., the Azure IoT Hub Device Provisioning Service (DPS)). In one example, this DPS along with the enabled memory can enable zero-touch provisioning of devices to the correct IoT hub as well as other services.

In some embodiments, to implement the above capability, the Device Identity Composition Engine (DICE) is used (DICE is an upcoming standard from the Trusted Computing Group (TCG)). In one example, the enabled memory permits only trusted hardware to gain access to the Microsoft Azure IoT cloud. In one example, the health and identity of an IoT device is verified in memory where critical code is typically stored. The unique identity of each IoT device can now offer end-to-end device integrity at a new level, starting at the boot process. This can enable additional functionality like hardware-based device attestation and provisioning as well as administrative remediation of the device if necessary.

In one embodiment, a method includes: receiving, by a computing device (e.g., a serial NOR flash memory device), a message from a host device (e.g., a CPU, GPU, FPGA, or an application controller of a vehicle); generating, by the computing device, an identifier (e.g., a public identifier $ID_{L1}$ public), a certificate (e.g., $ID_{L1}$ certificate), and a key (e.g., $K_{L1}$ public), wherein the identifier is associated with an identity of the computing device, and the certificate is generated using the message; and sending, by the computing device, the identifier, the certificate, and the key to the host device, wherein the host device is configured to verify the identity of the computing device using the identifier, the certificate, and the key.

In some embodiments, the computing device above (e.g., a flash memory device) integrates DICE-RIoT functionality, which is used to generate the identifier, certificate, and key described above and used by the host device to verify the identity of the computing device. In one example, the computing device stores a device secret that acts a primitive key on which the sequence of identification steps between layers of the DICE-RIoT protocol is based. In one example, layers $L_0$ and $L_1$ of the DICE-RIoT functionality are implemented in the computing device using hardware and/or software. In one example, layer $L_0$ is implemented solely in hardware.

FIG. 1 shows a host device 151 that verifies the identity of a computing device 141, according to one embodiment. Host device 151 sends a message to the computing device 141. In one embodiment, host device 151 includes a freshness mechanism (not shown) that generates a freshness for use in sending messages to the computing device 141 to avoid replay attacks. In one example, each message sent to the computing device 141 includes a freshness generated by a monotonic counter.

In one example, the message is an empty string, a conventional known string (e.g., alphanumeric string known to the manufacturer or operator of host device 151), or can be another value (e.g., an identity value assigned to the computing device). In one example, the message is a unique identity of the device (UID).

In response to receiving the message, computing device 141 generates an identifier, a certificate, and a key. The identifier is associated with an identity of the computing device 141. Computing device 141 includes one or more processors 143 that control the operation of identity component 147 and/or other functions of computing device 141.

The identifier, the certificate, and the key are generated by identity component 147 and are based on device secret 149. In one example, device secret 149 is a unique device secret (UDS) stored in memory of computing device 141. In one example, identity component 147 uses the UDS as a primitive key for implementation of the DICE-RIoT protocol. The identifier, certificate, and key are outputs from layer $L_1$ of the DICE-RIoT protocol (see, e.g., FIG. 6). In one embodiment, the identity of layer $L_1$ corresponds to the identity of computing device 141 itself, the manufacturer of computing device 141, the manufacturer of a thing that includes computing device 141 as component, and/or an application or other software stored in memory of computing device 141. In one example, the application identity (e.g., an ID number) is for a mobile phone, a TV, an STB, etc., for which a unique combination of characters and numbers is used to identify the thing.

In one example, the identity of layer $L_1$ is an ASCII string. For example, the identity can be a manufacturer name concatenated with a thing name (e.g., LG| TV_model_123_year_2018, etc.). In one example, the identity can be represented in hexadecimal form (e.g., 53 61 6D 73 75 6E 67 20 7C 20 54 56 5F 6D 6F 64 65 6C 5F 31 32 33 5F 79 65 61 72 5F 32 30 31 38).

In one embodiment, a manufacturer can use a UDS for a class or set of items that are being produced. In other embodiments, each item can have its own unique UDS. For example, the UDS for a TV can be UDS=0x12234 . . . 4444, and the UDS for a laptop can be UDS=0xaabb . . . 00322.

In one embodiment, the device secret 149 is a secret key stored by computing device 141 in memory 145. Identity component 147 uses the secret key as an input to a message authentication code (MAC) to generate a derived secret. In one example, the derived secret is fused derived secret (FDS) in the DICE-RIoT protocol.

In one example, memory 145 includes read-only memory (ROM) that stores initial boot code for booting computing device 141. The FDS is a key provided to the initial boot code by processor 143 during a booting operation. In one example, the ROM corresponds to layer $L_0$ of the DICE-RIoT protocol.

Host device 151 uses the identifier, certificate, and key as inputs to a verification component 153, which verifies the identity of the computing device 141. In one embodiment, verification component 153 performs at least one decryption operation using the identifier to provide a result. The result is compared to the key to determine whether the identity of the computer device 141 is valid. If so, host device 151 performs further communications with computing device 141 using the key received from computing device 141. For example, once host device 151 verifies the "triple" (the identifier, certificate, and key), the key can be used to attest any other information exchanged between computing device 141 and host device 151.

In one embodiment, a digital identification is assigned to numerous "things" (e.g., as per the Internet of Things). In one example, the thing is a physical object such as a vehicle or a physical item present inside the vehicle. In one example the thing is a person or animal. For example, each person or animal can be assigned a unique digital identifier.

In some cases, manufacturers of products desire that each product can be proved as being genuine. Presently, this problem is solved by buying things only from a trusted seller, or buying things from others with some kind of legal certificate that ensures the thing purchased is genuine. However, in the case of theft of a thing, if the thing does not have an electronic identity, it is difficult to block or localize the thing so that the thing is not used improperly. In one example, localization is based on identity when the thing tries to interact with public infrastructures. In one example, blocking is based on the inability to prove the identity of a thing that wants to use a public infrastructure.

In one embodiment, computing device 141 implements the DICE-RIoT protocol using identity component 147 in order to associate unique signatures to a chain of trust corresponding to computing device 141. Computing device 141 establishes layers $L_0$ and $L_1$. The chain of trust is continued by host device 151 which establishes layers $L_2, \ldots$. In one example, a unique identifier can be assigned to every object, person, and animal in any defined environment (e.g., a trust zone defined by geographic parameters).

In one embodiment, computing device 141 is a component in the thing that is desired to be assigned an identity. For example, the thing can be an autonomous vehicle including computing device 141. For example, computing device 141 can be flash memory that is used by an application controller of the vehicle.

When the computing device 141 is manufactured, the manufacturer can inject a UDS into memory 145. In one example, the UDS can be agreed to and shared with a customer that will perform additional manufacturing operations using computing device 141. In another example, the UDS can be generated randomly by the original manufacturer and then communicated to the customer using a secure infrastructure (e.g., over a network such as the internet).

In one example, the customer can be a manufacturer of a vehicle that incorporates computing device 141. In many cases, the vehicle manufacturer desires to change the UDS so that it is unknown to the seller of computing device 141. In such cases, the customer can replace the UDS using an authenticated replace command that is provided by host device 151 to computing device 141.

In some embodiments, the customer can inject customer immutable information into memory 145 of computing device 141. In one example, the immutable info is used to generate a unique FDS, and is not solely used as a differentiator. The customer immutable information is used to differentiate various objects that are manufactured by the customer. For example, customer immutable information can be a combination of letters and/or numbers to define primitive information (e.g., a combination of some or all of the following information: date, time, lot position, wafer position, x, y location in a wafer, etc.).

For example, in many cases, the immutable information also includes data from cryptographic feature configuration performed by a user (e.g., a customer who receives a device from a manufacturer). This configuration or setting can be done only by using authenticated commands (commands that need the knowledge of a key to be executed). The user has knowledge of the key (e.g., based on being provided the key over a secure infrastructure from the manufacturer). The immutable information represents a form of cryptographic identity of a computing device, which is different from the unique ID (UID) of the device. In one example, the inclusion of the cryptographic configuration in the immutable set of information provides the user with a tool useful to self-customize the immutable information.

In one embodiment, computing device 141 includes a freshness mechanism that generates a freshness. The freshness can be provided with the identifier, certificate, and key when sent to host device 151. The freshness can also be used with other communications with host device 151.

In one embodiment, computing device 141 is a component on an application board. Another component (not shown) on the application board can verify the identity of computing device 141 using knowledge of device secret 149 (e.g., knowledge of an injected UDS). The component requests that computing device 141 generate an output using a message authentication code in order to prove possession of the UDS. For example, the message authentication code can be as follows: HMAC (UDS, "application board message|freshness")

In another embodiment, the FDS can also be used as criteria to prove the possession of the device (e.g., the knowledge of the secret key(s)). The FDS is derived from the UDS in this way: FDS=HMAC-SHA256 [UDS, SHA256("Identity of $L_1$")] So, the message authentication code can be as follows: HMAC (FDS, "application board message|freshness")

Figure 2:
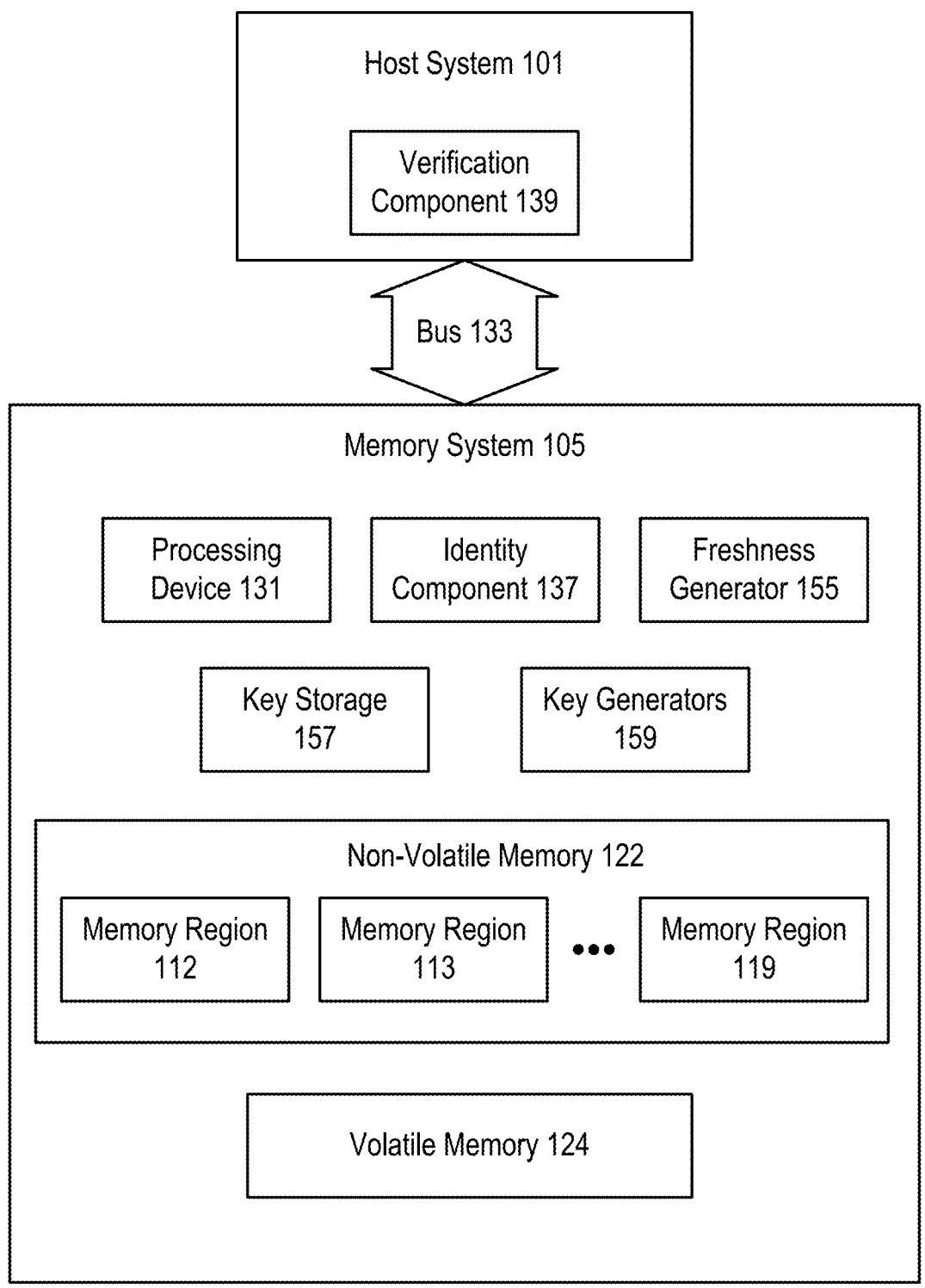
FIG. 2 shows an example computing system having an identity component and a verification component, according to one embodiment.

FIG. 2 shows an example computing system having an identity component 137 and a verification component 139, according to one embodiment. A host system 101 communicates over a bus 133 with a memory system 105. A processing device 131 of memory system 105 has read/write access to memory regions 112, 113, ..., 119 of non-volatile memory 122. In one example, host system 101 also reads data from and writes data to volatile memory 124. In one example, identity component 137 supports layers $L_0$ and $L_1$ of the DICE-RIoT protocol. In one example, non-volatile memory 122 stores boot code.

Verification component 139 is used to verify an identity of memory system 105. Verification component 139 uses a triple including an identifier, certificate, and key generated by identity component 137 in response to receiving a host message from host system 101, for example as described above.

Identity component 137 is an example of identity component 147 of FIG. 1. Verification component 139 is an example of verification component 153 of FIG. 1.

Memory system 105 includes key storage 157 and key generators 159. In one example, key storage 157 can store root keys, session keys, a UDS (DICE-RIoT), and/or other keys used for cryptographic operations by memory system 105.

In one example, key generators 159 generate a public key sent to host system 101 for use in verification by verification component 139. The public key is sent as part of a triple that also includes an identifier and certificate, as described above.

Memory system 105 includes a freshness generator 155. In one example, freshness generator 155 can be used for authenticated commands. In one example, multiple freshness generators 155 can be used. In one example, freshness generator 155 is available for use by host system 101.

In one example, the processing device 131 and the memory regions 112, 113, ..., 119 are on the same chip or die. In some embodiments, the memory regions store data used by the host system 101 and/or the processing device 131 during machine learning processing or other run-time data generated by software process(es) executing on host system 101 or on processing device 131.

The computing system can include a write component in the memory system 105 that selects a memory region 112 (e.g., a recording segment of flash memory) for recording new data from host system 101. The computing system 100 can further include a write component in the host system 101 that coordinates with the write component 137 in the memory system 105 to at least facilitate selection of the memory region 112.

In one example, volatile memory 124 is used as system memory for a processing device (not shown) of host system 101. In one embodiment, a process of host system 101 selects memory regions for writing data. In one example, the host system 101 can select a memory region based in part on data from sensors and/or software processes executing on an autonomous vehicle. In one example, the foregoing data is provided by the host system 101 to processing device 131, which selects the memory region.

In some embodiments, host system 101 or processing device 131 includes at least a portion of the identity component 137 and/or verification component 139. In other embodiments, or in combination, the processing device 131 and/or a processing device in the host system 101 includes at least a portion of the identity component 137 and/or verification component 139. For example, processing device 131 and/or a processing device of the host system 101 can include logic circuitry implementing the identity component 137 and/or verification component 139. For example, a controller or processing device (e.g., a CPU, FPGA, or GPU) of the host system 101, can be configured to execute instructions stored in memory for performing the operations of the identity component 137 and/or verification component 139 described herein.

In some embodiments, the identity component 137 is implemented in an integrated circuit chip disposed in the memory system 105. In other embodiments, the verification component 139 in the host system 101 is part of an operating system of the host system 101, a device driver, or an application.

An example of memory system 105 is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. In some embodiments, the memory system can be a hybrid memory/storage system that provides both memory functions and storage functions. In general, a host system can utilize a memory system that includes one or more memory regions. The host system can provide data to be stored at the memory system and can request data to be retrieved from the memory system. In one example, a host can access various types of memory, including volatile and non-volatile memory.

The host system 101 can be a computing device such as a controller in a vehicle, a network server, a mobile device, a cellular telephone, an embedded system (e.g., an embedded system having a system-on-chip (SOC) and internal or external memory), or any computing device that includes a memory and a processing device. The host system 101 can include or be coupled to the memory system 105 so that the host system 101 can read data from or write data to the memory system 105. The host system 101 can be coupled to the memory system 105 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 101 and the memory system 105. The physical host interface can provide an interface for passing control, address, data, and other signals between the memory system 105 and the host system 101.

FIG. 2 illustrates a memory system 105 as an example. In general, the host system 101 can access multiple memory systems via a same communication connection, multiple separate communication connections, and/or a combination of communication connections.

The host system 101 can include a processing device and a controller. The processing device of the host system 101 can be, for example, a microprocessor, a central processing unit (CPU), a processing core of a processor, an execution unit, etc. In some instances, the controller of the host system can be referred to as a memory controller, a memory management unit, and/or an initiator. In one example, the controller controls the communications over bus 133 between the host system 101 and the memory system 105. These communications include sending of a host message for verifying identity of memory system 105 as described above.

A controller of the host system 101 can communicate with a controller of the memory system 105 to perform operations such as reading data, writing data, or erasing data at the memory regions of non-volatile memory 122. In some instances, the controller is integrated within the same package of the processing device 131. In other instances, the controller is separate from the package of the processing device 131. The controller and/or the processing device can include hardware such as one or more integrated circuits and/or discrete components, a buffer memory, a cache memory, or a combination thereof. The controller and/or the processing device can be a microcontroller, special purpose logic circuitry (e.g., a field programmable gate array (FPGA), an application specific integrated circuit (ASIC), etc.), or another suitable processor.

In one embodiment, the memory regions 112, 113, . . . , 119 can include any combination of different types of non-volatile memory components. Furthermore, the memory cells of the memory regions can be grouped as memory pages or data blocks that can refer to a unit used to store data. In some embodiments, the volatile memory 124 can be, but are not limited to, random access memory (RAM), dynamic random access memory (DRAM), and synchronous dynamic random access memory (SDRAM).

In one embodiment, one or more controllers of the memory system 105 can communicate with the memory regions 112, 113, . . . , 119 to perform operations such as reading data, writing data, or erasing data. Each controller can include hardware such as one or more integrated circuits and/or discrete components, a buffer memory, or a combination thereof. Each controller can be a microcontroller, special purpose logic circuitry (e.g., a field programmable gate array (FPGA), an application specific integrated circuit (ASIC), etc.), or another suitable processor. The controller(s) can include a processing device (processor) configured to execute instructions stored in local memory. In one example, local memory of the controller includes an embedded memory configured to store instructions for performing various processes, operations, logic flows, and routines that control operation of the memory system 105, including handling communications between the memory system 105 and the host system 101. In some embodiments, the local memory can include memory registers storing memory pointers, fetched data, etc. The local memory can also include read-only memory (ROM) for storing microcode.

In general, controller(s) of memory system 105 can receive commands or operations from the host system 101 and/or processing device 131 and can convert the commands or operations into instructions or appropriate commands to achieve selection of a memory region based on data write counters for the memory regions. The controller can also be responsible for other operations such as wear-leveling, garbage collection operations, error detection and error-correcting code (ECC) operations, encryption operations, caching operations, and address translations between a logical block address and a physical block address that are associated with the memory regions. The controller can further include host interface circuitry to communicate with the host system 101 via the physical host interface. The host interface circuitry can convert the commands received from the host system into command instructions to access one or more of the memory regions as well as convert responses associated with the memory regions into information for the host system 101.

The memory system 105 can also include additional circuitry or components that are not illustrated. In some embodiments, the memory system 105 can include a cache or buffer (e.g., DRAM or SRAM) and address circuitry (e.g., a row decoder and a column decoder) that can receive an address from one or more controllers and decode the address to access the memory regions.

In some embodiments, a controller in the host system 101 or memory system 105, and/or the processing device 131 includes at least a portion of the identity component 137 and/or verification component 139. For example, the controller and/or the processing device 131 can include logic circuitry implementing the identity component 137 and/or verification component 139. For example, a processing device (processor) can be configured to execute instructions stored in memory for performing operations that provide read/write access to memory regions for the identity component 137 as described herein. In some embodiments, the verification component 139 is part of an operating system, a device driver, or an application.

Figure 3:
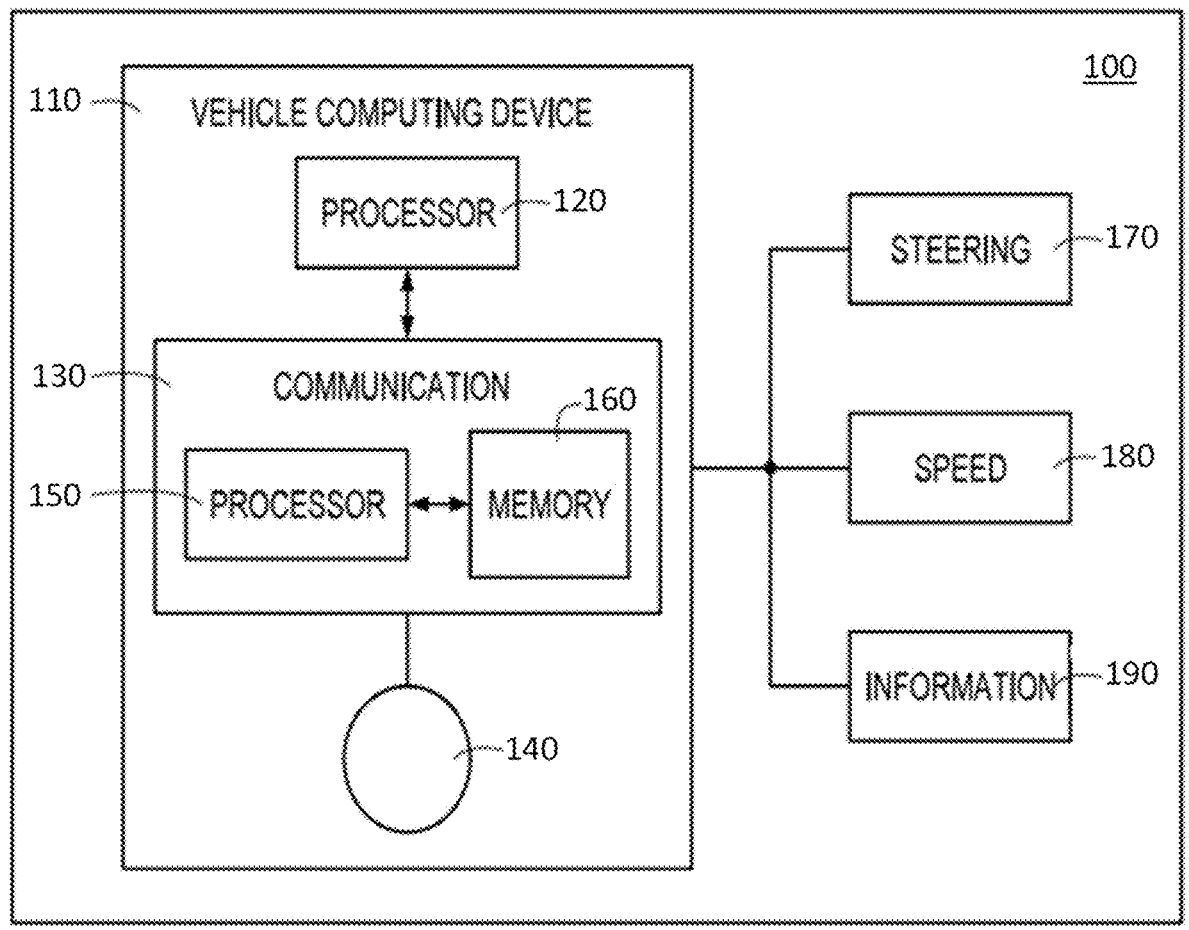
FIG. 3 shows an example computing device of a vehicle, according to one embodiment.

FIG. 3 shows an example computing device of a vehicle 100, according to one embodiment. For example, the vehicle 100 can be an autonomous vehicle, a non-autonomous vehicle, an emergency vehicle, a service vehicle, or the like.

The vehicle 100 includes a vehicle computing device 110, such as an on↑board computer. Vehicle computing device 110 is an example of host device 151 of FIG. 1. In another example vehicle computing device 110 is an example of host system 101 of FIG. 2, and memory 160 is an example of memory system 105.

The vehicle computing device 110 includes a processor 120 coupled to a vehicular communication component 130, such as a reader, writer, and/or other computing device capable of performing the functions described below, that is coupled to (or includes) an antenna 140. The vehicular communication component 130 includes a processor 150 coupled to a memory 160, such as a non-volatile flash memory, although embodiments are not so limited to such a kind of memory devices.

In one example, the memory 160 is adapted to store all the information related to the vehicle (e.g., driver, passengers, and carried goods) in such a way that the vehicle 100 is able to provide this information when approaching a check point by using a communication interface (for example the so-called DICE-RIoT protocol), as described below.

In one example, the vehicle information (such as vehicle ID/plate number) is already stored in the vehicle memory 160, and the vehicle 100 is able to identify, for example through the communication component 130 and by using a known DICE-RIoT protocol or a similar protocol, the electronic ID of the passengers and/or the IDs of the carried luggage, goods and the like, and then to store this information in the memory 160. In one example, electronic IDs, transported luggage and goods containers are equipped with wireless transponders, NFC, Bluetooth, RFID, touchless sensors, magnetic bars, and the like, and the communication component 130 can use readers and/or electromagnetic field to acquire the needed info from such remote sources.

In one example, all the passenger IDs and/or the IDs of the carried luggage, goods and the like are equipped with electronic devices capable to exchange data with a communication component. Those electronic devices may be active or passive elements in the sense that they may be active because supplied by electric power or may be activated and powered by an external electric supply source that provided the required electric supply just when the electric device is in its proximity.

Rental vehicles or autonomous vehicles can use readers and/or electromagnetic field to acquire information inside or in the proximity of the vehicle or, as an alternative, may receive information even from remote sources, for instance when the driver of a rental vehicle is already known to the rental system because of a previous reservation. A further check may be performed in real time when the driver arrives to pick up the vehicle.

Similarly, all the information about the transported luggage and goods (and also about the passengers) carried by the vehicle 100 may be maintained to be always up-to-date. To do so, the electronic ID of the passengers and/or the IDs of the carried luggage and goods are up-dated in real-time due to the wireless transponders associated to the luggage and good or owned by the passengers (not shown).

In one example, the communication between the vehicular communication component 130 and the proximity sources (e.g., the goods transponders and the like), occurs via the DICE-RIoT protocol.

In one example, the vehicle computing device 110 can control operational parameters of the vehicle 100, such as steering and speed. For example, a controller (not shown) can be coupled to a steering control system 170 and a speed control system 180. Further, the vehicle computing device 110 can be coupled to an information system 190. Information system 190 can be configured to display a message, such as the route information or a check point security message and can display visual warnings and/or output audible warnings. The communication component 130 can receive information from additional computing devices, such as from an external computing device (not shown).

Figure 4:
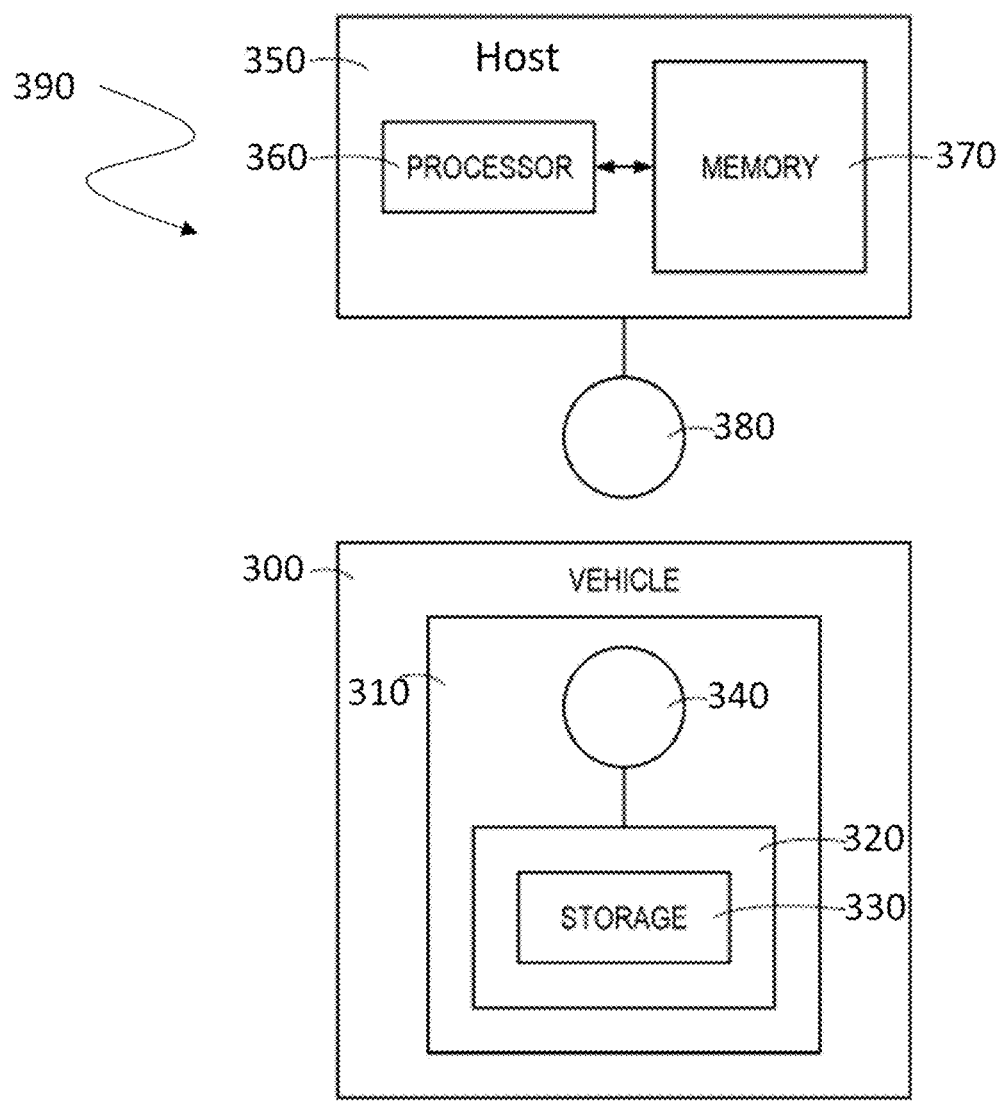
FIG. 4 shows an example host device communicating with an example computing device of a vehicle, according to one embodiment.

FIG. 4 shows an example system 390 having a host device 350 communicating with an example computing device of a vehicle 300, according to one embodiment. The computing device includes a passive communication component 310, such as a short-range communication device (e.g., an NFC tag). The communication component 310 can be in the vehicle 300, which can be configured as shown in FIG. 3 for the vehicle 100 and include the components of vehicle 100 in addition to the communication component 310, which can be configured as the vehicular communication component 130. The communication component 310 includes a chip 320 (e.g., implementing a CPU or application controller for vehicle 300) having a non-volatile storage component 330 that stores information about the vehicle 300 (such as vehicle ID, driver/passenger information, carried goods information, etc.). The communication component 310 can include an antenna 340.

The host device 350 is, for example, an active communications device (e.g., that includes a power supply), which can receive information from the communication component 310 and/or transmit information thereto. In some examples, the host device 350 can include a reader (e.g., an NFC reader), such as a toll reader, or other components. The host device 350 can be an external device arranged (e.g., embedded) in proximity of a check point (e.g., at the boundary of a trust zone) or in general in proximity of limited access areas. In some embodiments, the host device 350 can also be carried by a policeman for use as a portable device.

The host device 350 can include a processor 360, a memory 370, such as a non-volatile memory, and an antenna 380. The memory 370 can include an NFC protocol that allows the host device 350 to communicate with the communication component 310. For example, the host device 350 and the communication component 310 can communicate using the NFC protocol, such as for example at about 13.56 mega-Hertz and according to the ISO/IEC 18000-3 international standard. Other approaches that use RFID tags can be used.

The host device 350 can also communicate with a server or other computing device (e.g., communicate over a wireless network with a central operation center). For example, the host device 350 can be wirelessly coupled or hardwired to the server or a communication center. In some examples, the host device 350 can communicate with the operation center via WIFI or over the Internet. The host device 350 can energize the communication component 310 when the vehicle 300 brings antenna 340 within a communication distance of antenna 380. In some examples, the host device 350 can receive real-time information from the operation center and can transmit that information to vehicle 300. In some embodiments, the communication component 310 can have its own battery.

In one embodiment, the host device 350 is adapted to read/send information from/to the vehicle 300, which is equipped with the communication component 310 (e.g., an active device) configured to allow information exchange.

Referring again to FIG. 3, the vehicular communication component 130 of the vehicle 100 can be active internally to pick up in real-time pertinent information concerning the passengers IDs, the transported luggage and/or goods (e.g., when equipped with the corresponding wireless communication component discussed with respect to FIG. 4 above). The vehicle's computing device may detect information in a space range of few meters (e.g., 2-3 meters), so that all data corresponding to passengers, luggage and goods may be acquired. In one example, this occurs when the vehicle approaches an external communication component (e.g., a server or other computing device acting as a host device) within a particular proximity so that communication can begin and/or become strengthened. The communication distance is for example 2-3 meters.

In one embodiment, the vehicular communication component 130 can encrypt data when communicating to external entities and/or with internal entities. In some cases, data concerning transported luggage, goods or even passengers may be confidential or include confidential information (e.g., the health status of a passenger or confidential documents or a dangerous material). In such a case, it is desired that the information and data stored in the memory portion associated to the vehicle computing device is kept as encrypted data.

In various embodiments discussed below, a method for encrypted and decrypted communication between the internal vehicle computing device and the external entity (e.g., a server acting as a host device) is discussed. In one example, this method may be applied even between the internal vehicle computing device and the electronic components associated to passengers, luggage and goods boarded on the vehicle.

In one example, the vehicular communication component 130 sends a vehicular public key to the external communication component (e.g., acting as a host device 151), and the external communication component sends an external public key to the vehicular communication component 130. These public keys (vehicular and external) can be used to encrypt data sent to each respective communication component and verify an identity of each, and also exchange confirmations and other information. As an example, as described further below, the vehicular communication component 130 can encrypt data using the received external public key and send the encrypted data to the external communication component. Likewise, the external communication component can encrypt data using the received vehicular public key and send the encrypted data to the vehicular communication component 130. Data sent by the vehicle 100 can include car information, passenger information, goods information, and the like. The information can optionally be sent with a digital signature to verify an identity of the vehicle 100. Moreover, information can be provided to the vehicle 100 and displayed on a dashboard of the vehicle 100 or sent to an email of a computing device (e.g., a user device or central server that monitors vehicles) associated with the vehicle 100. The vehicle can be recognized based on an identification of the vehicle, a VIN number, etc., along with a vehicular digital signature.

In one example, data exchanged between the vehicle and the external entity can have a freshness used by the other. As an example, data sent by the vehicle to the external entity to indicate the identical instructions can be altered at each of a particular time frame or for a particular amount of data being sent. This can prevent a hacker from intercepting confidential information contained in previously sent data and sending the same data again to result in the same outcome. If the data has been slightly altered, but still indicates a same instruction, the hacker might send the identical information at a later point in time, and the same instruction would not be carried out due to the recipient expecting the altered data to carry out the same instruction.

The data exchanged between the vehicle 100 and an external entity (e.g., a computing system or device) (not shown) can be performed using a number of encryption and/or decryption methods as described below. The securing of the data can ensure that unauthorized activity is prevented from interfering with the operation the vehicle 100 and the external entity.

Figure 5A:
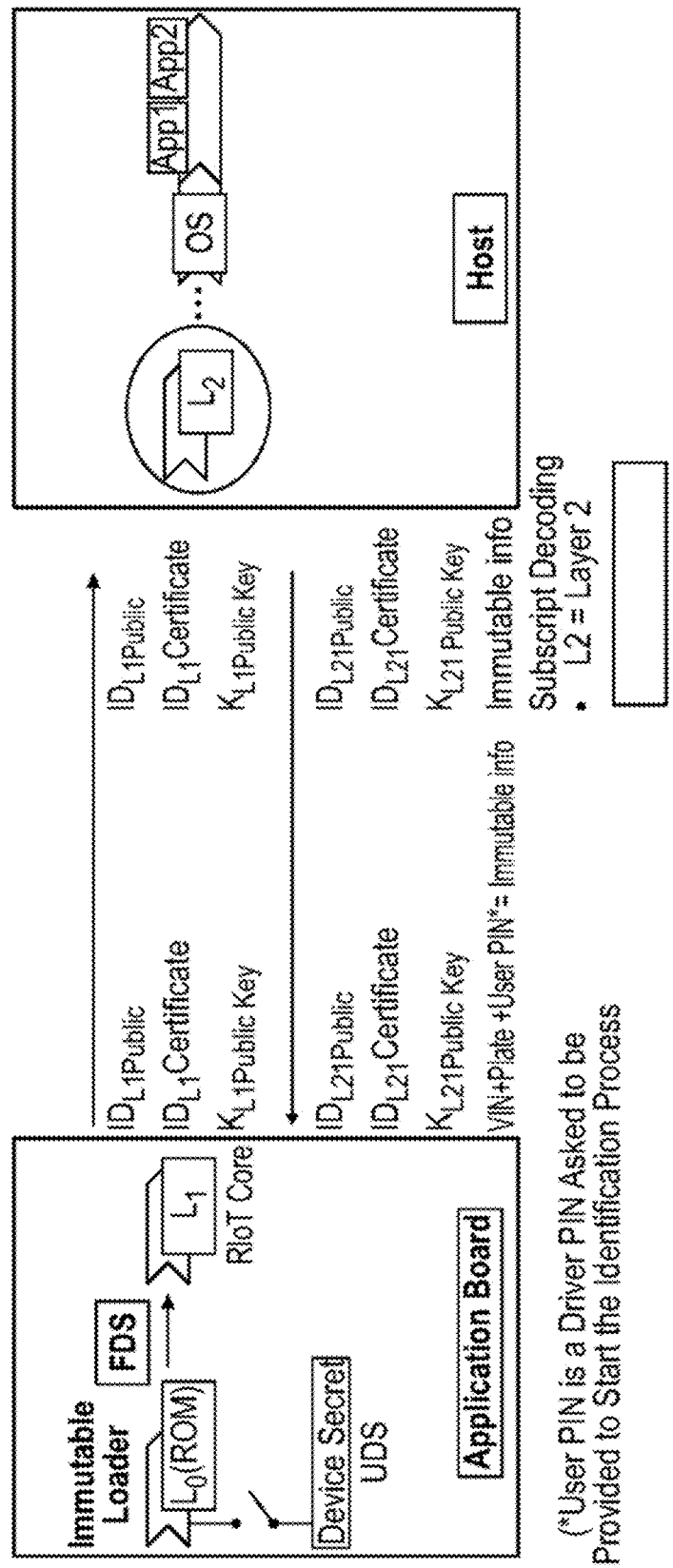
FIG. 5A shows an application board that generates an identifier, certificate, and key for a host device, according to one embodiment.

FIG. 5A shows an application board that generates a triple including an identifier, certificate, and key that is sent to a host device, according to one embodiment. The host device uses the triple to verify an identity of the application board. The application board is an example of computing device 141 of FIG. 1. The host device is an example of host device 151 of FIG. 1.

In one embodiment, the application board and the host include communication components that perform encryption and/or decryption operations for communications (e.g., on information and data) using a device identification composition engine (DICE)-robust internet of things (RIoT) protocol. In one example, the DICE-RIoT protocol is applied to communication between the vehicular communication component and an external communication component, as well as to a communication performed internally to the vehicle environment between the vehicle communication component and the various wireless electronic devices that are associated to each of the passenger IDs, the luggage, the goods and the like.

Figure 5B:
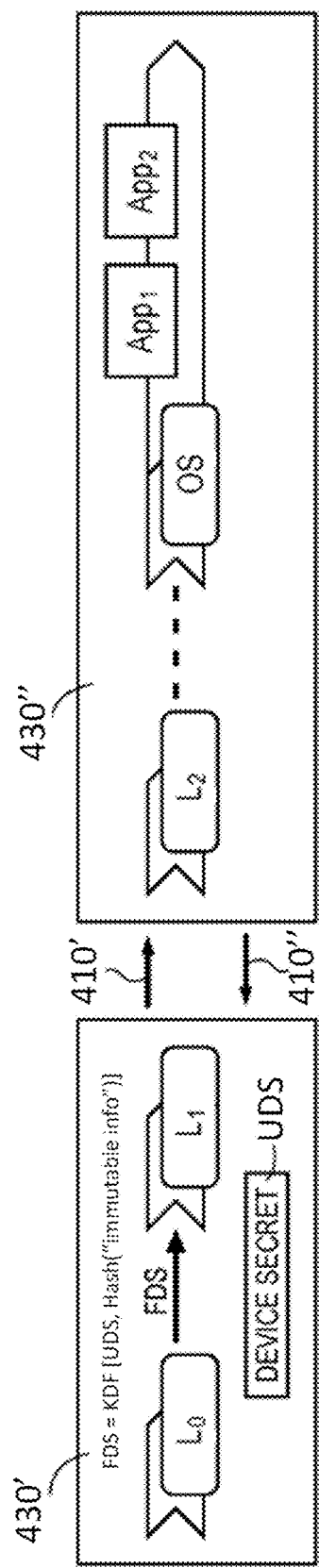
FIG. 5B shows an example computing system booting in stages using layers, according to one embodiment.

FIG. 5B shows an example computing system that boots in stages using layers, according to one embodiment. The system includes an external communication component 430' and a vehicular communication component 430" in accordance with an embodiment of the present disclosure. As the vehicle comes near the external entity or in its proximity, the associated vehicular communication component 430" of the vehicle can exchange data with the external entity as described above for example using a sensor (e.g., a radio frequency identification sensor, or RFID, or the like).

In other embodiments, the component 430' can be an application board located in a vehicle, and the component 430" can be a host device also located in the vehicle that uses the DICE-RIoT protocol to verify an identity of component 430' (for example, as discussed with respect to FIG. 1 above).

In one embodiment, the DICE-RIoT protocol is used by a computing device to boot in stages using layers, with each layer authenticating and loading a subsequent layer and providing increasingly sophisticated runtime services at each layer. A layer can thus be served by a prior layer and serve a subsequent layer, thereby creating an interconnected web of the layers that builds upon lower layers and serves higher order layers. Alternatively, other protocols can be used instead of the DICE-RIoT protocol.

In one example implementation of the communication protocol, security of the communication protocol is based on a secret value, which is a device secret (e.g., a UDS), that is set during manufacture (or also later). The device secret UDS exists within the device on which it was provisioned (e.g., stored as device secret 149 of FIG. 1).

The device secret UDS is accessible to the first stage ROM-based boot loader at boot time. The system then provides a mechanism rendering the device secret inaccessible until the next boot cycle, and only the boot loader (e.g., the boot layer) can ever access the device secret UDS. Thus, in this approach, the boot is layered in a specific architecture that begins with the device secret UDS.

As is illustrated in FIG. 5B, Layer 0, $L_0$, and Layer 1, $L_1$, are within the external communication component 430'. Layer 0 $L_0$ can provide a fuse derived secret, FDS, key to Layer 1 $L_1$. The FDS key can be based on the identity of code in Layer 1 $L_1$ and other security relevant data. A particular protocol (such as robust internet of things (RIoT) core protocol) can use the FDS to validate code of Layer 1 $L_1$ that it loads. In an example, the particular protocol can include a device identification composition engine (DICE) and/or the RIoT core protocol. As an example, the FDS can include a Layer 1 $L_1$ firmware image itself, a manifest that cryptographically identifies authorized Layer 1 $L_1$ firmware, a firmware version number of signed firmware in the context of a secure boot implementation, and/or security-critical configuration settings for the device. The device secret UDS can be used to create the FDS, and is stored in the memory of the external communication component. Thus, the Layer 0 $L_0$ never reveals the actual device secret UDS and it provides a derived key (e.g., the FDS key) to the next layer in the boot chain.

The external communication component 430' is adapted to transmit data, as illustrated by arrow 410', to the vehicular communication component 430". The transmitted data can include an external identification that is public, a certificate (e.g., an external identification certificate), and/or an external public key, as it will be illustrated in connection with FIG. 6. Layer 2 $L_2$ of the vehicular communication component 430" can receive the transmitted data, execute the data in operations of the operating system, OS, for example on a first application $App_1$ and a second application $App_2$.

Likewise, the vehicular communication component 430" can transmit data, as illustrated by arrow 410", including a vehicular identification that is public, a certificate (e.g., a vehicular identification certificate), and/or a vehicular public key. As an example, after the authentication (e.g., after verifying the certificate), the vehicular communication component 430" can send a vehicle identification number, VIN, for further authentication, identification, and/or verification of the vehicle.

Figure 6:
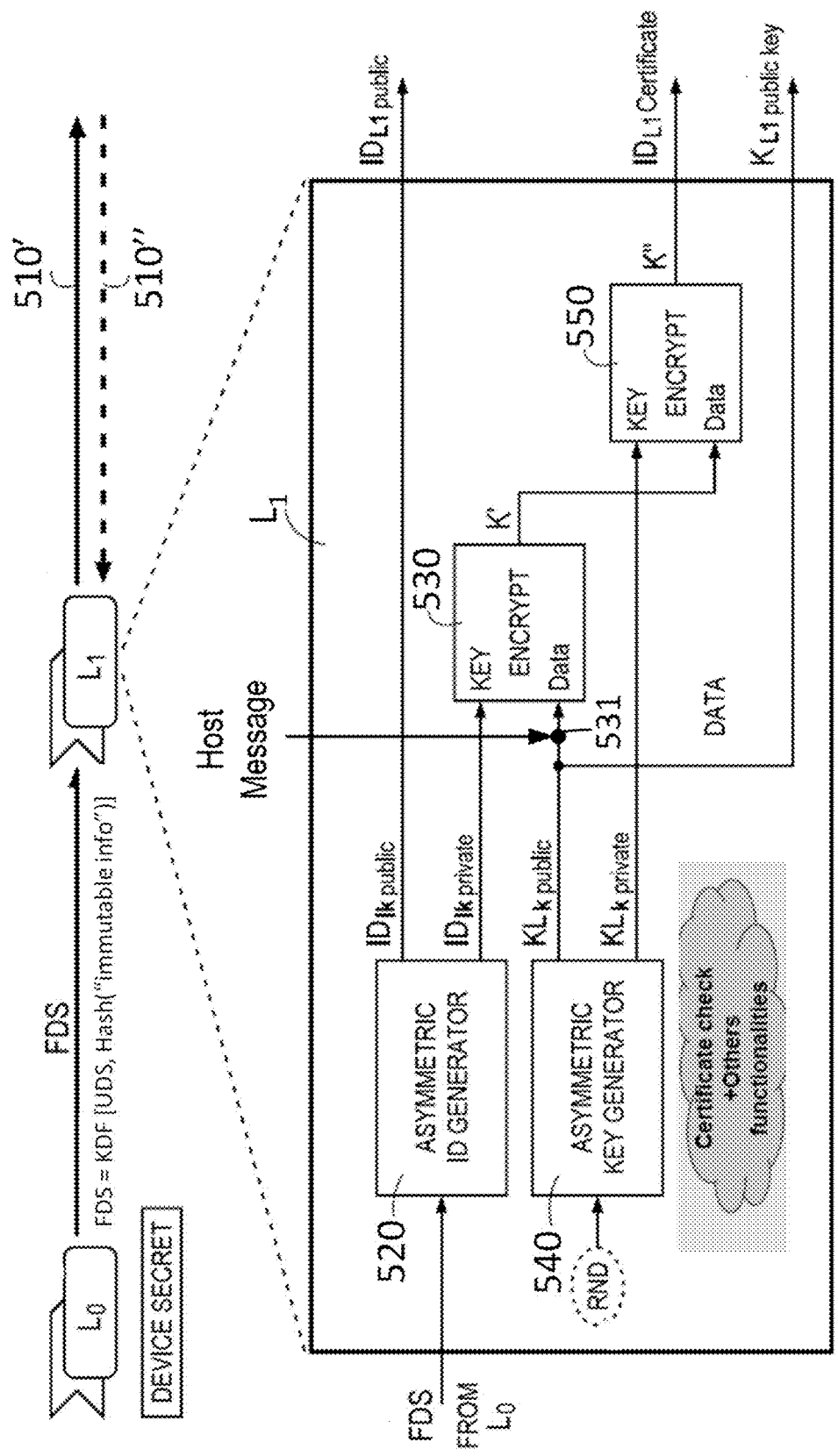
FIG. 6 shows an example computing device generating an identifier, certificate, and key using asymmetric generators, according to one embodiment.

As shown in FIG. 5B and FIG. 6, in an example operation, the external communication component 430' can read the device secret DS, hash an identity of Layer 1 $L_1$, and perform the following calculation:

$$FDS=KDF[UDS,Hash(\text{``immutable information''})]$$

where KDF is a cryptographic one-way key derivation function (e.g., HMAC-SHA256). In the above calculation, Hash can be any cryptographic primitive, such as SHA256, MD5, SHA3, etc.

In at least one example, the vehicle can communicate using either of an anonymous log in or an authenticated log in. The authenticated log in can allow the vehicle to obtain additional information that may not be accessible when communicating in an anonymous mode. In at least one example, the authentication can include providing the vehicular identification number VIN and/or authentication information, such as an exchange of public keys, as will be described below. In either of the anonymous and authenticated modes, the external entity (e.g., a check point police at a boundary of a trust zone) can communicate with the vehicle to provide the external public key associated with the external entity to the vehicle.

FIG. 6 shows an example computing device generating an identifier, certificate, and key using asymmetric generators, according to one embodiment. In one embodiment, the computing device implements a process to determine parameters (e.g., within the Layer $L_1$ of an external device, or Layer $L_1$ of an internal computing device in alternative embodiments).

In one embodiment, the parameters are determined including the external public identification, the external certificate, and the external public key that are then sent (as indicated by arrow 510') to Layer 2 $L_2$ of the vehicular communication component (e.g., reference 430" in FIG. 5B). Arrows 510' and 510" of FIG. 6 correspond to arrows 410' and 410", respectively, of FIG. 5B. Also, the layers in FIG. 6 correspond to the layers of FIG. 5B.

In another embodiment, a message ("Host Message") from the host device is merged with the external public key by pattern (data) merging 531 to provide merged data for encryption. The merged data is an input to encryptor 530. In one example, the host message is concatenated with the external public key. The generated parameters include a triple that is sent to a host device and used to verify an identity of a computing device. For example, the external public identification, the external certificate, and the external public key are used by a verification component of the host device to verify the identity. In one embodiment, the host device is host device 151 of FIG. 1.

As shown in FIG. 6, the FDS from Layer 0 $L_0$ is sent to Layer 1 $L_1$ and used by an asymmetric ID generator 520 to generate a public identification, IDlkpublic, and a private identification, IDlkprivate. In the abbreviated "IDlkpublic" the "lk" indicates a generic Layer k (in this example, Layer 1 $L_1$), and the "public" indicates that the identification is openly shared. The public identification IDlkpublic is illustrated as shared by the arrow extending to the right and outside of Layer 1 $L_1$ of the external communication component. The generated private identification IDlkprivate is used as a key input into an encryptor 530. The encryptor 530 can be, for example, any processor, computing device, etc. used to encrypt data.

Layer 1 $L_1$ of the external communication component can include an asymmetric key generator 540. In at least one example, a random number generator, RND, can optionally input a random number into the asymmetric key generator 540. The asymmetric key generator 540 can generate a public key, KLkpublic, (referred to as an external public key) and a private key, KLkprivate, (referred to as an external private key) associated with an external communication component such as the external communication component 430' in FIG. 5B.

The external public key KLkpublic can be an input (as "data") into the encryptor 530. As mentioned above, in some embodiments, a host message previously received from the host device as part of an identity verification process is merged with KLkpublic to provide merged data as the input data to encryptor 530.

The encryptor 530 can generate a result K' using the inputs of the external private identification IDlkprivate and the external public key KLkpublic. The external private key KLkprivate and the result K' can be input into an additional encryptor 550, resulting in output K". The output K" is the external certificate, IDL1certificate, transmitted to the Layer 2 $L_2$ (or alternatively transmitted to a host device that verifies identity). Since the certificate K" is generated using KLkprivate (e.g., second private key) and K" that is in turn generated using IDlkprivate (e.g., first private key) and KLkpublic (e.g., second public key), the external certificate K" is generated using at least IDlkprivate (e.g., first private key), KLkprivate (e.g., second private key) and KLkpublic (e.g., second public key). The external certificate IDLIcertificate can provide an ability to verify and/or authenticate an origin of data sent from a device. As an example, data sent from the external communication component can be associated with an identity of the external communication component by verifying the certificate, as it will be described further in association with FIG. 7. Further, the external public key KL1public key can be transmitted to Layer 2 $L_2$. Therefore, the public identification ID11public (e.g., first public key corresponding to the first private key ID11private), the certificate IDL1certificate, and the external public key KL1public key (e.g., second public key corresponding to the second private key KL1private) of the external communication component can be transmitted (e.g., as a triple) to Layer 2 $L_2$ of the vehicular communication component.

Figure 7:
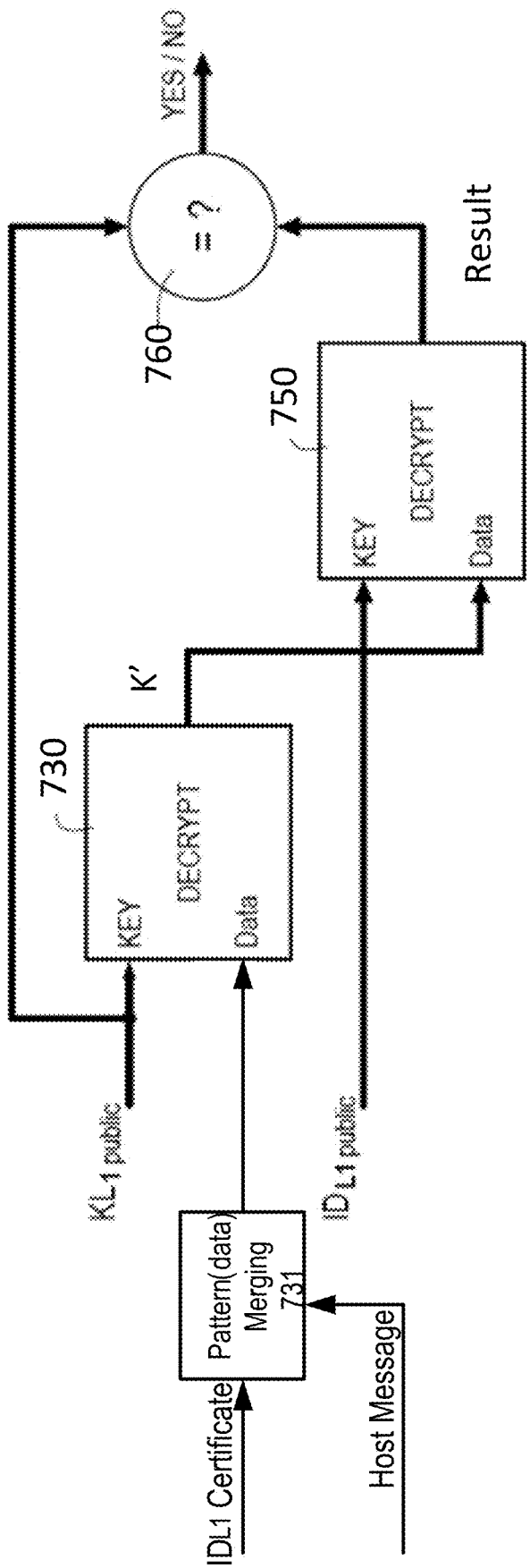
FIG. 7 shows a verification component that verifies the identity of a computing device using decryption operations, according to one embodiment.

FIG. 7 shows a verification component that verifies the identity of a computing device using decryption operations, according to one embodiment. The verification component includes decryptors 730, 750. The verification component implements a process to verify a certificate in accordance with an embodiment of the present disclosure.

In the illustrated example of FIG. 7, a public key KL1 public, a certificate IDL1certificate, and a public identification IDL1 public is provided from the external communication component (e.g., from Layer 1 $L_1$ of the external communication component 430' in FIG. 5B).

The data of the certificate IDL1certificate and the external public key $K_{L1}$ public can be used as inputs into decryptor 730. The decryptor 730 can be any processor, computing device, etc. used to decrypt data. The result of the decryption of the certificate IDL1certificate and the external public key KL1public can be used as an input into decryptor 750 along with the public identification IDL1 public, resulting in an output. The external public key KL1 public and the output from the decryptor 750 can indicate, as illustrated at block 760, whether the certificate is verified, resulting in a yes or no as an output. Private keys are associated with single layers and a specific certificate can only be generated by a specific layer.

In response to the certificate being verified (e.g., after the authentication), data received from the device being verified can be accepted, decrypted, and/or processed. In response to the certificate not being verified, data received from the device being verified can be discarded, removed, and/or ignored. In this way, unauthorized devices sending nefarious data can be detected and avoided. As an example, a hacker sending data to be processed can be identified and the hacking data not processed.

In an alternative embodiment, the public key KL1 public, a certificate IDL1certificate, and a public identification IDL1 public are provided from computing device 141 of FIG. 1, or from memory system 105 of FIG. 2. This triple is generated by computing device 141 in response to receiving a host message from the host device. Prior to providing IDL1certificate as an input to decryptor 730, the IDL1certificate and a message from the host device ("host message") are merged by pattern (data) merging 731. In one example, the merging is a concatenation of data. The merged data is provided as the input to decryptor 730. The verification process then proceeds otherwise as described above.

Figure 8:
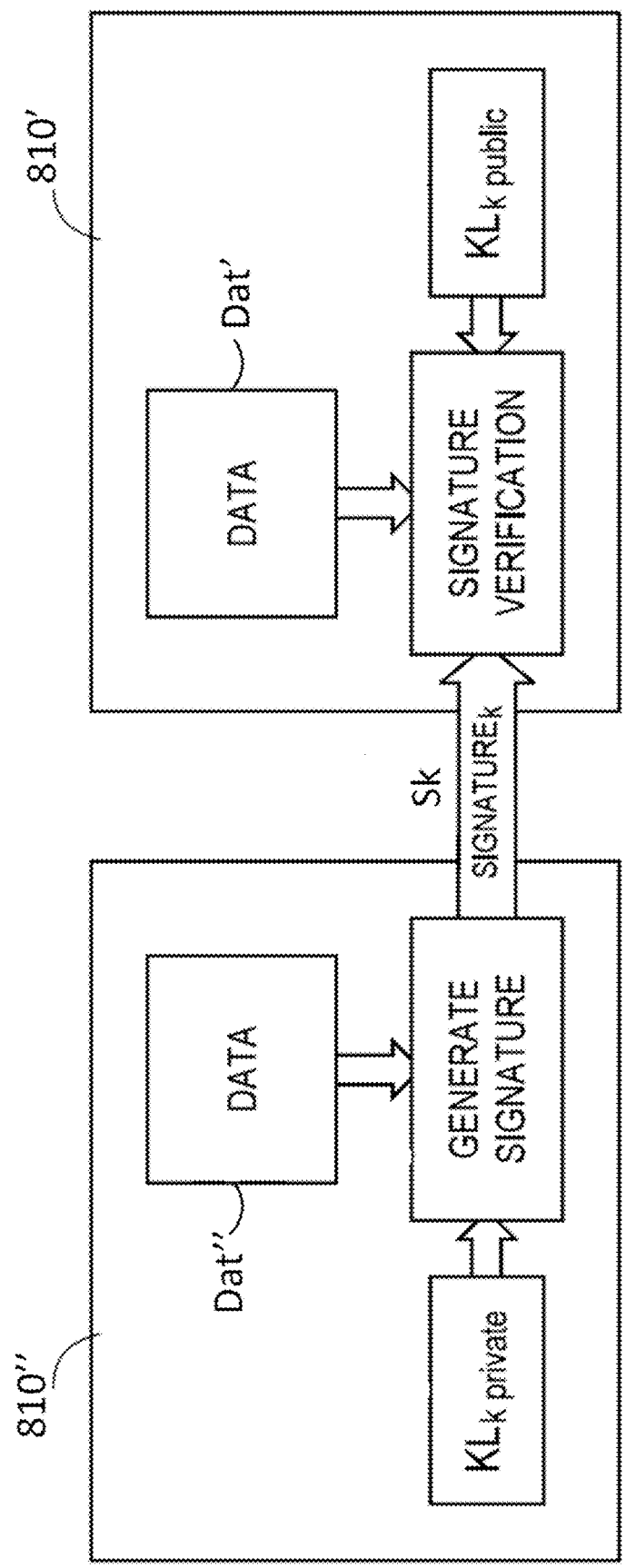
FIG. 8 shows a block diagram of an example process to verify a certificate, according to one embodiment.

FIG. 8 shows a block diagram of an example process to verify a certificate, according to one embodiment. In the case where a device is sending data that may be verified in order to avoid subsequent repudiation, a signature can be generated and sent with the data. As an example, a first device may make a request of a second device and once the second device performs the request, the first device may indicate that the first device never made such a request. An anti-repudiation approach, such as using a signature, can avoid repudiation by the first device and ensure that the second device can perform the requested task without subsequent difficulty.

A vehicle computing device 810" (e.g., vehicle computing device 110 in FIG. 3 or computing device 141 of FIG. 1) can send data Dat" to an external computing device 810' (or to any other computing device in general). The vehicle computing device 810" can generate a signature Sk using the vehicular private key KLkprivate. The signature Sk can be transmitted to the external computing device 810'. The external computing device 810' can verify using data Dat' and the public key KLkpublic previously received (e.g., the vehicular public key). In this way, signature verification operates by using a private key to encrypt the signature and a public key to decrypt the signature. In this way, a unique signature for each device can remain private to the device sending the signature while allowing the receiving device to be able to decrypt the signature for verification. This is in contrast to encryption/decryption of the data, which is encrypted by the sending device using the public key of the receiving device and decrypted by the receiving device using the private key of the receiver. In at least one example, the vehicle can verify the digital signature by using an internal cryptography process (e.g., Elliptical Curve Digital signature (ECDSA) or a similar process).

Due to the exchange and verification of the certificates and of the public keys, the devices are able to communicate in a secure way with each other. When a vehicle approaches an external entity (e.g., a trust zone boundary, a border security entity or, generally, an electronically-controlled host device), the respective communication devices (which have the capability shown in FIG. 7 of verifying the respective certificate) exchange the certificates and communicate to each other. After the authentication (e.g., after receiving/verifying from the external entity the certificate and the public key), the vehicle is thus able to communicate all the needed information related thereto and stored in the memory thereof, such as plate number/ID, VIN, insurance number, driver info (e.g., IDs, eventual permission for border transition), passenger info, transported goods info and the like. Then, after checking the received info, the external entity communicates to the vehicle the result of the transition request, this info being possibly encrypted using the public key of the receiver. The exchanged messages/info can be encrypted/decrypted using the above-described DICE-RIoT protocol. In some embodiments, the so-called immutable info (such as plate number/ID, VIN, insurance number) is not encrypted, while other info is encrypted. In other words, in the exchanged message, there can be non-encrypted data as well as encrypted data: the info can thus be encrypted or not, or mixed. The correctness of the message is then ensured by using the certificate/public key to validate that the content of the message is valid.

Figure 9:
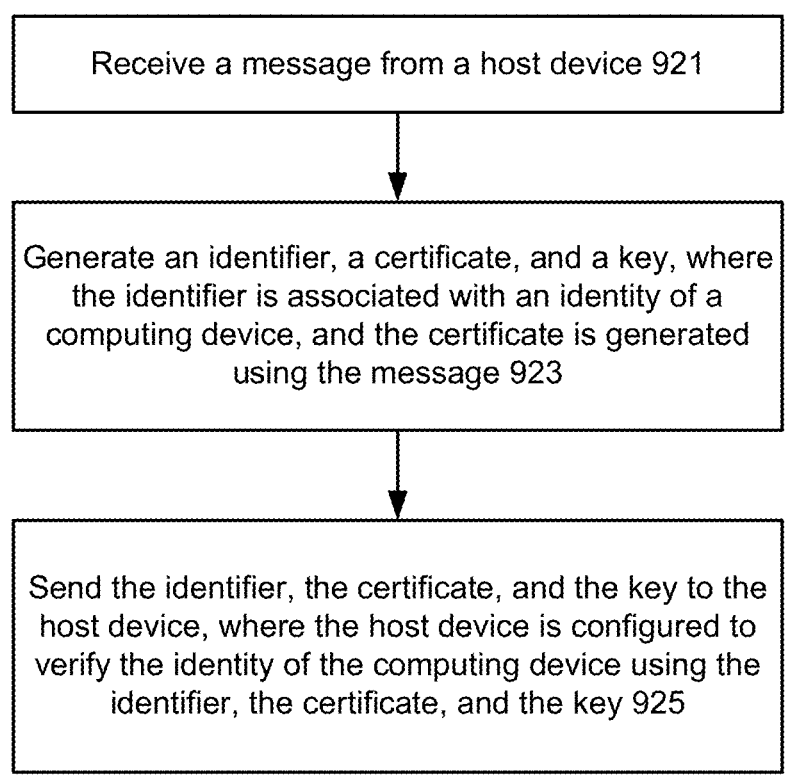
FIG. 9 shows a method to verify an identity of a computing device using an identifier, certificate, and a key, according to one embodiment.

FIG. 9 shows a method to verify an identity of a computing device using an identifier, certificate, and a key, according to one embodiment. For example, the method of FIG. 9 can be implemented in the system of FIGS. 1-7.

The method of FIG. 9 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 9 is performed at least in part by the identity component 147 and verification component 153 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 921, a message is received from a host device. For example, computing device 141 receives a message (e.g., "host message" or "host message freshness") from host device 151.

At block 923, an identifier, a certificate, and a key (e.g., a public key $K_{L1}$public) are generated. The identifier is associated with an identity of a computing device. The certificate is generated using the message (e.g., "host message") from the host device. In one embodiment, the message is merged with the public key prior to encryption. This encryption uses private identifier IDL1private as a key. The private identifier IDL1private is associated with the public identifier IDL1public (e.g., an associated pair that is generated by asymmetric ID generator 520).

In one example, identity component 147 generates the identifier, certificate, and key to provide a triple. In one example, the triple is generated based on the DICE-RIoT protocol. In one example, the triple is generated as illustrated in FIG. 6.

In one example, using the DICE-RIoT protocol, each layer ($L_k$) provides to the next layers ($L_{k+1}$) a set of keys and certificates, and each certificate can be verified by the receiving layer. The fuse derived secret FDS is calculated as follows: FDS=HMAC-SHA256 [UDS, SHA256("Identity of $L_1$")]

In one example, layer 1 $L_1$ in a DICE-RIoT architecture generates the certificate using a host message sent by the host device. Layer 1 calculates two associated key pairs as follows: ($ID_{lk\ public}$, $ID_{lk\ private}$) and ($KL_{k\ public}$, $KL_{k\ private}$)

Layer 1 also calculates two signatures as follows:
K'=encrypt ($ID_{lk\ private}$, $KL_{k\ public}$|host message)

K"=encrypt($KL_{k\ private}$,K')

From the above processing, layer 1 provides a triple as follows:={$ID_{L1\ public}$, $ID_{L1}$ certificate, $K_{L1\ public}$}

More generally, each layer provides a triple as follows:
$K_{Lk}$={set of keys and certificate} for each k=1:N Using the respective triple, each layer is able to prove its identity to the next layer.

In one example, layer 2 corresponds to application firmware, and subsequent layers correspond to an operating system and/or applications of the host device.

At block 925, the generated identifier, certificate, and key are sent to the host device. The host device verifies the identity of the computing device using the identifier, certificate, and key. In one example, host device 151 receives the identifier, certificate, and key from computing device 141. Host device 151 uses verification component 153 to verify the identity of the computing device.

In one example, verification component 153 performs decryption operations as part of the verification process. The decryption includes merging the message from the host with the certificate prior to decryption using the key received from computing device 141. In one example, verification of the identity of the computing device is performed as illustrated in FIG. 7.

In one example, the decryption operations are performed as follows: Decrypt ($ID_{L1}$certificate) using $KL_{1\ public}$ to provide K'Decrypt K' using $ID_{L1\ public}$ to provide Result. The Result is compared to $KL_{1\ public}$. If the Result is equal to $KL_{1\ public}$, then the identity is verified. In one example, an application board identity is verified.

In one embodiment, an identity of a human or animal is proven. Verification of the identity of a person is performed similarly as for verifying the identity of a computing device 141 as described above. In one example, computing device 141 is integrated into a passport for a person. A public administration department of a country that has issued the passport can use a UDS that is specific for a class of document (e.g., driver license, passport, ID card, etc.). For example, for the Italy, Sicily, Messina, Passport Office, the UDS=0x12234 . . . 4444. For the Germany, Bavaria, Munich, Passport Office, the UDS=0xaabb . . . 00322

In one example regarding a passport, the identity of $L_1$ is an ASCII string as follows:

Country|Document type|etc. (e.g., "Italy, Sicily, Messina, Passport Office")

The "granularity" of the assignation can be determined by the public administration of each country.

Various embodiments of the method of FIG. 9 provide various advantages. For example, a thing can be identified and certified as being produced by a specific factory without using a third party key infrastructure (e.g., PKI=public key infrastructure). Malicious or hacker man in the middle attacks are prevented due to being replay protected. The method is usable for mass production of things.

Further, the customer UDS is protected at a hardware level (e.g., inaccessibility of layer 0 external to the component). The UDS cannot be read by anyone, but it can be replaced (e.g., only the customer can do this by using a secure protocol). Examples of secure protocols include security protocols based on authenticated, replay protected commands and/or on secret sharing algorithms like Diffie Hellman (e.g., ECDH elliptic curves Diffie Hellman). In one example, the UDS is communicated to the customer (not the end user) by using secure infrastructure. The UDS is customizable by the customer.

In addition, the component recognition can work in the absence of an internet or other network connection. Also, the method can be used to readily check identity of: things, animals, and humans at a trust zone boundary (e.g., a country border, internal check point, etc.).

In one example, knowledge of the UDS permits the host device to securely replace the UDS. For example, replacement can be done if: the host device desires to change the identity of a thing, or the host desires that the thing's identity is unknown to anyone else (including the original manufacturer).

In another example, a replace command is used by the host device. For example, the host device can send a replace UDS command to the computing device. The replace command includes the existing UDS and the new UDS to be attributed to the computing device. In one example, the replace command has a field including a hash value as follows: hash (existing UDS new UDS).

In another example, an authenticated replay protect command is used that has a field as follows: Replace_command |freshness|signature
    where signature=MAC [secret key, Replace_command |freshness|hash (existing UDS new UDS)]

The secret key is an additional key, and is the key used for authenticated commands present on the device. For example, the secret key can be a session key as described below (see, e.g., FIG. 12).

In one embodiment, a method comprises: receiving, by a computing device (e.g., computing device 141), a message from a host device (e.g., host device 151); generating, by the computing device, an identifier, a certificate, and a key, wherein the identifier is associated with an identity of the computing device, and the certificate is generated using the message; and sending, by the computing device, the identifier, the certificate, and the key to the host device, wherein the host device is configured to verify the identity of the computing device using the identifier, the certificate, and the key.

In one embodiment, verifying the identity of the computing device comprises concatenating the message and the certificate to provide first data.

In one embodiment, verifying the identity of the computing device further comprises decrypting the first data using the key to provide second data.

In one embodiment, verifying the identity of the computing device further comprises decrypting the second data using the identifier to provide a result, and comparing the result to the key.

In one embodiment, the identifier is a public identifier, and the computing device stores a secret key, the method further comprising: using the secret key as an input to a message authentication code to generate a derived secret; wherein the public identifier is generated using the derived secret as an input to an asymmetric generator.

In one embodiment, the identifier is a first public identifier, and the computing device stores a first device secret used to generate the first public identifier, the method further comprising: receiving a replace command from the host device; in response to receiving the replace command, replacing the first device secret with a second device secret; and sending, to the host device, a second public identifier generated using the second device secret.

In one embodiment, the key is a public key, and generating the certificate includes concatenating the message with the public key to provide a data input for encryption.

In one embodiment, the identifier is a public identifier, and a first asymmetric generator generates the public identifier and a private identifier as an associated pair; the key is a public key, and a second asymmetric generator generates the public key and a private key as an associated pair; and generating the certificate comprises: concatenating the message with the public key to provide first data; encrypting the first data using the private identifier to provide second data; and encrypting the second data using the private key to provide the certificate.

In one embodiment, the key is a public key, the method further comprising generating a random number as an input to an asymmetric key generator, wherein the public key and an associated private key are generated using the asymmetric key generator.

In one embodiment, the random number is generated using a physical unclonable function (PUF).

In one embodiment, a system comprises: at least one processor; and memory containing instructions configured to instruct the at least one processor to: send a message to a computing device; receive, from the computing device, an identifier, a certificate, and a key, wherein the identifier is associated with an identity of the computing device, and the certificate is generated by the computing device using the message; and verify the identity of the computing device using the identifier, the certificate, and the key.

In one embodiment, verifying the identity of the computing device comprises: concatenating the message and the certificate to provide first data; decrypting the first data using the key to provide second data; decrypting the second data using the identifier to provide a result; and comparing the result to the key.

In one embodiment, the identifier is a first public identifier, the computing device stores a first device secret used to generate the first public identifier, and the instructions are further configured to instruct the at least one processor to: send a replace command to the computing device, the replace command to cause the computing device to replace the first device secret with a second device secret, and receive, from the computing device, a second public identifier generated using the second device secret.

In one embodiment, the computing device is configured to use the second device secret as an input to a message authentication code that provides a derived secret, and to generate the second public identifier using the derived secret.

In one embodiment, the replace command includes a field having a value based on the first device secret.

In one embodiment, the system further comprises a freshness mechanism configured to generate a freshness, wherein the message sent to the computing device includes the freshness.

In one embodiment, the identity of the computing device includes an alphanumeric string.

In one embodiment, a non-transitory computer storage medium stores instructions which, when executed on a computing device, cause the computing device to at least: receive a message from a host device; generate an identifier, a certificate, and a key, wherein the identifier corresponds to an identity of the computing device, and the certificate is generated using the message; and send the identifier, the certificate, and the key to the host device for use in verifying the identity of the computing device.

In one embodiment, the identifier is a public identifier associated with a private identifier, the key is a public key associated with a private key, and generating the certificate comprises: concatenating the message with the public key to provide first data; encrypting the first data using the private identifier to provide second data; and encrypting the second data using the private key to provide the certificate.

In one embodiment, verifying the identity of the computing device comprises performing a decryption operation using the identifier to provide a result, and comparing the result to the key.

Generating Values Using Physical Unclonable Function (PUF)

At least some embodiments disclosed below provide an improved architecture for generating values using a physical unclonable function (PUF). In some embodiments, the PUF value can itself be used as a device secret, or used to generate a device secret. In one example, the PUF value is used as a unique device secret (UDS) for use with the DICE-RIoT protocol as described above (e.g., see FIG. 5A and FIG. 5B). In one example, a value generated by a PUF is used as an input to a message authentication code (MAC). The output from the MAC is used as the UDS.

In some embodiments, the PUF value, or a value generated from the PUF value, can be used as a random number (e.g., a device specific random number). In one example, the random number (e.g., RND) is used as an input when generating the associated public key and private key via the asymmetric key generator described above (e.g., see FIG. 6).

In general, the architecture below generates an output by feeding inputs provided from one or more PUFs into a message authentication code (MAC). The output from the MAC provides the improved PUF (e.g., the UDS above).

In general, semiconductor chip manufacturers face the problem of key injection, which is the programming of a unique secret key for each chip or die, for example, provided from a semiconductor wafer. It is desired that key injection be performed in a secure environment to avoid leaking or disclosing the secret keys injected into the chips. It is also desired to ensure that the key cannot be hacked or read back after production of the chip. In some cases, for example, key injection procedures are certified or executed by a third-party infrastructure.

Chip manufacturers desire to reduce the production cost of chips that include cryptographic capabilities. Chip manufacturers also desire to simplify production flows while maintaining a consistent level of security performance of the manufactured chips. However, key injection is one of the more expensive production steps.

Chip manufacturers also face the problem of improving the uniformity of PUFs when used as pseudo-random number generators. In some cases, this problem may include a cross-correlation between dice because of the phenomena on which a seed value provided by the PUF is based.

A PUF is based on unpredictable physical phenomena such as, for example, on-chip parasitic effect, on-chip path delays, etc., which are unique for each die. These phenomena are used, for example, to provide a seed value for a pseudo-random number generator.

Two different chips selected in the production line must have different PUF values. The PUF value generated in each chip must not change during the life of the device. If two chips have similar keys (e.g., there is a low Hamming distance between them), it may be possible to use a key of one chip to guess the key of another chip (e.g., preimage hacker attack).

Using the improved PUF architecture described below can provide a solution to one or more of the above problems by providing output values suitable for providing the function of a PUF on each chip or die. The improved PUF architecture below uses a PUF, which enables each chip or die to automatically generate a unique secure key at each power-up of the chip or die. The secure key does not need to be stored in a non-volatile memory, which might be hacked or otherwise compromised.

The improved PUF architecture further uses a MAC to generate the improved PUF output (e.g., a unique key) for use by, for example, cryptographic functions or processes that are integrated into the semiconductor chip. The use of the MAC can, for example, increase the Hamming distance between keys generated on different chips.

In at least some embodiments disclosed herein, an improved PUF architecture using the output from a MAC is provided as a way to generate seed or other values. Thus, the improved PUF architecture provides, for example, a way to perform key injection that reduces cost of manufacture, and that improves reliability and/or uniformity of PUF operation on the final chip.

In one embodiment, a method includes: providing, by at least one PUF, at least one value; and generating, based on a MAC, a first output, wherein the MAC uses the at least one value provided by the at least one PUF as an input for generating the first output.

In one embodiment, a system includes: at least one PUF device; a message authentication code MAC module configured to receive a first input based on at least one value provided by the at least one PUF device; at least one processor; and memory containing instructions configured to instruct the at least one processor to generate, based on the first input, a first output from the MAC module. In various embodiments, the MAC module can be implemented using hardware and/or software.

In one embodiment, the system further includes a selector module that is used to select one or more of the PUF devices for use in providing values to the MAC module. For example, values provided from several PUF devices can be linked and provided as an input to the MAC module. In various embodiments, the selector module can be implemented using hardware and/or software.

Figure 10:
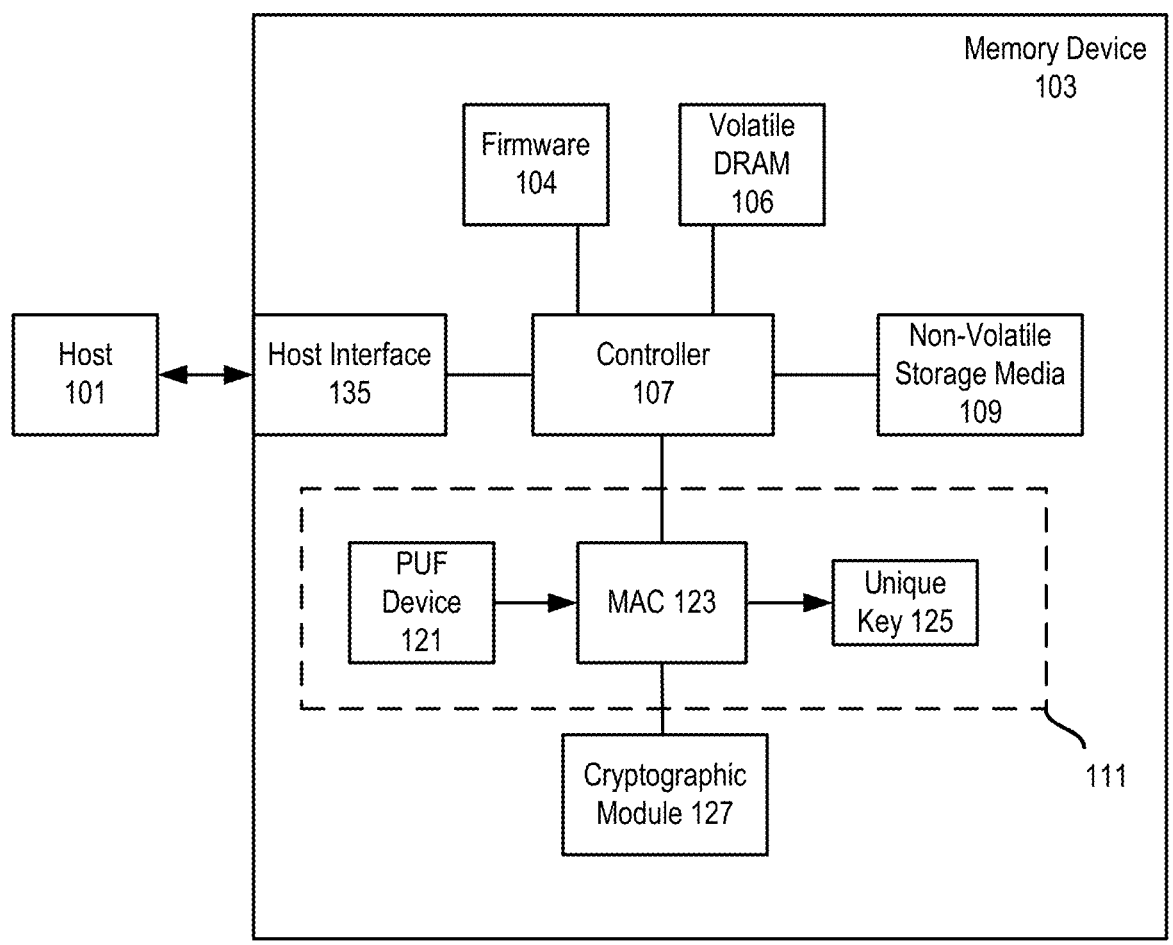
FIG. 10 shows a system for generating a unique key from an output of a message authentication code (MAC) that receives an input from a physical unclonable function (PUF) device, according to one embodiment.

FIG. 10 shows a system for generating a unique key 125 from an output of a message authentication code (MAC) 123 that receives an input from a physical unclonable function (PUF) device 121, according to one embodiment. The system provides a PUF architecture 111 used to generate the unique key 125 (or other value) from an output of message authentication code (MAC) module 123. The MAC module 123 receives an input value obtained from the physical unclonable function (PUF) device 121.

The PUF device 121 in FIG. 10 can be, for example, any one of various different, known types of PUFs. The MAC module 123 provides, for example, a one-way function such as SHA1, SHA2, MD5, CRC, TIGER, etc.

The architecture 111 can, for example, improve the Hamming distance of the PUF values or codes generated between chips. The MAC functions are unpredictable (e.g., input sequences with just a single bit difference provided to the MAC function provide two completely different output results). Thus, the input to MAC function cannot be recognized or determined when having only knowledge of the output. The architecture 111 also can, for example, improve the uniformity of the PUF as a pseudo-random number generator.

In one example, the value generated by the PUF architecture 111 (e.g., unique key 125 or another value) may be a number having N bits, where N depends on a cryptographic algorithm implemented on a chip (e.g., memory device 103 or another device) that includes the PUF architecture 111. In one example, the chip implements a cryptographic function that uses HMAC-SHA256, in which case the output from MAC module 123 has a size N of 256 bits. The use of the output from the MAC module 123 provides a message length for the output value that is suitable for use as a key (without needing further compression or padding).

The PUF architecture 111 is implemented in a device such as the illustrated memory device 103, or can be implemented in other types of computing devices such as, for example, integrated circuits implemented in a number of semiconductor chips provided by a wafer manufacturing production line.

In one embodiment, the MAC module 123 cooperates with and/or is integrated into or as part of cryptographic module 127, for example which can provide cryptographic functions for memory device 103. For example, the output of the MAC module 123 can be suitable to be used as a key due to the MAC being used by the memory device 103 for other cryptographic purposes.

The operation of the PUF architecture 111, the cryptographic module 127, and/or other functions of the memory device 103 can be controlled by a controller 107. The controller 107 can include, for example, one or more microprocessors.

In FIG. 10, a host 101 can communicate with the memory device 103 via a communication channel. The host 101 can be a computer having one or more Central Processing Units (CPUs) to which computer peripheral devices, such as the memory device 103, may be attached via an interconnect, such as a computer bus (e.g., Peripheral Component Interconnect (PCI), PCI eXtended (PCI-X), PCI Express (PCIe)), a communication portion, and/or a computer network.

In one embodiment, unique key 125 is used as a UDS to provide an identity for memory device 103. Controller 107 implements layer 0 $L_0$ and layer 1 $L_1$ in a DICE-RIoT architecture. In response to receiving host message from host 101 via host interface 135, cryptographic module 127 performs processing to generate a triple, as described above. Host 101 uses the triple to verify the identity of memory device 103. Memory device 103 is an example of computing device 141.

For purposes of exemplary illustration, it can be noted that there typically are two technical problems. A first problem is to prove the identity of the board to the host. The problem can be handled by the use of the public triple and asymmetric cryptography, as for example discussed above for DICE-RIoT. This approach is secure and elegant, but in some cases may be too expensive/time consuming to be used directly by a circuitry board itself. A second problem is to prove to the board the identity of the memory on the board (e.g., to avoid unauthorized memory replacement)(this is performed for example after each power-up). The second problem could be solved using the public triple and asymmetric cryptography above. However, a lighter security mechanism based simply on a MAC function is often sufficient for handling the second problem.

The memory device 103 can be used to store data for the host 101, for example, in the non-volatile storage media 109. Examples of memory devices in general include hard disk drives (HDDs), solid state drives (SSDs), flash memory, dynamic random-access memory, magnetic tapes, network attached storage device, etc. The memory device 103 has a host interface 135 that implements communications with the host 101 using the communication channel. For example, the communication channel between the host 101 and the memory device 103 is a Peripheral Component Interconnect Express (PCI Express or PCIe) bus in one embodiment; and the host 101 and the memory device 103 communicate with each other using NVMe protocol (Non-Volatile Memory Host Controller Interface Specification (NVMHCI), also known as NVM Express (NVMe)).

In some implementations, the communication channel between the host 101 and the memory device 103 includes a computer network, such as a local area network, a wireless local area network, a wireless personal area network, a cellular communications network, a broadband high-speed always-connected wireless communication connection (e.g., a current or future generation of mobile network link); and the host 101 and the memory device 103 can be configured to communicate with each other using data storage management and usage commands similar to those in NVMe protocol.

The controller 107 can run firmware 104 to perform operations responsive to the communications from the host 101, and/or other operations. Firmware in general is a type of computer program that provides control, monitoring and data manipulation of engineered computing devices. In FIG. 10, the firmware 104 controls the operations of the controller 107 in operating the memory device 103, such as the operation of the PUF architecture 111, as further discussed below.

The memory device 103 has non-volatile storage media 109, such as magnetic material coated on rigid disks, and/or memory cells in an integrated circuit. The storage media 109 is non-volatile in that no power is required to maintain the data/information stored in the non-volatile storage media 109, which data/information can be retrieved after the non-volatile storage media 109 is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media 109 is non-volatile and can retain data stored therein without power for days, months, and/or years.

The memory device 103 includes volatile Dynamic Random-Access Memory (DRAM) 106 for the storage of run-time data and instructions used by the controller 107 to improve the computation performance of the controller 107 and/or provide buffers for data transferred between the host 101 and the non-volatile storage media 109. DRAM 106 is volatile in that it requires power to maintain the data/information stored therein, which data/information is lost immediately or rapidly when the power is interrupted.

Volatile DRAM 106 typically has less latency than non-volatile storage media 109, but loses its data quickly when power is removed. Thus, it is advantageous to use the volatile DRAM 106 to temporarily store instructions and data used for the controller 107 in its current computing task to improve performance. In some instances, the volatile DRAM 106 is replaced with volatile Static Random-Access Memory (SRAM) that uses less power than DRAM in some applications. When the non-volatile storage media 109 has data access performance (e.g., in latency, read/write speed) comparable to volatile DRAM 106, the volatile DRAM 106 can be eliminated; and the controller 107 can perform computing by operating on the non-volatile storage media 109 for instructions and data instead of operating on the volatile DRAM 106.

For example, cross point storage and memory devices (e.g., 3D XPoint memory) have data access performance comparable to volatile DRAM 106. A cross point memory device uses transistor-less memory elements, each of which has a memory cell and a selector that are stacked together as a column. Memory element columns are connected via two perpendicular layers of wires, where one layer is above the memory element columns and the other layer below the memory element columns. Each memory element can be individually selected at a cross point of one wire on each of the two layers. Cross point memory devices are fast and non-volatile and can be used as a unified memory pool for processing and storage.

In some instances, the controller 107 has in-processor cache memory with data access performance that is better than the volatile DRAM 106 and/or the non-volatile storage media 109. Thus, parts of instructions and data used in the current computing task are cached in the in-processor cache memory of the controller 107 during the computing operations of the controller 107. In some instances, the controller 107 has multiple processors, each having its own in-processor cache memory.

Optionally, the controller 107 performs data intensive, in-memory processing using data and/or instructions organized in the memory device 103. For example, in response to a request from the host 101, the controller 107 performs a real-time analysis of a set of data stored in the memory device 103 and communicates a reduced data set to the host 101 as a response. For example, in some applications, the memory device 103 is connected to real-time sensors to store sensor inputs; and the processors of the controller 107 are configured to perform machine learning and/or pattern recognition based on the sensor inputs to support an artificial intelligence (AI) system that is implemented at least in part via the memory device 103 and/or the host 101.

In some implementations, the processors of the controller 107 are integrated with memory (e.g., 106 or 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The memory device 103 can be used in various computing systems, such as a cloud computing system, an edge computing system, a fog computing system, and/or a standalone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments disclosed herein can be implemented using computer instructions executed by the controller 107, such as the firmware 104. In some instances, hardware circuits can be used to implement at least some of the functions of the firmware 104. The firmware 104 can be initially stored in the non-volatile storage media 109, or another non-volatile device, and loaded into the volatile DRAM 106 and/or the in-processor cache memory for execution by the controller 107.

For example, the firmware 104 can be configured to use the techniques discussed below in operating the PUF architecture. However, the techniques discussed below are not limited to being used in the computer system of FIG. 10 and/or the examples discussed above.

In some implementations, the output of the MAC module 123 can be used to provide, for example, a root key or a seed value. In other implementations, the output can be used to generate one or more session keys.

In one embodiment, the output from the MAC module 123 can be transmitted to another computing device. For example, the unique key 125 can be transmitted via host interface 135 to host 101.

Figure 11:
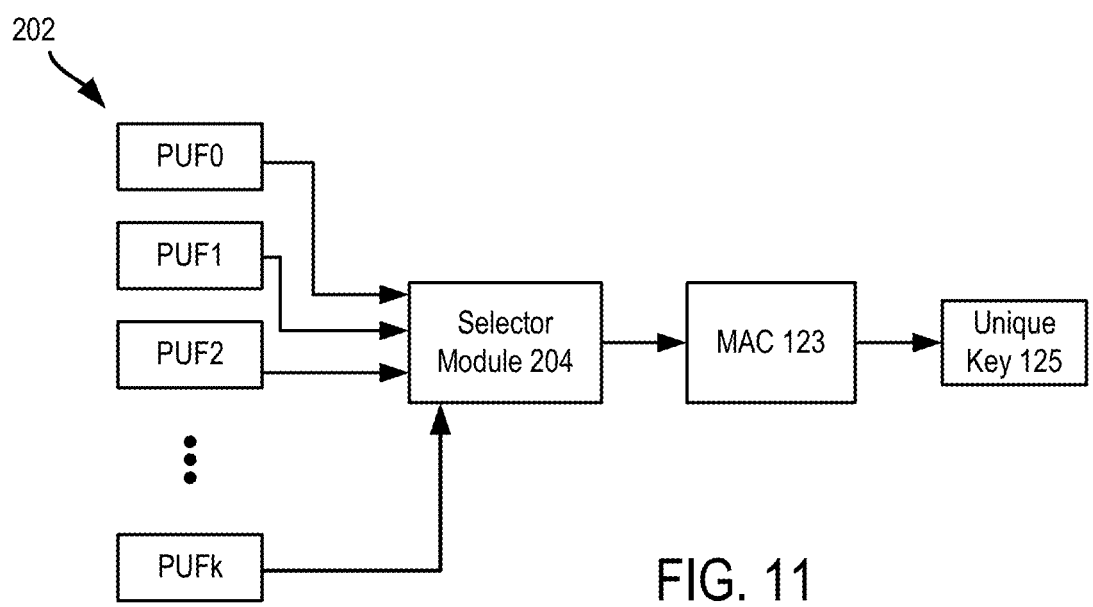
FIG. 11 shows a system for generating a unique key from an output of a MAC that receives inputs from one or more PUF devices selected by a selector module, according to one embodiment.

FIG. 11 shows a system for generating unique key 125 from an output of MAC 123, which receives inputs from one or more PUF devices selected by a selector module 204, according to one embodiment. The system generates the unique key 125 from an output of the MAC module 123 using a PUF architecture similar to architecture 111 of FIG. 10, but including multiple PUF devices 202 and selector module 204, according to one embodiment. The MAC module 123 receives inputs from one or more PUF devices 202 selected by the selector module 204. In one example, PUF devices 202 include PUF device 121.

The PUF devices 202 can be, for example, identical or different (e.g., based on different random physical phenomena). In one embodiment, selector module 204 acts as an intelligent PUF selection block or circuit to select one or more of PUF devices 202 from which to obtain values to provide as inputs to the MAC module 123.

In one embodiment, the selector module 204 bases the selection of the PUF devices 202 at least in part on results from testing the PUF devices 202. For example, the selector module 204 can test the repeatability of each PUF device 202. If any PUF device 202 fails testing, then the selector module 204 excludes the failing device from providing an input value to the MAC module 123. In one example, the failing device can be excluded temporarily or indefinitely.

In some implementations, the selector module 204 permits testing the PUF functionality of each chip during production and/or during use in the field (e.g., by checking the repeatability of the value provided by each PUF device 202). If two or more values provided by a given PUF device are different, then the PUF device is determined to be failing and is excluded from use as an input to the MAC module 123.

In one embodiment, the selector module 204 is used to concurrently use multiple PUF devices 202 as sources for calculating an improved PUF output from the MAC module 123. For example, the selector module 204 can link a value from a first PUF device with a value from a second PUF device to provide as an input to the MAC module 123. In some implementations, this architecture permits obtaining a robust PUF output due to its dependence on several different physical phenomena.

Figure 12:
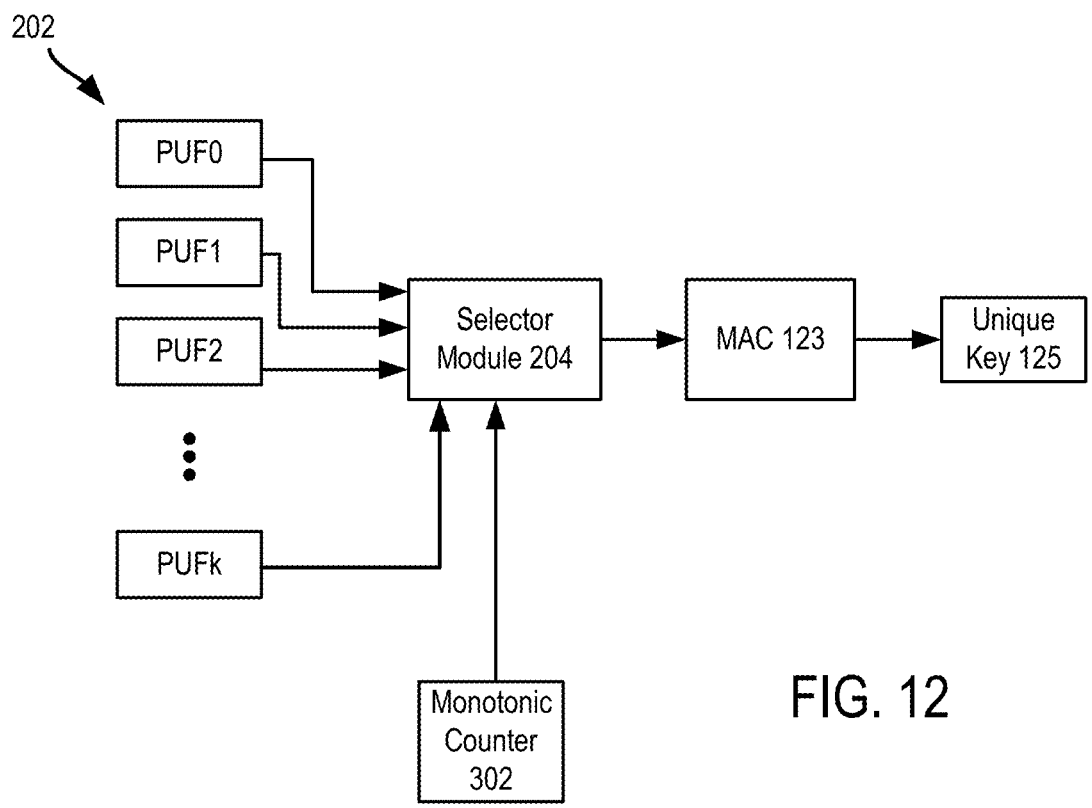
FIG. 12 shows a system for generating a unique key from an output of a MAC that receives inputs from one or more PUF devices and an input from a monotonic counter (and/or an input from another freshness mechanism like NONCE, time-stamp, etc.), according to one embodiment.

FIG. 12 shows a system for generating a unique key from an output of a MAC that receives inputs from one or more PUF devices and an input from a monotonic counter 302 (and/or an input from another freshness mechanism like NONCE, time-stamp, etc.), according to one embodiment. The system generates the unique key 125 from an output of the MAC module 123, according to one embodiment. The PUF architecture illustrated in FIG. 12 is similar to the PUF architecture illustrated in FIG. 11, except that a monotonic counter 302 is included to provide values to selector module 204. In various embodiments, the monotonic counter 302 can be implemented using hardware and/or software.

The MAC module 123 receives inputs from one or more PUF devices 202 and an input from the monotonic counter 302. In one example, values obtained from the PUF devices 202 and the monotonic counter 302 are linked and then provided as an input to the MAC module 123. In some implementations, the monotonic counter 302 is a non-volatile counter that only increments its value when requested. In some embodiments, the monotonic counter 302 is incremented after each power-up cycle of a chip.

In some implementations, the PUF architecture of FIG. 12 can be used to provide a way to securely share keys between a semiconductor chip and other components in an application, such as for example a public key mechanism.

In some implementations, the monotonic counter 302 is incremented before each calculation of a PUF, which ensures that the input of the MAC module 123 is different at each cycle, and thus the output (and/or pattern of output) provided is different. In some examples, this approach can be used to generate a session key, where each session key is different.

In some embodiments, the selector module 204 can selectively include or exclude the monotonic counter 302 (or other freshness mechanism like NONCE, timestamp) from providing a counter value as an input to the MAC module 123.

In some embodiments, the monotonic counter 302 is also used by cryptographic module 127. In some embodiments, a PUF architecture that includes the monotonic counter can be used as a session key generator to guarantee a different key at each cycle. In some implementations, the generated session key is protected in this way: Session key=MAC [one or more PUFs|MTC or other freshness]

In other embodiments, a mechanism is used as follows:

$$\text{Session key}=\text{MAC}_{key\_based}[\text{Root\_Key},\text{MTC or other freshness mechanism}]$$

Where: Root_Key=an output value provided from the MAC module 123 above, or any other kind of key that is present on the chip.

The $\text{MAC}_{key\_based}$ function above is, for example, a MAC algorithm based on a secret key. For example, there can be two types of MAC algorithm in cryptography:
1. An algorithm based on a secret key like, for example, HMAC family (HMAC-SHA256 is key based).
2. An algorithm that is not based on a secret key, for example like SHA256 (SHA stand-alone is not key based).

It should be noted that a MAC that is key-based can be transformed in a MAC that is not key-based by setting the key to a known value (e.g., 0x00 . . . 0xFFFF etc. . . . ).

Figure 13:
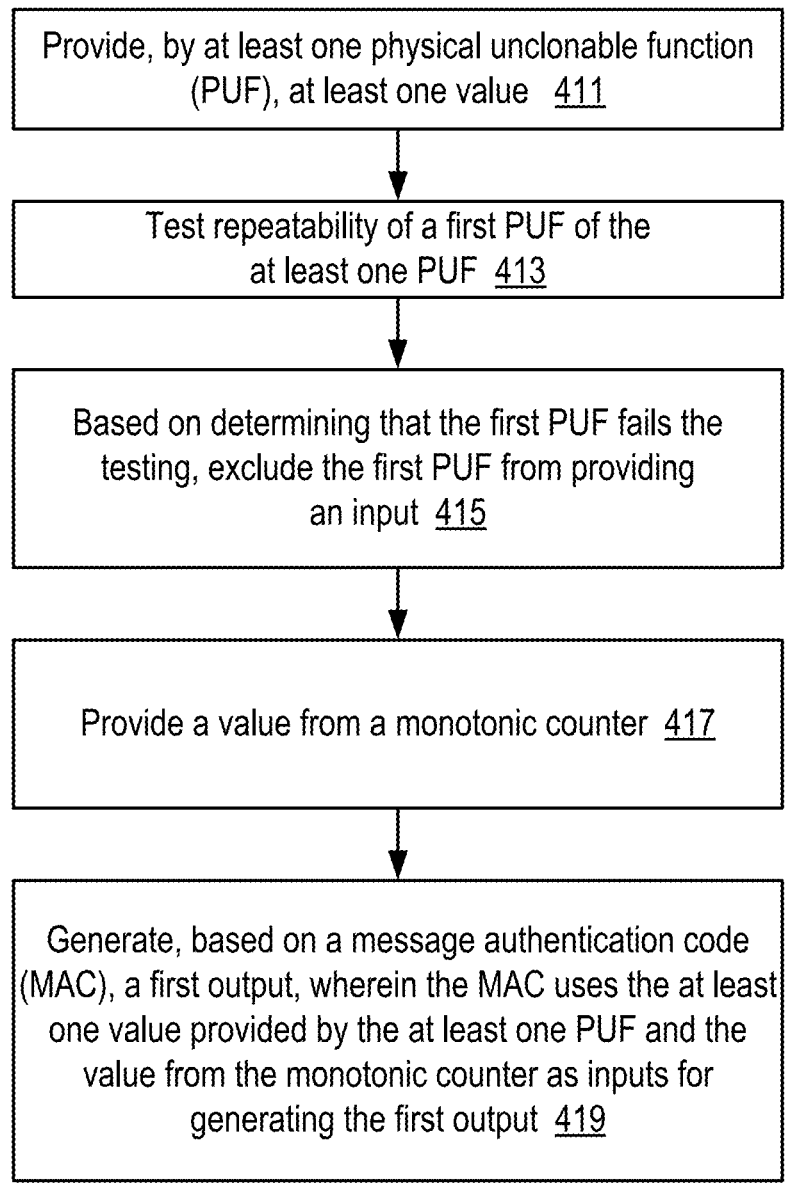
FIG. 13 shows a method to generate an output from a MAC that uses one or more input values provided from one or more PUFs, according to one embodiment.

FIG. 13 shows a method to generate an output from a MAC that uses one or more input values provided from one or more PUFs, according to one embodiment. For example, the method of FIG. 13 can be implemented in the memory device 103 of FIG. 10.

The method of FIG. 13 includes, at block 411, providing one or more values by at least one PUF (e.g., providing values from one or more of PUF devices 202).

At block 413, repeatability of one or more of the PUFs can be tested, for example as was described above. This testing is optional.

At block 415, if testing has been performed at block 413, and it has been determined that a PUF device fails the testing, then the failing PUF device is excluded from providing an input to the MAC. This excluding may be performed, for example, by selector module 204, as was discussed above.

At block 417, a value is provided from a monotonic counter (e.g., monotonic counter 302). The use of the monotonic counter in the PUF architecture is optional.

At block 419, an output is generated from the MAC, which uses one or more values provided by the PUFs (and optionally at least one value from the monotonic counter) as inputs to the MAC.

Various other embodiments are now described below for a method implemented in a computing device that includes: providing, by at least one physical unclonable function (PUF), at least one value; and generating, based on a message authentication code (MAC), a first output, wherein the MAC uses the at least one value provided by the at least one PUF as an input for generating the first output.

In one embodiment, the computing device is a first computing device, and the method further comprises transmitting the first output to a second computing device, wherein the first output is a unique identifier of the first computing device.

In one embodiment, providing the at least one value comprises selecting a first value from a first PUF and selecting a second value from a second PUF.

In one embodiment, the method further comprises: providing a value from a monotonic counter; wherein generating the first output further comprises using the value from the monotonic counter as an additional input to the MAC for generating the first output.

In one embodiment, the method further comprises: generating a plurality of session keys based on respective outputs provided by the MAC, wherein the monotonic counter provides values used as inputs to the MAC; and incrementing the monotonic counter after generating each of the session keys.

In one embodiment, the method further comprises: testing repeatability of a first PUF of the at least one PUF; and based on determining that the first PUF fails the testing, excluding the first PUF from providing any input to the MAC when generating the first output.

In one embodiment, the testing comprises comparing two or more values provided by the first PUF.

In one embodiment, the computing device is a memory device, and the memory device comprises a non-volatile storage media configured to store an output value generated using the MAC.

In one embodiment, the method further comprises performing, by at least one processor, at least one cryptographic function, wherein performing the at least one cryptographic function comprises using an output value generated using the MAC.

In one embodiment, a non-transitory computer storage medium stores instructions which, when executed on a memory device (e.g., the memory device 103), cause the memory device to perform a method, the method comprising: providing, by at least one physical unclonable function (PUF), at least one value; and generating, based on a message authentication code (MAC), a first output, wherein the MAC uses the at least one value provided by the at least one PUF as an input for generating the first output.

In various other embodiments described below, the method of FIG. 4 can be performed on a system that includes: at least one physical unclonable function (PUF) device; a message authentication code (MAC) module configured to receive a first input based on at least one value provided by the at least one PUF device; at least one processor; and memory containing instructions configured to instruct the at least one processor to generate, based on the first input, a first output from the MAC module.

In one embodiment, the MAC module includes a circuit. In one embodiment, the first output from the MAC module is a key that identifies a die. In one embodiment, the first output from the MAC module is a root key, and the instructions are further configured to instruct the at least one processor to generate a session key using an output from the MAC module.

In one embodiment, the system is part of a semiconductor chip (e.g., one chip of several chips obtained from a semiconductor wafer), the first output from the MAC module is a unique value that identifies the chip, and the instructions are further configured to instruct the at least one processor to transmit the unique value to a computing device.

In one embodiment, the at least one PUF device comprises a plurality of PUF devices (e.g., PUF devices 202), and the system further comprises a selector module configured to select the at least one PUF device that provides the at least one value.

In one embodiment, the selector module is further configured to generate the first input for the MAC module by linking a first value from a first PUF device and a second value from a second PUF device.

In one embodiment, the system further comprises a monotonic counter configured to provide a counter value, and the instructions are further configured to instruct the at least one processor to generate the first input by linking the counter value with the at least one value provided by the at least one PUF device.

In one embodiment, the system further comprises a selector module configured to select the at least one PUF device that provides the at least one value, wherein linking the counter value with the at least one value provided by the at least one PUF device is performed by the selector module.

In one embodiment, the monotonic counter is further configured to increment, after generating the first input, the counter value to provide an incremented value; and the instructions are further configured to instruct the at least one processor to generate, based on the incremented value and at least one new value provided by the at least one PUF device, a second output from the MAC module.

Figure 14:
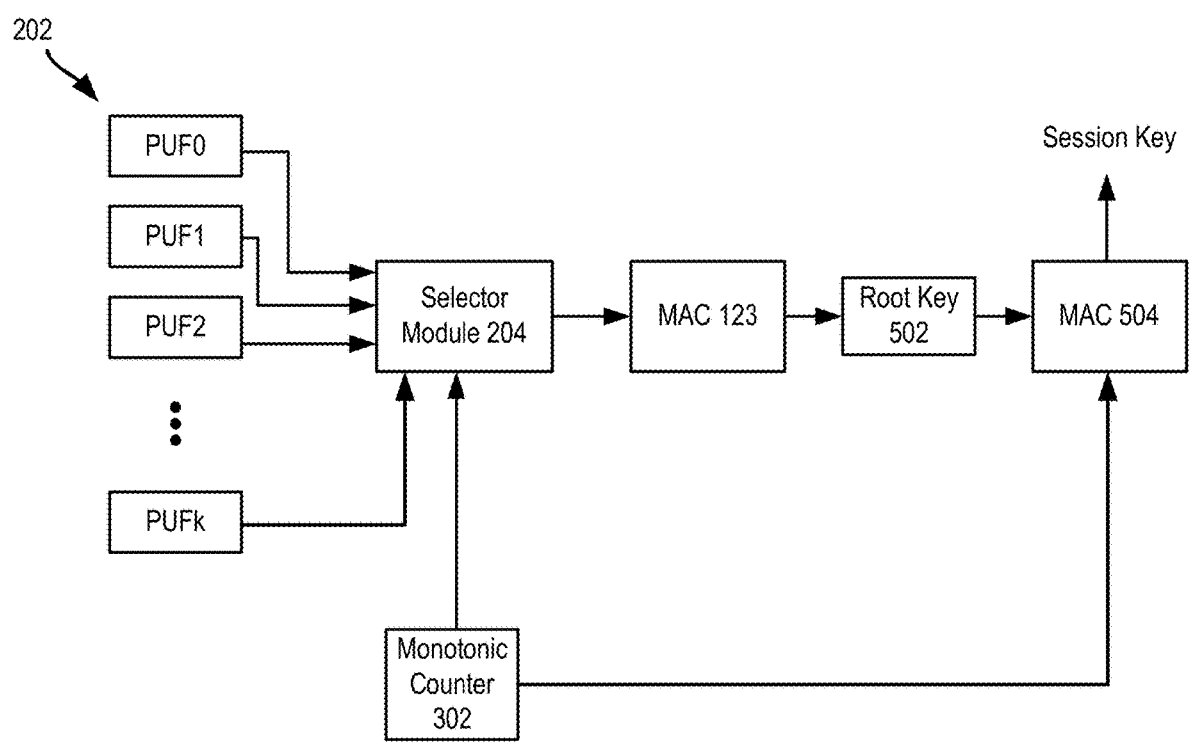
FIG. 14 shows a system for generating a root key from an output of a MAC that receives inputs from one or more PUF devices and an input from a monotonic counter (and/or an input from another freshness mechanism like NONCE, time-stamp, etc.), and that adds an additional MAC to generate a session key, according to one embodiment.

FIG. 14 shows a system for generating a root key from an output of a MAC that receives inputs from one or more PUF devices and an input from a monotonic counter (and/or an input from another freshness mechanism like NONCE, time-stamp, etc.), and that adds an additional MAC to generate a session key, according to one embodiment.

In one embodiment, the system generates the root key from an output of a MAC that receives inputs from one or more PUF devices 202 and an input from a monotonic counter 302 (and/or an input from another freshness mechanism like NONCE, time-stamp, etc.), and that adds an additional MAC module 504 to generate a session key using a root key input, according to one embodiment. In this embodiment, MAC module 123 provides root key 502 as the output from MAC module 123. Root key 502 is an input to the MAC module 504, which can use a MAC function such as Session key=$MAC_{key\_based}$ [Root_Key, MTC or other freshness mechanism], which was described above. The root key input in this key-based function can be root key 502, as illustrated.

Additionally, in one embodiment, monotonic counter 302 can provide an input to the MAC module 504. In other embodiments, a different monotonic counter or other value from the chip can be provided as an input to MAC module 504 instead of using monotonic counter 302. In some cases, the monotonic counter 302 provides a counter value to MAC module 504, but not to selector module 204. In other cases, the counter value can be provided to both MAC modules, or excluded from both modules.

Key Generation and Secure Storage

As mentioned above, PUFs can be used for secure key generation. Various embodiments discussed below relate to generating an initial key using at least one PUF, applying processing to increase obfuscation of the initial key, and storing the final obfuscated key in a non-volatile memory. The final obfuscated key and/or an intermediate key used to generate the final obfuscated key can be shared with another computing device and used for secure communication with the other computing device (e.g., messaging using symmetric cryptography based on a shared key). In some embodiments, the secure key generation is done for computing devices to be used in automotive applications (e.g., a controller in an autonomous vehicle).

In alternative embodiments, the initial key is generated in other ways that do not require using the at least one PUF above. In one embodiment, the initial key can be generated by using an injected key. For example, the initial key is present in a chip due to being injected in a factory or other secure environment. In this case, the applying processing to increase obfuscation of the initial key is performed by applying obfuscation processing to the injected key.

The automotive environment presents the technical problem of introducing "noise" during the key generation phase. Various embodiments below provide a technological solution to this problem by using a methodology to diminish or avoid key variation due to this induced noise by storing an obfuscated key inside a non-volatile memory area.

The automotive environment can affect key generation in various ways. For example, engine power-on can cause a drop in application power to a computing device resulting in a key being generated in the wrong manner. Temperature extremes can also affect the circuit that generates the key. Other sources such as magnetic fields from power lines can cause inter-symbol interference or crosstalk, making a host not recognize the device.

In contrast, if the key is generated in a safe environment and is stored in memory, it will be immune from noise. A safe environment can be, for example, directly mounted in a car, in a test environment, or in a factory (e.g., that manufactures the computing device generating the key) depending on the strategy used to propagate the key between end users/customers of the computing device product.

In one example, ADAS or other computing systems as used in vehicles are subject to power supply variations. This can occur, for example, during turning on the vehicle, braking, powering the engine, etc.

Various embodiments to generate and store a key as discussed below provide the advantages of being substantially independent from external factors (e.g., power supply variations, temperature and other external sources of noise). Another advantage in some embodiments is that for every cycle, for example, the generation of the key vector is the same.

When storing the key, another advantage provided in some embodiments is that the key is substantially immune against hardware attack (e.g., that hackers might put in place). For example, one such attack is monitoring of the power-on current of a device so as to associate current variation to bits associated with the key. Other attacks can use, for example, voltage measurements (e.g., a Vdd supply voltage). Some attacks can use, for example, temperature variations to interfere with operation of a device.

In some embodiments, the initial key can be generated using the approaches and/or architectures as described above for FIGS. 10-14. For example, a PUF is used to generate the key for every power-on cycle of the computing device that is storing the key. In alternative embodiments, other approaches can be used to generate the initial key.

In one exemplary approach, as discussed earlier above, key injection uses at least one PUF and a MAC algorithm (e.g., SHA256) to generate a key for a device that is significantly different from other devices (e.g., from adjacent die located on a wafer). The MAC cryptography algorithm provides the benefit of increasing the entropy of the bits generated by the PUF.

In one embodiment, the generated key (e.g., the initial key as provided from a PUF and then a MAC algorithm) is stored in a non-volatile area of the device after pre-processing is performed on the key in order to diminish or avoid hacker attacks, and also to improve reliability of the stored key. In one embodiment, after the key is stored, the circuit generating the key can be disabled. The pre-processing is generally referred to herein as obfuscation processing. In one example, circuitry and/or other logic is used to implement the obfuscation processing on the device. In one example, the stored key can be read by the device because the key is independent from the external source of noise. An internal mechanism is used to read any data of the device.

In various embodiments, storing the key as described herein increases the margin against noise. Also, this makes it difficult for a hacker to read the stored key, for example, using a power monitoring or other hacking method.

At least some embodiments herein use a PUF and an encryption algorithm (e.g., HMAC-SHA256) to make the key generation independent from external factors such as temperature or voltage that may otherwise cause the key to be different from one power-on of the device to the next power-on. If this occurs, it can be a problem for a host to be able to exchange messages with the device. Various embodiments make the key generation more robust by placing the stored key in memory such that it is not impacted by external factors.

In one embodiment, the key is generated once on a device and stored in non-volatile memory of the device. In one example, the key can be generated using the content of an SRAM before a reset is applied to the SRAM. The key, which is a function of the PUF, is generated using the pseudo random value output from the PUF. The content of the SRAM is read before a reset of the appliance or other device. The key can also be re-generated at other times through a command sequence, as may be desired. In one example, the generated key is used as a UDS in the DICE-RIoT protocol, as described above. In one example, the command sequence uses a replace command to replace a previously-generated UDS with a new UDS, as described above.

In one embodiment, the key generation is independent of the cryptography implemented by the device. The generated key is shared with a host. This embodiment stores the key and/or reads the key in the device in a way that avoids an attacker guessing the key and using it internally, such as for example by analyzing the shape of the current that the device absorbs during key usage.

In addition, for example, in asymmetric cryptography the generated key becomes the variable password that is the secret key of the system. The key is not shared with others. For public key cryptography, the key is used to generate a corresponding public key.

In various embodiments, an initial key is generated using an injected key or using one or more PUFs (e.g., to provide an initial key PUF0). The initial key is then subjected to one or more steps of obfuscation processing to provide intermediate keys (e.g., PUF1, PUF2, . . . , PUF5) such as described below. The output (e.g., PUF5) from this processing is an obfuscated key that is stored in non-volatile memory of the device. When using an injected key, obfuscation processing is applied to the injected key similarly as described below for the non-limiting example of PUF0.

In one embodiment, as mentioned above, a mechanism is used as follows for the case of an initial injected key:

Session key=$MAC_{key\_based}$ [Root_Key, MTC or other freshness mechanism]

Where: Root_Key=any other kind of key that is present on the chip (e.g., the key can be an initial key injected in the chip in a factory or other secure environment)

In one embodiment, on first power-up of a device, a special sequence wakes up at least one circuit (e.g., a read circuit) of the device and verifies that the circuit(s) is executing properly. The device then generates an initial key PUF0, as mentioned above. This key can be stored or further processed to make it more robust for secure storage, as described below.

An intermediate key, PUF1, is generated by concatenating PUF0 with a predetermined bit sequence (e.g., a sequence known by others) to generate PUF1. In one embodiment, PUF1 is used to verify the ability of the device to correctly read the key and to ensure that noise, such as fluctuations in the power supply, are not affecting the generated key.

A next intermediate key, PUF2, is generated. PUF1 is interleaved with an inverted bit pattern (e.g., formed by inverting the bits of PUF1, and sometimes referred to herein as PUF1 bar) to generate PUF2.

In one embodiment, PUF2 has the same bit number of 0s and 1s. This makes the shape of the device current substantially the same for any key (e.g., any key stored on the device). This reduces the possibility of an attacker guessing the key value by looking at the shape of the device current when the key is being read by the device.

A next intermediate key, PUF3, is generated. The bits of PUF2 are interleaved with pseudo-random bits to form PUF3. This further helps to obfuscate the key. In one embodiment, the pseudo-random bits are derived from PUF1 or PUF2 by using a hash function. For example, these derived bits are added to PUF2 to form PUF3.

A next intermediate key, PUF4, is generated. Error Correction Codes (ECCs) are generated by the internal circuitry of the device (e.g., during programming). The bits of the ECC are added to PUF3 to generate PUF4. In one embodiment, the ECC bits help guard against the effects of non-volatile memory (e.g., NVRAM) aging that can be caused by, for example, device endurance limits, X-rays and particles. Non-volatile memory aging can also be caused, for example, by an increase in the number of electrons in the NV cell which can cause bits to flip.

A next intermediate key, PUF5, is generated. PUF5 is a concatenation of several copies of PUF4. Having the redundancy of multiple PUF4 copies present in PUF5 further increases robustness by increasing the likelihood of being able to correctly read the key at a later time. In one embodiment, several copies of PUF5 are stored in various regions of non-volatile memory storage to further increase robustness. For example, even if PUF5 is corrupted in one of the regions, PUF5 can be read from other of the regions, and thus the correct key can be extracted.

In one embodiment, PUF1 or PUF3 is the key that is shared with a host for symmetric cryptography, or used to generate a public key for asymmetric cryptography. In one embodiment, PUF4 and PUF5 are not shared with end users or a host.

The above approach is modular in that PUF2, PUF3, PUF4 and/or PUF5 are not required for generating an obfuscated key. Instead, in various embodiments, one or more of the foregoing obfuscation steps can be applied to the initial key, and further the ordering can be varied. For example, the number obfuscation steps can be decreased for a system that is known not to have Vdd voltage supply drops.

In one embodiment, when storing the obfuscated key, the bit patterns will be physically spread around the non-volatile storage media (e.g., in different rows and words). For example, the device is able to read the bits at the same time and protect against multi-bit errors.

Figure 15:
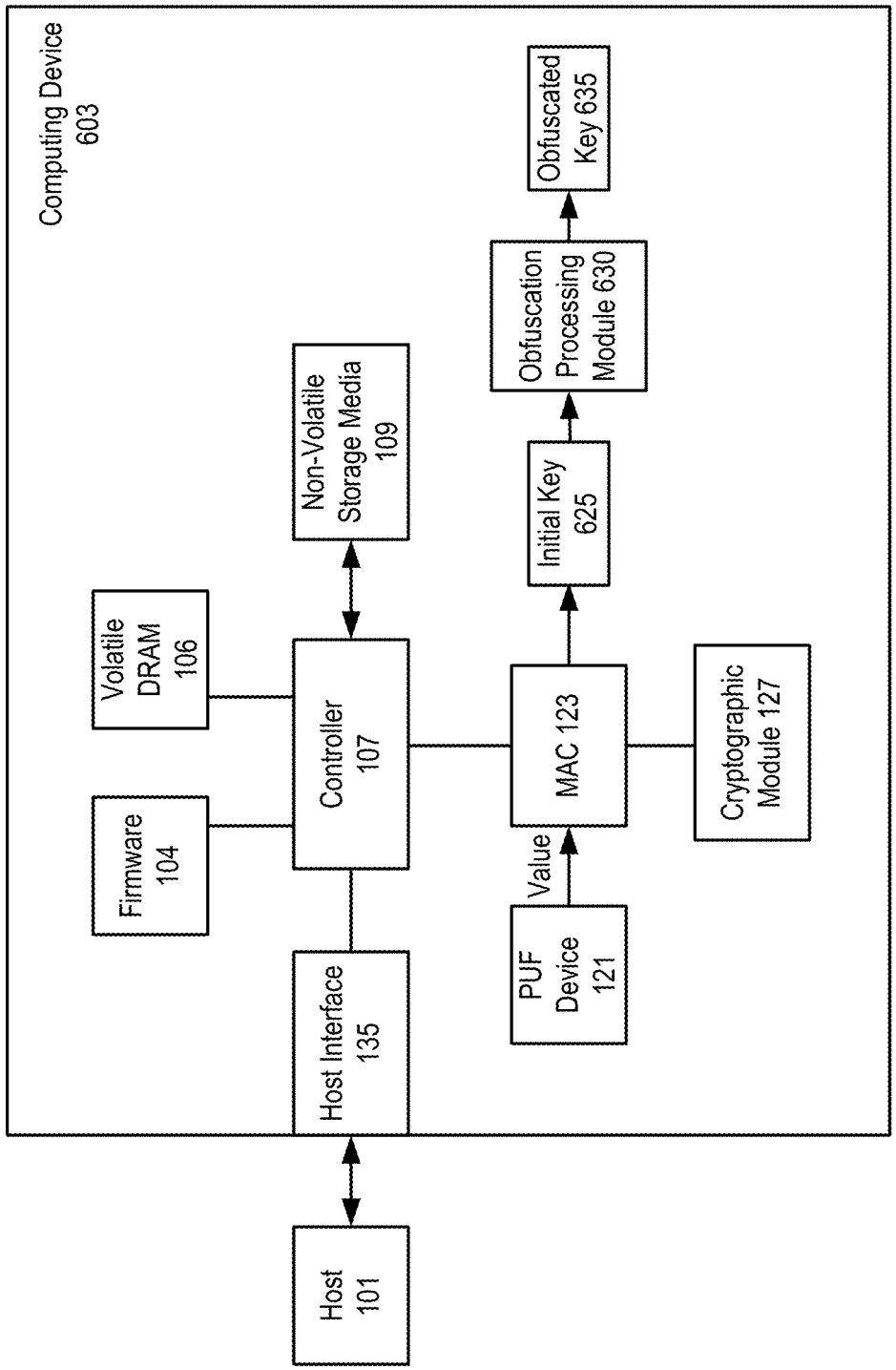
FIG. 15 shows a computing device for storing an obfuscated key in non-volatile memory, according to one embodiment.

FIG. 15 shows a computing device 603 for storing an obfuscated key 635 in non-volatile memory (e.g., non-volatile storage media 109), according to one embodiment. Computing device 603 is an example of computing device 141 of FIG. 1. In one example, the obfuscated key is used as a UDS. (Note) For example, the obfuscation adds entropy to the bits of the key to avoid a possible attempt by a hacker to understand the value of the key. The device is always able to extract the key by removing the added bits used as obfuscation. In one example, a common hacker attack consists of guessing the secret key generated/elaborated inside the device by processing, with statistical tools, the current profile absorbed by the device in some particular timeframe. The obfuscation mitigates this problem in a considerable way.

An initial key 625 is generated based on a value provided by at least one physical unclonable function device 121. The obfuscated key 635 is generated based on initial key 625. After being generated, the obfuscated key 635 is stored in non-volatile storage media 109.

In one embodiment, a message authentication code (MAC) 123 uses the value from PUF device 121 as an input and provides the initial key 625 as an output. In one embodiment, obfuscation processing module 630 is used to perform processing on initial key 625 in order to provide obfuscated key 635 (e.g., PUF5), for example as was discussed above.

In one embodiment, the obfuscated key 635 is securely distributed to another computing device as described in related U.S. patent application Ser. No. 15/965,731, filed 27 Apr. 2018, issued as U.S. Pat. No. 10,778,661 on Sep. 15, 2020, and entitled "SECURE DISTRIBUTION OF SECRET KEY USING A MONOTONIC COUNTER," by Mondello et al., the entire contents of which application is incorporated by reference as if fully set forth herein. In other embodiments, initial key 625 and/or any one or more of the intermediate keys from the obfuscation processing described herein can be securely distributed in the same or a similar manner. Optionally, an end user/customer uses the foregoing approach to read the value of an initial key (e.g., PUF0), an intermediate key, and/or a final obfuscated key (e.g., PUF5). For example, the end user can verify the proper execution of the internal generation of the key by the device, and/or monitor the statistical quality of the key generation.

Figure 16:
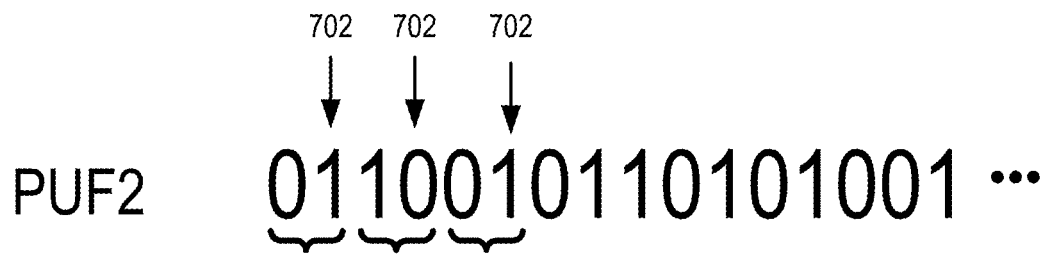
FIG. 16 shows an example of an intermediate key generated during an obfuscation process, according to one embodiment.

FIG. 16 shows an example of an intermediate key (PUF2) generated during an obfuscation process by obfuscation processing module 630, according to one embodiment. As mentioned above, the bits of PUF1 are inverted to provide inverted bits 702. Bits 702 are interleaved with the bits of PUF1 as illustrated. For example, every second bit in the illustrated key is an interleaved inverted bit 702.

Figure 17:
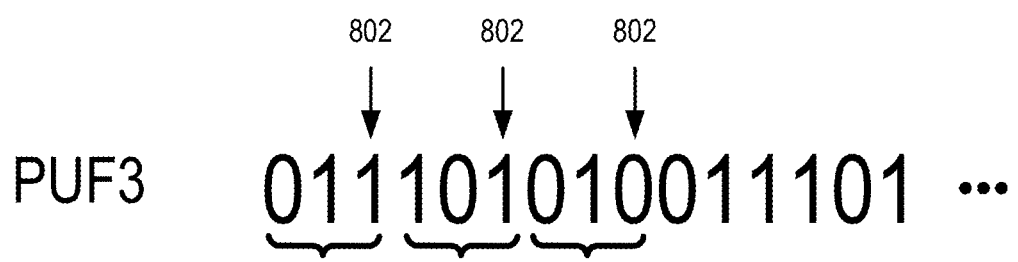
FIG. 17 shows an example of another intermediate key generated during the obfuscation process of FIG. 16, according to one embodiment.

FIG. 17 shows an example of another intermediate key (PUF3) generated during the obfuscation process of FIG. 16 (PUF3 is based on PUF2 in this example), according to one embodiment. As mentioned above, the bits of PUF2 are further interleaved with pseudo-random bits 802. As illustrated, bits 802 are interleaved with PUF2. For example, every third bit in the illustrated key is an interleaved pseudo-random bit 802.

Figure 18:
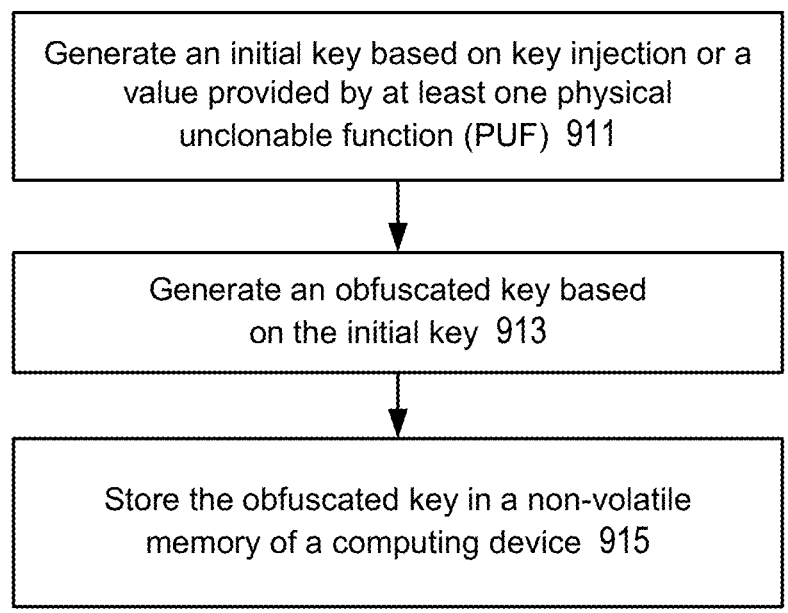
FIG. 18 shows a method for generating and storing an obfuscated key in a non-volatile memory, according to one embodiment.

FIG. 18 shows a method for generating and storing an obfuscated key (e.g., obfuscated key 635) in a non-volatile memory (e.g., non-volatile storage media 109), according to one embodiment. In one example, memory system 105 of FIG. 2 stores the obfuscated key in non-volatile memory 122.

In block 911, an initial key is generated based on a value provided by at least one physical unclonable function (PUF).

In other embodiments, in block 911, the initial key is generated by key injection. For example, the initial key can simply be a value injected into a chip during manufacture.

In block 913, an obfuscated key is generated based on the initial key. For example, the generated obfuscated key is PUF3 or PUF5.

In block 915, the obfuscated key is stored in a non-volatile memory of a computing device. For example, the obfuscated key is stored in NAND flash memory or an EEPROM.

In one embodiment, a method includes: generating an initial key using key injection; generating an obfuscated key based on the initial key; and storing the obfuscated key in non-volatile memory. For example, the initial key can be the key injected during a key injection process at the time of manufacture.

In one embodiment, a method comprises: generating an initial key provided by key injection or based on a value provided by at least one physical unclonable function (PUF); generating an obfuscated key based on the initial key; and storing the obfuscated key in a non-volatile memory of the computing device.

In one embodiment, generating the initial key comprises using the value from the PUF (or, for example, another value on the chip) as an input to a message authentication code (MAC) to generate the initial key.

In one embodiment, the obfuscated key is stored in the non-volatile memory outside of user-addressable memory space.

In one embodiment, generating the obfuscated key comprises concatenating the initial key with a predetermined pattern of bits.

In one embodiment, concatenating the initial key with the predetermined pattern of bits provides a first key (e.g., PUF1); and generating the obfuscated key further comprises interleaving the first key with an inverted bit pattern, wherein the inverted bit pattern is provided by inverting bits of the first key.

In one embodiment, interleaving the first key with the inverted bit pattern provides a second key (e.g., PUF2); and generating the obfuscated key further comprises interleaving the second key with pseudo-random bits.

In one embodiment, the method further comprises deriving the pseudo-random bits from the first key or the second key using a hash function.

In one embodiment, interleaving the second key with pseudo-random bits provides a third key (e.g., PUF3); and generating the obfuscated key further comprises concatenating the third key with error correction code bits.

In one embodiment, the computing device is a first computing device, the method further comprising sharing at least one of the initial key, the first key, or the third key with a second computing device, and receiving messages from the second computing device encrypted using the shared at least one of the initial key, the first key, or the third key.

In one embodiment, concatenating the third key with error correction code bits provides a fourth key (e.g., PUF4); and generating the obfuscated key further comprises concatenating the fourth key with one or more copies of the fourth key.

In one embodiment, concatenating the fourth key with one or more copies of the fourth key provides a fifth key (e.g., PUF5); and storing the obfuscated key comprises storing a first copy of the fifth key on at least one of a different row or block of the non-volatile memory than a row or block on which a second copy of the fifth key is stored.

In one embodiment, a system comprises: at least one physical unclonable function (PUF) device (e.g., PUF device 121) configured to provide a first value; a non-volatile memory (e.g., non-volatile storage media 109) configured to store an obfuscated key (e.g., key 635); at least one processor; and memory containing instructions configured to instruct the at least one processor to: generate an initial key based on the first value provided by the at least one PUF device; generate the obfuscated key based on the initial key; and store the obfuscated key in the non-volatile memory.

In one embodiment, the system further comprises a message authentication code (MAC) module (e.g., MAC 123) configured to receive values provided by the at least one PUF device, wherein generating the initial key comprises using the first value as an input to the MAC module to generate the initial key.

In one embodiment, generating the obfuscated key comprises at least one of: concatenating a key with a predetermined pattern of bits; interleaving a first key with an inverted bit pattern of the first key; interleaving a key with pseudo-random bits; concatenating a key with error correction code bits; or concatenating a second key with one or more copies of the second key.

In one embodiment, the stored obfuscated key has an equal number of zero bits and one bits.

In one embodiment, generating the obfuscated key comprises concatenating the initial key with a first pattern of bits.

In one embodiment, concatenating the initial key with the first pattern of bits provides a first key; and generating the obfuscated key further comprises interleaving the first key with a second pattern of bits.

In one embodiment, generating the obfuscated key further comprises interleaving a key with pseudo-random bits.

In one embodiment, generating the obfuscated key further comprises concatenating a key with error correction code bits.

In one embodiment, a non-transitory computer storage medium stores instructions which, when executed on a computing device, cause the computing device to perform a method, the method comprising: generating an initial key using at least one physical unclonable function (PUF); generating an obfuscated key based on the initial key; and storing the obfuscated key in non-volatile memory.

Figure 19:
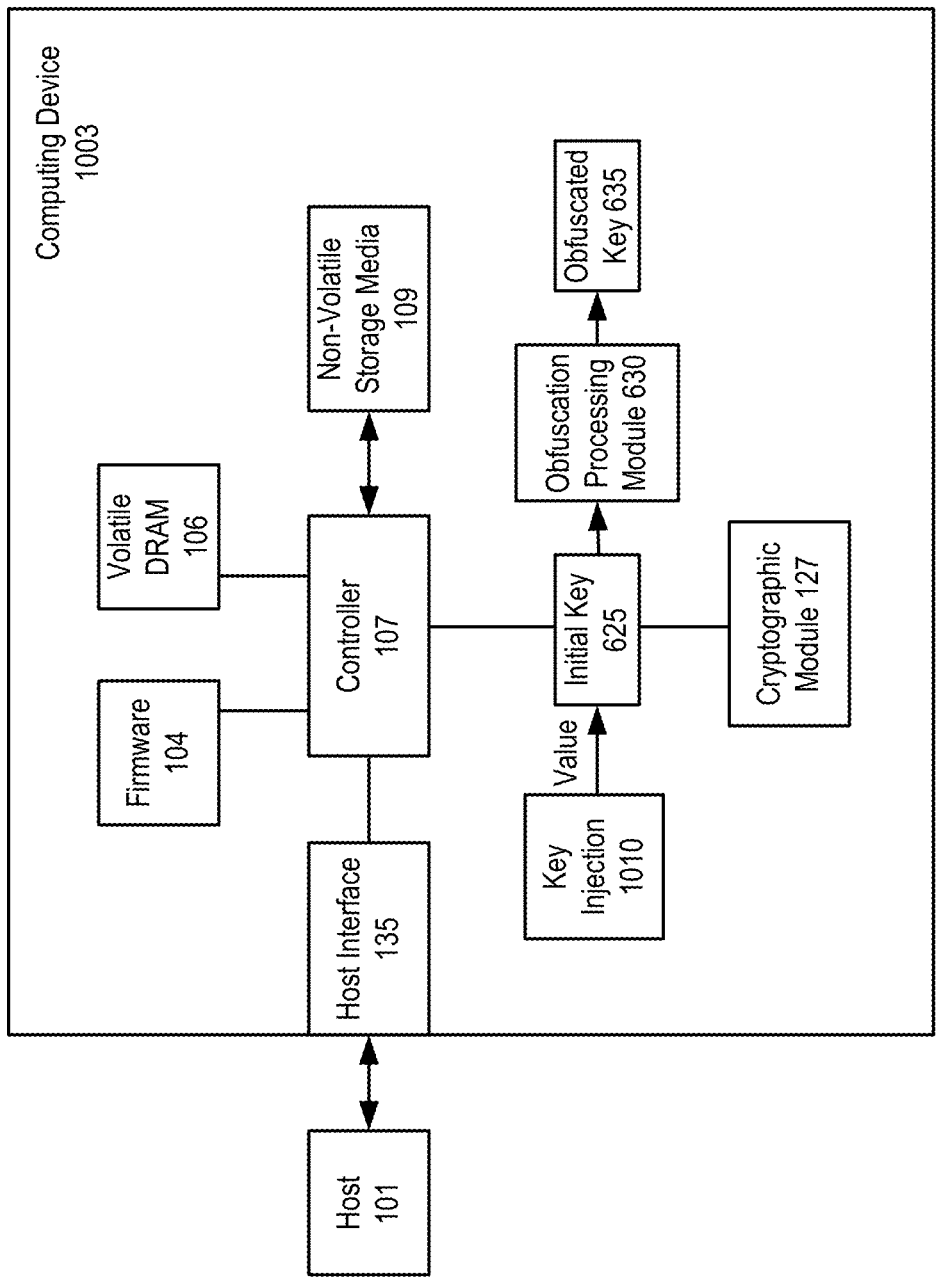
FIG. 19 shows a computing device for generating an initial key based on key injection, obfuscating the initial key, and storing the obfuscated key in non-volatile memory, according to one embodiment.

FIG. 19 shows computing device 1003 used for generating initial key 625 based on key injection 1010, obfuscating the initial key, and storing the obfuscated key in non-volatile memory, according to one embodiment.

In one embodiment, the initial key 625 is generated by using the injected key 1010. For example, initial key 625 is present in a chip by being injected in a factory or other secure environment during manufacture, or other assembly or testing. In one example, the initial key 625 is used as an initial UDS for computing device 1003. The obfuscation can also be applied to the UDS. The UDS is the secret that the DICE-RIoT starts to use to generate the secure generation of keys and certificates. The applying processing to increase obfuscation of the initial key is performed by applying obfuscation processing (via module 630) to the injected key (e.g., the value from key injection 1010). In other embodiments, obfuscation processing can be applied to any other value that may be stored or otherwise present on a chip or die.

Variations of Key Generation and Secure Storage

Various additional non-limiting embodiments are now described below. In one embodiment, after (or during) first power up of a system board, a special sequence is activated to turn on the device containing a cryptographic engine (e.g., cryptographic module 127). The sequence further wakes-up the internal PUF and verifies its functionality, then the PUF generates an initial value PUF0, for instance as described above. The PUF0 value is processed by an on-chip algorithm (e.g., by obfuscation processing module 630) and written in a special region of a non-volatile array (out of the user addressable space). In alternative embodiments, instead of the PUF0 value, an injected key is processed by the on-chip algorithm similarly as described below to provide an obfuscated key for storage.

In one embodiment, obfuscation processing is performed to prevent Vdd (voltage) and/or temperature fault hacker attacks. This processing includes concatenating PUF0 with a well-known pattern (e.g., which contains a fixed amount of 0/1 bits). These bits permit, during the life of the device (e.g., chip) when the PUF value is internally read, determining if the read circuitry is able to properly discriminate 0/1 bits. For example, PUF1=PUF0|| 010101 . . . 01

Next, the result of the above processing (e.g., PUF1) is further embodied with dummy bits (e.g., to avoid Icc hacker analysis). Specifically, for example, the bits of PUF1 are interleaved with an inverted version of PUF1 (i.e., PUF1 bar, which is formed by inverting each bit of PUF1). For example, PUF2=PUF1 interleaved PUF1 bar.

In one embodiment, the rule of interleaving depends on the kind of column decoder (e.g., of a NV non-volatile array) that is present on the chip/device. The device ensures that at each read of the PUF value (from the non-volatile array), the read circuitry processes (in a single shot) the same number of bits from PUF1 and PUF1 bar. This ensures reading the same number of bits at values of 0 and 1, which provides a regular shape in the supply current (Idd).

Next, the bits of PUF2 are further interleaved with pseudo-random bits. In one example, the interleaving depends on the non-volatile array column decoder structure. In one embodiment, the output has the same number of PUF2 bits stuffed with a certain number of pseudo-random bits (e.g., in order to obfuscate an eventual residual correlation that may be present in the PUF2 pattern).

In one embodiment, the pseudo-random bits can be derived from PUF1 or PUF2 by using a hash function. Other alternative approaches can also be used.

In one embodiment, optionally, to reduce or prevent bit loss due to non-volatile aging, the bits of PUF3 are concatenated with error correction code (ECC) bits. In one embodiment, the bits of PUF4 are optionally replicated one or more times (which also extends ECC capabilities). For example, the foregoing may be implemented on a NAND memory. In one example, PUF5=PUF4|| PUF4|| . . . || PUF4

In one embodiment, the value of PUF5 can be written two or more times on different rows and or blocks of a non-volatile memory array.

As a result of the above obfuscation processing, for example, once the final PUF value is written into a non-volatile array block, the value can be used with diminished or no concern about key reliability (e.g., due to noise, or charge loss), or any attempt to infer its value by Idd analysis or forcing its value by Vdd fault attack.

In one embodiment, once obfuscation processing is completed, the PUF circuitry can be disabled. In one embodiment, after disablement, the PUF device can provide values used internally on a device for other purposes (e.g., using a standard read operation inside the non-volatile array).

In one embodiment, key bits are differentiated from random bits when extracting a key from PUF3. For example, internal logic of a device storing a key is aware of the position and method required to return from PUF 5 to a prior or original PUF (e.g., PUF3).

In one embodiment, the bit positions of key bits are known by the device extracting the key. For example, the internal logic of the device can receive one of the intermediate PUF or the final key PUF5, depending on design choice. Then, applying the operation(s) in the reverse order will obtain the original PUF. For example, the processing steps from PUF1 to PUF5 are executed to store the obfuscated PUF in a manner that a hacker would have to both: read the content (e.g., key bits), and also know the operation(s) that were applied in order to get back to and determine the original key.

Generating an Identity for a Computing Device Using a PUF

Various embodiments related to generating an identity for a computing device using a physical unclonable function (PUF) are now described below. The generality of the following description is not limited by the various embodiments described above.

In prior approaches, it is necessary for a manufacturer of a computing device to share one or more secret keys with a customer that purchases the computing device in order to establish an identity for the computing device. However, the sharing of secret keys causes technical problems due to the need for a cumbersome, complex, and expensive secure channel and infrastructure with the customer for sharing the keys. Further, personnel services are required to implement the key sharing. Moreover, the foregoing security needs can increase the risk that security measures can be compromised by a hacker or other unauthorized person.

Various embodiments of the present disclosure discussed below provide a technological solution to the above technical problems. In various embodiments, a computing device generates an identity using one or more PUFs. In one example, the identity is a UDS.

In one embodiment, the generation of identity for the computing device is assigned in an automatic way (e.g., based upon a scheduled time or occurrence of a predetermined event, in response to which a computing device will self-generate a UDS using a PUF). By assigning identity using a PUF, the complexity and expense of identity assignment can be reduced.

After the computing device generates the identity, it can be used to generate a triple of an identifier, a certificate, and a key. In one embodiment, the triple is generated in response to receiving a message from a host device. The host device can use the generated identifier, certificate, and key to verify the identity of the computing device. After the identity is verified, further secure communications by the host device with the computing device can be performed using the key.

In some embodiments, the computing device generates the identity in response to receiving a command from the host device. For example, the command can be a secure replace command that is authenticated by the computing device. After generating the identity, the computing device sends a confirmation message to the host device to confirm that the replacement identity was generated. In one example, the replacement identity is a new UDS that is stored in non-volatile memory and replaces a previously-stored UDS (e.g., a UDS assigned by the original manufacturer of the computing device).

In one embodiment, the identity is a device secret (e.g., a UDS as used in the DICE-RIoT protocol, such as for example discussed above) stored in memory of a computing device. At least one value is provided by one or more PUFs of the computing device. The computing device generates the device secret using a key derivative function (KDF). The value(s) provided by the one or more PUFs is an input(s) to the KDF. The output of the KDF provides the device secret. The output of the KDF is stored in memory of the computing device as the device secret.

In one example, the KDF is a hash. In one example, the KDF is a message authentication code.

In one embodiment, the computing device stores a secret key that is used to communicate with a host device, and the KDF is a message authentication code (MAC). The at least one value provided by one or more PUFs is a first input to the MAC, and the secret key is used as a second input to the MAC.

In some examples, the computing device can be a flash memory device. For example, serial NOR can be used.

Figure 20:
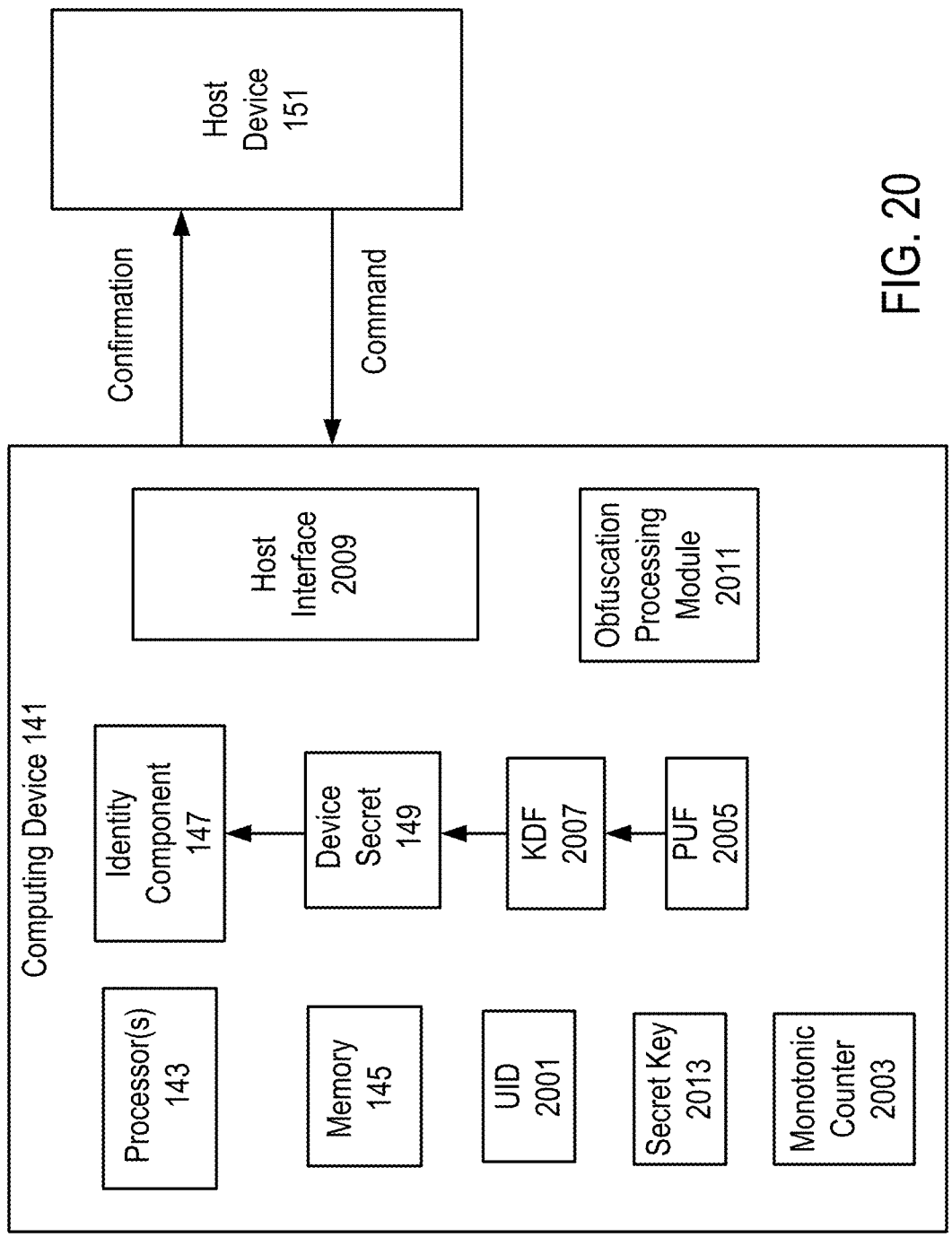
FIG. 20 shows a computing device for generating an identity using a physical unclonable function (PUF), according to one embodiment.

FIG. 20 shows computing device 141 as used for generating an identity (e.g., a UDS for computing device 141) using a physical unclonable function (PUF) 2005, according to one embodiment. More specifically, a value is provided by PUF 2005. This value is provided as an input to key derivative function (KDF) 2007. The output from the KDF is stored as device secret 149.

In one embodiment, device secret 149 is a UDS as used in the DICE-RIoT protocol. Similarly as described above, the UDS can be used as a basis for generating a triple for sending to host device 151. This triple includes a public key that can be used by host device 151 for secure communications with computing device 141.

In one embodiment, the generation of the device secret is performed in response receiving a command from host device 151 via a host interface 2009. In one example, the command is a replace command. In one example, the command is accompanied by a signature signed by the host device 151 using a secret key. After generating the device secret, the confirmation message is sent to host device 151 via host interface 2009.

In one embodiment, computing device 141 stores a secret key 2013. For example, the secret key 2013 can be shared with host device 151. In one example, host device 151 uses the secret key 2013 to sign a signature sent with a replace command.

In one embodiment, KDF 2007 is a message authentication code. The secret key 2013 is used as a key input to KDF 2007 when generating the device secret. The value from PUF 2005 is used as a data input to KDF 2007.

A freshness mechanism is implemented in computing device 141 using a monotonic counter 2003. Monotonic counter 2003 can provide values for use as a freshness in secure communications with host device 151.

A unique identifier (UID) 2001 is stored in memory of computing device 141. For example, UID 2001 is injected at the factory.

In one embodiment, computing device 141 is delivered to a customer with a well-known UDS (e.g., a trivial UDS=0x00000 . . . 000 or similar). The customer uses host device 151 in its factory to request that computing device 141 self-generate a new UDS (e.g., UDS_puf). This step can be done by using an authenticated command. Only a customer or host device that knows the secret key 2013 is able to perform this operation (e.g., the secret key 2013 can be more generally used to manage an authenticated command set supported by computing device 141).

Once the UDS_puf is generated, it is used to replace the original (trivial) UDS. The replacement happens by using an authenticated command. The external host device (the customer) can read the UDS_puf.

The generated UDS_puf can be used to implement the DICE-RIoT protocol. For example, FDS can be calculated using UDS_puf, similarly as described above for identity component 147 and identity component 137. In one example, FDS=HMAC-SHA256 [UDS, SHA256("Identity of L1")].

In addition, a triple (e.g., $K_{L1}$) that includes an identifier, certificate, and key can be generated using UDS_puf, similarly as described for FIG. 1 above. The host device uses the key (e.g., $K_{L1}$public) for trusted communications with computing device 141.

In one embodiment, the identity generation mechanism above can be automatically executed by the computing device (e.g., an application board including a processor) at first use of the application board, or in the field once a scheduled or predetermined event occurs (e.g., as scheduled/determined by the customer and stored in memory 145 as a configuration of the computing device such as an update, etc.).

In one embodiment, self-identity generation is performed as follows: A configurator host device (e.g., a laptop with software) is connected to a computing device coupled to an autonomous vehicle bus (e.g., using a secure over-the-air interface, etc.). The host device uses authenticated commands to request that the computing device self-generate a UDS (e.g., $UDS_{PUF}$). The authentication is based on secret key 2013 (e.g., the secret key can be injected by a manufacturer and provided to the customer with a secure infrastructure).

The authenticated command execution is confirmed with an authenticated response (e.g., "Confirmation" as illustrated in FIG. 20). At the end of $UDS_{PUF}$ generation, the host device is informed about the $UDS_{PUF}$ generated by using a secure protocol (e.g., by sending over a secure wired and/or wireless network(s) using a freshness provided by the monotonic counter 2003).

In one embodiment, host interface 2009 is a command interface that supports authenticated and replay protected commands. In one embodiment, the authentication is based on a secret key (e.g., secret key 2013) and uses a MAC algorithm (e.g., HMAC). In one example, an identity generation command is received from host device 151 that includes a signature based on a command opcode, command parameters, and a freshness. In one example, the signature=MAC (opcode|parameters|freshness, secret key).

In one embodiment, computing device 141 provides an identity generation confirmation including a signature. In one example, the signature=MAC (command result|freshness, secret key).

In one embodiment, the secret key 2013 is injected in the factory. In one example, the secret key can be symmetric (e.g., based on HMAC-SHA256). In another example, the secret key can use an asymmetric scheme (e.g., ECDSA).

The device secret 149 (e.g., $UDS_{PUF}$) can be generated using various options. For example, once the generation flow is activated, by using the proper authenticated and replay protected command, the $UDS_{PUF}$ is generated according to a command option selected as follows:

Option #1: the at least one value from a PUF pattern (sometimes referred to as "PUF RAW") (also sometimes denoted as $UDS_{RAW}$) is read, and provided to KDF 2007 (key derivative function) (e.g., a SHA256). The result of such process is the final key. So: $UDS_{PUF}=KDF\ (UDS_{RAW})$ Option #2: the PUF RAW pattern ($UDS_{RAW}$) is read and the $UDS_{PUF}$ is calculated as: $UDS_{PUF}=KDF\ (UDS_{RAW}|UID)$ where UID is a public unique ID assigned to all the devices (in some cases, the UID can also be assigned to non-secure devices). In one embodiment, UID 2001 is used as the input to the KDF.

Option #3: the PUF RAW pattern ($UDS_{RAW}$) is read and the $UDS_{PUF}$ is calculated as: $UDS_{PUF}=KDF\ (UDS_{RAW}|UID|HASH\ (user\ pattern))$ where the user pattern is provided by the host in the command payload that requests self identity generation.

Option #4: the PUF RAW pattern ($UDS_{RAW}$) is read and the $UDS_{PUF}$ is calculated as: $UDS_{PUF}=KDF\ (UDS_{RAW}|UID|HASH\ (user\ pattern)\ freshness)$ where the freshness is, for example, the freshness provided in the command payload.

More generally, the UDS is calculated as $UDS_{PUF}=KDF$ [(info provided by the host device|info present in the device)]. The KDF function can be used as a simple HASH function (e.g., SHA256), or a MAC function (e.g., HMAC-SHA256), which uses a secret key.

In one example, when a MAC function is used as the KDF, the secret key used is the same key used to provide the authenticated commands. The device secret (e.g., UDS) can be generated using one of the options as follows:

Option #5: $UDS_{PUF}=MAC\ [Secret\_Key, (UDS_{RAW})]$
Option #6: $UDS_{PUF}=MAC\ [Secret\_Key, (UDS_{RAW}\ UID)]$
Option #7: $UDS_{PUF}=MAC\ [Secret\_Key, (UDS_{RAW}\ UID\ HASH\ (user\ pattern))]$
Option #8: $UDS_{PUF}=MAC\ [Secret\_Key, (UDS_{RAW}\ UID\ HASH\ (user\ pattern)\ freshness)]$ More generally, $UDS_{PUF}=MAC$ [Secret Key, (info provided by host|info present in the device)]

As mentioned above, the $UDS_{PUF}$ can be communicated to the host device 151 after being generated. In one embodiment, the host device 151 can directly read the $UDS_{PUF}$. The $UDS_{PUF}$ can be read only a predetermined number of times (e.g., just once or a few times). In one example, the process as described for FIG. 21 below can be used. After reading the $UDS_{PUF}$ the predetermined number of times, the read mechanism is permanently disabled. For example, this approach can be used in a secure environment (e.g., a customer's factory when assembling a computing system or other product using computing device 141).

In one example, the $UDS_{PUF}$ is encrypted by computing device 141 using a public key received from host device 151, and then the $UDS_{PUF}$ is sent to host device 151. After this procedure, the $UDS_{PUF}$ read mechanism is permanently disabled.

In another embodiment, computing device 141 includes obfuscation processing module 2011. Obfuscation processing module 2011 is an example of obfuscation processing module 630 of FIG. 15, or obfuscation processing module 630 of FIG. 19.

In one embodiment, the $UDS_{PUF}$ is encrypted with the host public key and communicated to the host device; the host device uses its corresponding secret key to decrypt it. The host public key is communicated to the computing device 141 during a specific communication setup phase. In one embodiment, the sharing of the $UDS_{PUF}$ can be done by a direct read operation by using an authenticated command, and after a predetermined number of reads (e.g., normally just one), such read operation is disabled forever. The computing device 141 stores the UDS key in an anti-tamper area. At each usage of the UDS key also for internal (computing device) use, an obfuscation mechanism is used to avoid information leakage (e.g., by avoiding any chance of a hacker to guess the stored UDS key, such as by the hacker analyzing either the current or the voltage wave profile). For example, the obfuscation mechanism used can be as described above for FIGS. 15, 18, 19.

In one embodiment, computing device 141 obfuscates the device secret prior to sending the encrypted device secret to the host device 151.

Figure 21:
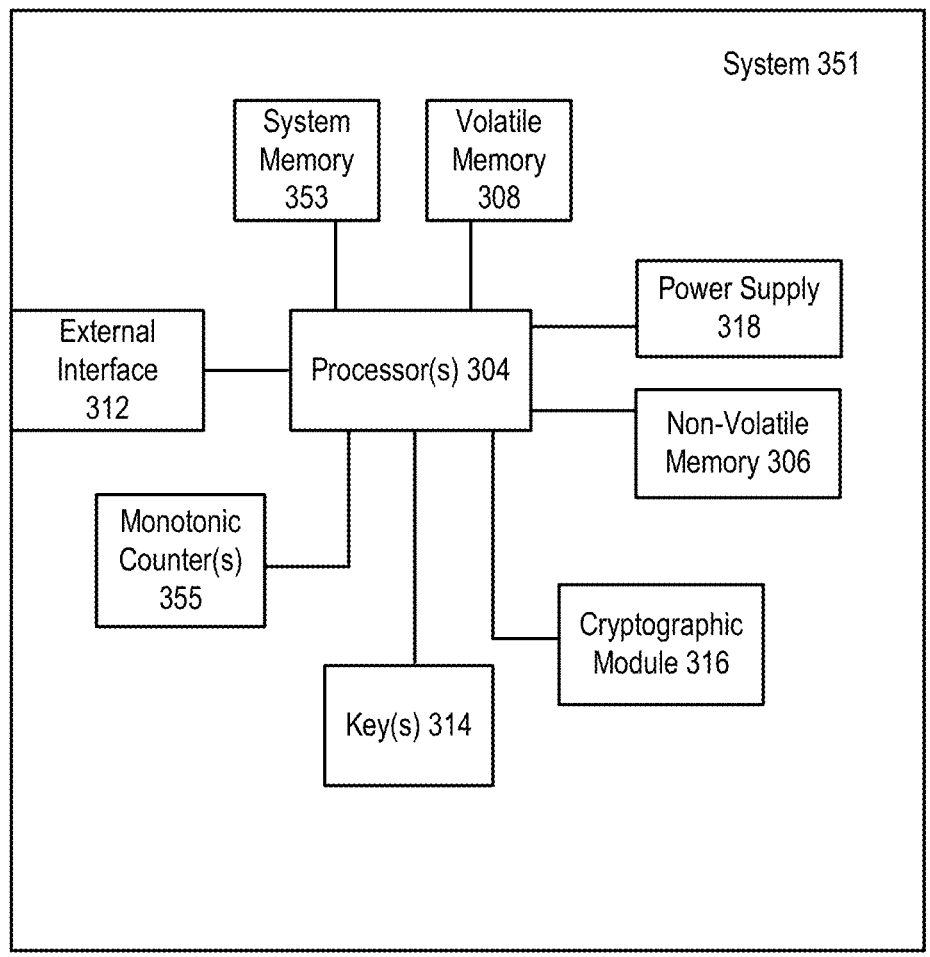
FIG. 21 shows a system that sends an initial value provided by a monotonic counter of the system for use in determining whether tampering with the system has occurred, according to one embodiment.

FIG. 21 shows a system that sends an initial value provided by a monotonic counter of the system for use in determining whether tampering with the system has occurred, according to one embodiment. In one example, the system is computing device 141 of FIG. 20.

In some embodiments, the system uses a secret key for secure communication with other devices (e.g., host device 151). The secret key is generated and stored on the system (e.g., by key injection at the factory after initial assembly of a system board). A monotonic counter of the system is used to provide an initial value.

In another embodiment, the secret key is a UDS used with the DICE-RIoT protocol. The secret key is generated in response to a command from a host device (e.g., host device 151).

In one embodiment, the initial value is sent by electronic communication to an intended recipient of the physical system (e.g., the recipient will receive the physical system after it is physically transported to the recipient's location). After receiving the system, the recipient reads an output value from the monotonic counter. The recipient (e.g., using a computing device or server of the recipient that earlier received the initial value) compares the initial value and the output value to determine whether tampering has occurred with the system. In one example, the tampering is an unauthorized attempt by an intruder to access the secret key of the system during its physical transport.

In one embodiment, a secret key can be generated, for instance, using a true RNG (random number generator) or a PUF, or previously injected in the system (memory) in a secure environment like a factory.

In one embodiment, the generated key is associated with the initial value of the monotonic counter. The initial value is used by a recipient of the system to determine whether an unauthorized attempt has been made to access the stored key. In one embodiment, a key injection process can use an output from a physical unclonable function (PUF) to generate the key for every power-on cycle of a computing device that stores the key.

More specifically, FIG. 21 shows a system 351 that sends an initial value provided by a monotonic counter 355 for use in determining whether tampering with system 351 has occurred, according to one embodiment. For example, it can be determined whether system 351 has been tampered with by a hacker seeking unauthorized access to a stored key during physical transport of system 351. In one example, system 351 is a system board that includes non-volatile memory 306, processor(s) 304, monotonic counter(s) 355, and power supply 318.

One or more keys 314 are generated under control of processor 304. Nonvolatile memory 306 is used to store the generated keys. Nonvolatile memory 306 is, for example, a non-volatile memory device (e.g., 3D cross point storage)

Monotonic counter 355 is initialized to provide an initial value. This initial value is associated with the stored key 314. The initial value is sent by a processor 304 via external interface 312 to another computing device. For example, the initial value can be sent to a server of the receiver to which system 351 will be shipped after manufacture and key injection is completed.

When system 351 is received by the receiver, a computing device of the receiver determines the initial value. For example, the computing device can store in memory the initial value received when sent as described above. The computing device reads an output value from the monotonic counter 355. This output value is compared to the initial value to determine whether there has been tampering with the system 351.

In one embodiment, the computing device of the receiver determines a number of events that have occurred that cause the monotonic counter 355 to increment. For example, the output values from monotonic counter 355 can be configured to increment on each power-on operation of system 351 (e.g., as detected by monitoring power supply 318). The output values from monotonic counter 355 can be additionally and/or alternatively configured to increment on each attempt to perform a read access of the stored key 314.

By keeping track, for example, of the number of known events that cause the monotonic counter to increment, the initial value received from the sender can be adjusted based on this number of known events. Then, the adjusted initial value is compared to the output value read from monotonic counter 355. If the values match, then no tampering has occurred. If the values do not match, the computing device determines that tampering has been detected.

In response to determining that tampering has been detected, one or more functions of system 351 can be disabled. In one embodiment, processor 304 receives a communication from the computing device of the receiver that includes an indication that tampering has been detected. In response receiving the communication, processor 304 disables at least one function of system 351. In one example, the function disabled is read access to the stored key 314.

In one embodiment, system 351 can be configured so that a counter value output from monotonic counter 355 cannot exceed a predetermined maximum value. For example, when each counter value is read from monotonic counter 355, a determination is made whether the counter value exceeds a predetermined maximum value. If the counter value exceeds the predetermined maximum value, read access to stored key 314 can be permanently disabled (e.g., under control of processor 304).

In one embodiment, system 351 is embodied on a semiconductor die. In another embodiment, system 351 is formed on a system board. An application is stored in system memory 353 and executed by processor 304. Execution of the application occurs after power-on of the system 351. For example, the receiver of the system 351 can execute the application after determining that no tampering has occurred with the system.

In one embodiment, key 314 is generated using an output value from one or more physical unclonable functions (PUFs). For example, the keys are generated for each power-on cycle of system 351. In another example, key 314 is a UDS generated in response to a replace command from a host device received via external interface 312.

In one embodiment, system 351 is a controller that stores key 314. The external interface 312 is used to send an initial value from monotonic counter 355 to an external nonvolatile memory device (not shown) on the same system board as the controller. The external non-volatile memory device determines whether tampering has occurred by reading an output value from monotonic counter 355 and comparing the output value to the initial value received from system 351.

In one embodiment, system memory 353 includes volatile memory 308 and/or non-volatile memory 306. Cryptographic module 316 is used to perform cryptographic operations for secure communications over external interface 312 using keys 314 (e.g., symmetric keys).

Secret key sharing is now described in various further embodiments. A secure communication channel is setup by key sharing between the actors that participate in the communication. Components that are used in a trusted platform module board often do not have sufficient processing capability to implement schemes such as, for example, public key cryptography.

In one embodiment, one or more secret keys are shared between a device/board manufacturer and the OEM/final customers. Also, keys can be shared as needed between different devices in the same board in the field. One or more monotonic counters are used inside the secure device, as was discussed above.

In one example, before a device leaves the factory or the manufacturer testing line, one or more secret keys are injected inside the device (e.g., one or more secret keys as follows: Secret_Keykwith k=1, . . . , N), depending on the device capability and user needs.

One or more monotonic counters are initialized (N (N≥1) different MTCs $MTC_k=0$), depending on the device capability and user needs. The monotonic counters (MTCs) are configured to increment the output value any time the power-on of the system/device occurs and any time the stored secret key is (attempted) to be read.

The value of each $MTC_k$ can be public and shared with the customer (e.g., as $MTC_k$). A command sequence (e.g., as arbitrarily determined by the system designer) is used to read the key from the device, and the command sequence can be public (e.g., the strength of the method is not based on secrecy of read protocol).

In one embodiment, it is not required to use a dedicated MTC for each secret key. This can vary depending on the type of security service being used. For example, some keys can be read together, and they only need a single MTC.

In one embodiment, after arrival of the system at the receiver (e.g., customer/user) location, several operations are performed. A computing device of the receiver first determines the initial value(s) of the monotonic counter(s) 355. For example, the values of $MTC_k=(MTC_0)_k$ are retrieved (e.g., the initial values written and sent at the moment that the device leaves the factory). The $MTC_k$ values may be different for each MTC or associated key.

Then, the receiver customer/user powers on the system 351. The first addressed operation is the read of the $MTC_k$ values. If each $MTC_k$ value matches with the expected (received) initial value [e.g., $MTC_k=(MTC_0+1)_k$], then the device is determined as not having been powered on during physical shipping or other transfer, and the system 351 is considered authentic (and not tampered) by the end user/customer.

If one or more values do not match, then tampering has occurred. For example, an unauthorized person powered-up the device and attempted to read the stored keys. If tampering has occurred, the device is discarded and the indication of tampering communicated to the sender (e.g., transfer company) to avoid further technical security problems.

In another embodiment, multiple read operations are performed by the receiver of the system 351. For example, the device leaves the factory and arrives at the customer/OEM. The customer reads one or more keys and the related $MTC_k$ are incremented by one. If the $MTC_j$ incremented exceeds the value preset ($MTC_{j\ MAX}$) by the silicon factory (sender), the read of the key ($Secret\_Key_j$) is permanently disabled.

In this example, the $MTC_{j\ MAX}$ is a predetermined maximum value agreed with by the sender and customer for each MTC. This methodology allows one or more attempts of key reading after/before reading of the MTC value can be checked or performed. This permits, for example, discovery of any un-authorized access and also at the same time ensures that the OEM/customer has a few times to perform reading of the keys before disablement.

If during the read process, one or more MTCs has an unexpected value (e.g., the initial value and read value do not match after adjustments for the number of known read and power-on operations), the device is discarded. In one embodiment, once all the keys are read, the related $MTC_k$ are cleaned-up and can be re-used for other purposes (e.g., cryptographic processing functions, etc., as configured and desired by the system designer).

In another example, device/board usage is monitored. This example uses monotonic counters that are already present on a secure device (e.g., present for use by cryptographic module 316). Before the device leaves the silicon factory, on the testing line the following is performed: Initialize M (M≥1) different MTC $MTC_k=0$. Such MTC counters are incremented at each power-up of the device. Each counter can be initialized to zero (or to another initial value, if desired).

The receiver end user can use the received $MTC_k$ values to obtain various information regarding system 351 such as, for example: detection of unauthorized use of component/board, determining that a component has been desoldered and used outside the board to hack it, power cycle count to implement a fee mechanism based on a customer's services, device board warranty policies, and power loss.

In one embodiment, implementing the fee mechanism involves associating a value to a specific usage. An application can be provided to a customer, and the customer must pay a fee to unlock the specific usage.

In one embodiment, a secret key is shared between different devices on the same system board (e.g., shared in the field when being used by an end user). The key is shared by exchange between components on the same board (e.g., between processors).

In one embodiment, each of one or more monotonic counters (MTCk) is initialized by setting its initial value to zero. In one example, when setting MTCk=0, the MTCk is a counter associated with a specific key, indicated by the number k. MTCk=0 indicates that the initial value of the counter is zero. Each k indicates one of the counter numbers, which corresponds to the number of internal keys stored in the device. The value of each counter is stored in a non-volatile memory area of the device.

In one embodiment, a power-on (sometimes also referred to as a power-up) of the device is detected. The device includes internal circuitry to measure a value of the power supply. When the power supply exceeds a certain threshold, the circuitry triggers an internal signal to indicate the presence (detection) of the power-on event. This signal can cause incrementing of the monotonic counters.

In one embodiment, an attempt to read the secret key is detected. The counters (MTCk) are incremented each time that the power is detected (as mentioned above), and further each time that a command sequence to read the key is recognized by the device interface. Knowing the initial MTCk values, when the shipping of the device is done, permits the final receiver (e.g., end user/customer) of the device to know the device (and counter) status. So, if during transit, there was an attempt to power-on and/or read the device, this generates a variation in the counter value stored in each MTCk.

In one embodiment, a command sequence is used to read the key from the device. For example, the device has an external interface, that accepts commands from other computing components or devices. The key is available for reading until a maximum counter value is reached. In one example, the device has a sequence at the interface: Command (e.g., 0x9b)+Argument (0x34)+signature. The device understands that the key is to be read and provided at the output.

In one embodiment, after testing of the device (e.g., at the initial factory), the MTCk for each key will have an initial value from initialization. So, for example, if k=3, then: MTC0=20d, MTC1=25d, MTC2=10. The values MTC0, MTC1, MTC2 are sent/transmitted to the customer, as a set of initial values. When the device is received by customer, the customer uses a command sequence, to read the values. The customer (e.g., using a computing device) then determines if the device was compromised during the shipping. In one example, the monotonic counter values are read using the command sequence that was described above.

In one embodiment, a predetermined maximum counter value is preset. For example, the maximum value preset can be selected based on customer procedures. For example, assume that the customer wants to read the key 10 times. Also, assume that the MTCk are incrementing only when the power is turned on, and assume that there are two counters, MTC0 (associated with the power-on only) and MTC1 (associated with the key read command procedure only). After the factory testing, based on monitoring the MTC0 and MTC1 values, it is found: MTC0=30, MTC1=25. In one example, the internal threshold is set at 40 for MTC0 and at 35 for MTC1.

In one embodiment, the MTC associated with a key increments with power up and an attempt to read the key. Each time that one of the two events happen, the MTC increments.

In one embodiment, the monotonic counters are cleaned up after final reading of the stored keys (and optionally can be re-used for other processing on the device). The system designer can configure this as desired. Final reading is, for example, when the purpose of the MTC counting, as a detector of a malicious event, is no longer needed. This releases the counters as resources, which can be used for other purposes, or the counters can remain to count.

In one embodiment, the monotonic counter can be used to get various types of information such as a component being de-soldered, implementing a fee mechanism, implementing a warranty, etc. The counters can be used to monitor different types of occurrences because the incrementing of the counter value can be externally triggered.

In one embodiment, a multiple key read option is provided. In one example, for initialization of the MTC values (for MTCk associated with keys), the maximum thresholds are set to allow the read of each key by the receiver of the component and/or the final user. The multiple read option allows changing the threshold according to the maximum number of attempts to read a particular key (which may differ for each key).

In one embodiment, various types of devices can use the above methods. For example, a CPU or MCU typically has an internal hardware security module that is not accessible by outside access. In one example, there is a need to have the same keys (e.g., when a symmetric key approach is used)

stored in devices or components in order to operate correctly. In such case, the CPU/MCU benefits from the distribution/sharing of the key to an authorized entity, device, or component. This sharing allows reading of the key (e.g., this sharing corresponds to the programming of a value in the MTCk threshold).

In one embodiment, the above methods are used for customer firmware injection. For example, the above methods allow storing critical content inside a device (e.g., application firmware) and implementing movement of the device in an un-secured environment (without compromising the integrity of the firmware/device). In one example, for firmware injection, an unexpected change of the MTCk counter value during transport is used as an index to indicate that firmware compromise has occurred.

Figure 22:
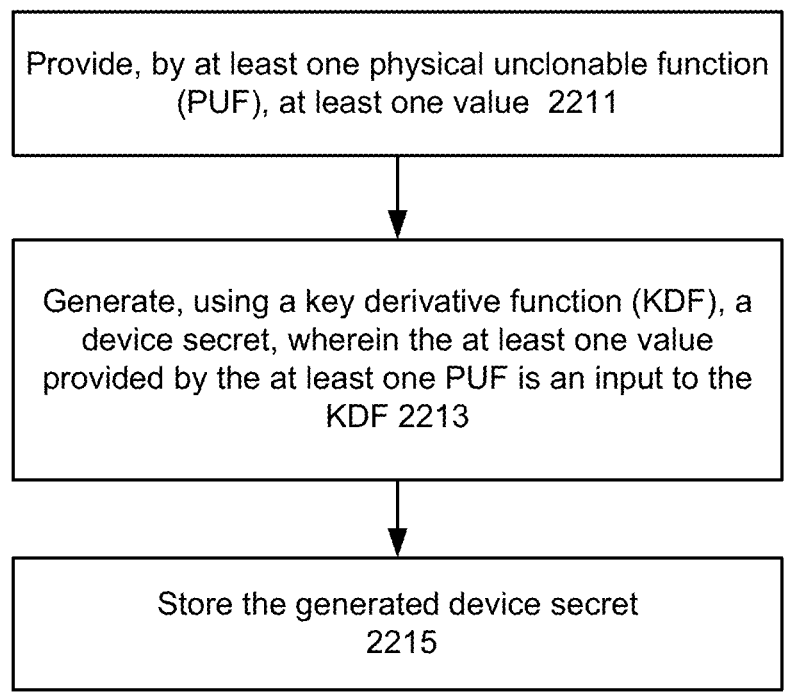
FIG. 22 shows a method for generating an identity for a computing device using a physical unclonable function (PUF), according to one embodiment.

FIG. 22 shows a method for generating an identity for a computing device using a physical unclonable function (PUF), according to one embodiment. For example, the method of FIG. 22 can be implemented in the system of FIG. 20.

The method of FIG. 22 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 22 is performed at least in part by processor 143 of FIG. 20.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 2211, at least one value is provided by at least one physical unclonable function (PUF). For example, PUF 2005 provides a value as an output.

At block 2213, a device secret is generated using a key derivative function (KDF). The at least one value provided by the at least one PUF is used as an input to the KDF. For example, the output from PUF 2005 is used as an input to KDF 2007.

At block 2215, the generated device secret is stored. For example, KDF 2007 generates an output that is stored as device secret 149.

In one embodiment, a method comprises: generating, by a computing device, a device secret (e.g., a UDS stored as device secret 149), the generating comprising: providing, by at least one physical unclonable function (PUF), at least one value; and generating, using a key derivative function (e.g., KDF 2007), the device secret, wherein the at least one value provided by the at least one PUF is an input to the KDF; and storing, in memory of the computing device, the generated device secret.

In one embodiment, storing the generated device secret comprises replacing a previously-stored device secret in the memory with the generated device secret.

In one embodiment, the KDF is a hash, or a message authentication code.

In one embodiment, the method further comprises storing a secret key used to communicate with a host device, wherein the KDF is a message authentication code (MAC), the at least one value provided by the at least one PUF is a first input to the MAC, and the secret key is a second input to the MAC.

In one embodiment, the device secret is generated in response to an event, and the event is receiving, by the computing device, of a command from a host device.

In one embodiment, the method further comprises receiving a host public key from the host device, encrypting the generated device secret using the host public key, and sending the encrypted device secret to the host device.

In one embodiment, the method further comprises after sending the encrypted device secret to the host device, permanently disabling read access to the device secret in the memory.

In one embodiment, the method further comprises obfuscating the device secret prior to sending the encrypted device secret to the host device.

In one embodiment, the method further comprises storing, by the computing device in memory, a secret key (e.g., secret key 2013), wherein the command is authenticated, by the computing device, using a message authentication code (MAC), and the secret key is used as an input to the MAC.

In one embodiment, the host device sends a signature for authenticating the command, the signature is generated using the MAC, and a freshness, generated by the host device, is used as an input to the MAC.

In one embodiment, the freshness is an additional input to the KDF.

In one embodiment, the host device provides a user pattern with the command, and wherein a hash of the user pattern is an additional input to the KDF.

In one embodiment, the method further comprises authenticating, by the computing device, the command prior to generating the device secret.

In one embodiment, the method further comprises storing a unique identifier of the computing device, wherein the unique identifier is an additional input to the KDF.

In one embodiment, the device secret is generated in response to an event, and the event is detection, by the computing device, of usage of a computing system.

In one embodiment, usage is execution of an application by the computing system. In one embodiment, the usage is initiation of a boot loading process.

In one embodiment, the device secret is generated in response to an event, and the event is a time-scheduled event.

In one embodiment, a system comprises: at least one processor; and memory containing instructions configured to instruct the at least one processor to: generate a device secret, the generating comprising: providing, by at least one physical unclonable function (PUF), at least one value; and generating, using a key derivative function (KDF), the device secret, wherein the at least one value provided by the at least one PUF is an input to the KDF; and store, in memory of the computing device, the generated device secret.

In one embodiment, the instructions are further configured to instruct the at least one processor to: receive a replace command from a host device; and send, to the host device, a public identifier generated using the generated device secret; wherein the device secret is generated in response to receiving the replace command; wherein storing the generated device secret comprises replacing a previously-stored device secret with the generated device secret.

In one embodiment, a non-transitory computer storage medium stores instructions which, when executed on a computing device, cause the computing device to at least:

provide, by at least one physical unclonable function (PUF), at least one value; generate, using a key derivative function (KDF), a device secret, wherein the at least one value provided by the at least one PUF is an input to the KDF; and store, in memory, the generated device secret.

Assigning and Verifying Identity for a Vehicle

Various embodiments related to assigning and verifying the identity of a vehicle are now described below. In various embodiments, an identity is assigned to a first vehicle (e.g., an emergency vehicle), and a second vehicle verifies the identity of the first vehicle. For example, the identity can be assigned based on a replace command received by a computing device (e.g., computing device 141 of FIG. 1) of the first vehicle from a host device (e.g., host device 151 of FIG. 1).

For example, the identity can be verified by the second vehicle using a verification method based on a triple provided by the first vehicle. This verification method is performed similarly as done by host device 151 using a triple received from computing device 141. The first vehicle can be a vehicle associated with a state of operation and/or a class of vehicles (e.g., the first vehicle can be a member of a fleet of vehicles owned by a particular entity). The generality of the following description is not limited by the various embodiments described above.

In prior approaches, the identity of a vehicle as being an emergency vehicle, a police vehicle, or another vehicle having a special status has been indicated by manual approaches and/or approaches that are isolated to the emergency vehicle in that the identity is not communicated electronically outside of the vehicle. For example, a flashing red light or other emergency indicator is activated to indicate that a vehicle is an emergency vehicle in a state of emergency operation. However, this emergency state is not communicated outside of the vehicle in any manner.

The foregoing creates technical problems in identifying the vehicle and/or a state of the vehicle. For example, other vehicles are not able to readily determine the emergency identity or state of the emergency vehicle. For example, other vehicles must rely on visual observation to determine the identity and/or state of the emergency vehicle. This can cause can delay in other vehicles taking appropriate response or reaction to the emergency vehicle. For example, other vehicles are slow to respond in moving aside to let the emergency vehicle pass more quickly.

In addition, for vehicles that are driven autonomously, is desired for safe traffic management that autonomous vehicles have a capability to recognize a particular class of vehicles. This is in part so that the autonomous vehicle can take appropriate responsive action when a certain class a vehicle is present. The class of vehicles can include emergency vehicles such as police, firefighter, and ambulance vehicles. Other classes of vehicles can include public-service vehicles such as taxis and buses. Yet other classes of vehicles can include vehicles in a private or company fleet. The failure of an autonomous vehicle to recognize the proper class of another vehicle can lead to inappropriate traffic navigation responses, which may cause an accident or other harm.

Moreover, a lack of a secure identity mechanism can permit hacker attacks such as vehicle cloning, man in the middle attacks, and replay attacks. These can lead to compromise of the secure and safe operation of autonomous vehicles.

Various embodiments of the present disclosure discussed below provide a technological solution to the above technical problems regarding assigning and verifying identity of an emergency vehicle. In various embodiments, a computing device (e.g., computing device 141) generates an identity for a vehicle, and permits the vehicle to be verified by other vehicles. The identity corresponds to a class of vehicle. In one example, the identity is a unique device secret (a UDS) as used for the DICE-RIoT protocol, as described above.

In one embodiment, a public or private organization or entity customizes the identity of a fleet of vehicles (e.g., the identity corresponds to a class of vehicle). This is done by sending authenticated commands (e.g., a replace command as discussed above) to each vehicle. The command causes the vehicle to assign a UDS provided by a host device, or to generate an updated UDS (e.g., using a PUF on a computing device of the vehicle, as described above). The UDS is then used by other nearby vehicles to verify the identity of the identity-customized vehicle during operation.

In one embodiment, each nearby vehicle receives one or more certificates and keys from the "emergency" vehicle. For purposes of exemplary discussion, an emergency vehicle is described and illustrated below. However, the embodiments below are not limited to use with only an emergency vehicle. Instead, these embodiments can be used with other types of vehicles. Further, the vehicles can be land, air, and/or water-based vehicles (e.g., drones, boats, airplanes, etc.).

In one embodiment, a nearby vehicle has a computing device that includes a verification component used to verify the identity of the emergency vehicle. In one example, the verification component is verification component 153 of FIG. 1. In one example, the nearby vehicle receives a certificate and public key as part of a triple generated using the DICE-RIoT protocol, such as described above. The nearby vehicle validates the presence of the emergency/police/other vehicle, which allows the secure exchange of communications with the emergency vehicle (e.g., insurance coordinates, license plate data, etc.). An advantage is that this secure wireless communication allows the nearby vehicle to recognize the emergency vehicle without seeing the plate, etc., of the emergency vehicle. In the case of a non-autonomous vehicle, the communication with the emergency vehicle can be communicated to the driver using other methods (e.g., presenting an alert on a display, and/or using in-vehicle entertainment system, cluster, etc.).

In one embodiment, the emergency vehicle and all nearby vehicles have a computing device that supports identity assignment and verification using the DICE-RIoT protocol. Each vehicle with such identity equipment can be customized by a public authority or a private company to become part of a fleet (e.g., a fleet of emergency vehicles, taxis, etc.).

The computing device in each vehicle can be originally manufactured with a $UDS_{generic}$, for example as described above. An owner of the vehicle can customize the vehicle using its computing device by replacing the UDS by using authenticated and replay protected commands (e.g., a replace command as described above in various embodiments). One advantage is that because the component has the capability to prove its identity, there is no risk of component replacement.

In one embodiment, the $UDS_{generic}$ replacement allows a public authority to inject its secret UDS (e.g., $UDS_{police\ department}$, $UDS_{fire\ fighter}$). This UDS is used to generate one or more public certificates that can be recognized by the public (including other vehicles). This permits the public authority and/or other vehicles to implement a security service by communicating with the vehicles in a secure way. In one example, the generated certificate is part of a triple generated using a UDS and identity component 147 as discussed for FIG. 1 above.

In one example, a private companies can inject its secret UDS to recognize the vehicles of its own fleet, and to implement secure wireless communication with the vehicles. Vehicles can include, for example, taxis, buses, ships, drones, etc.

Communications with vehicles by a central server of a public or private authority can be performed by any kind of communication system wired or wireless (e.g., Wi-Fi, 3G-5G cellular, Bluetooth, etc.), optical wireless communication (OWC), etc.

Figure 23:
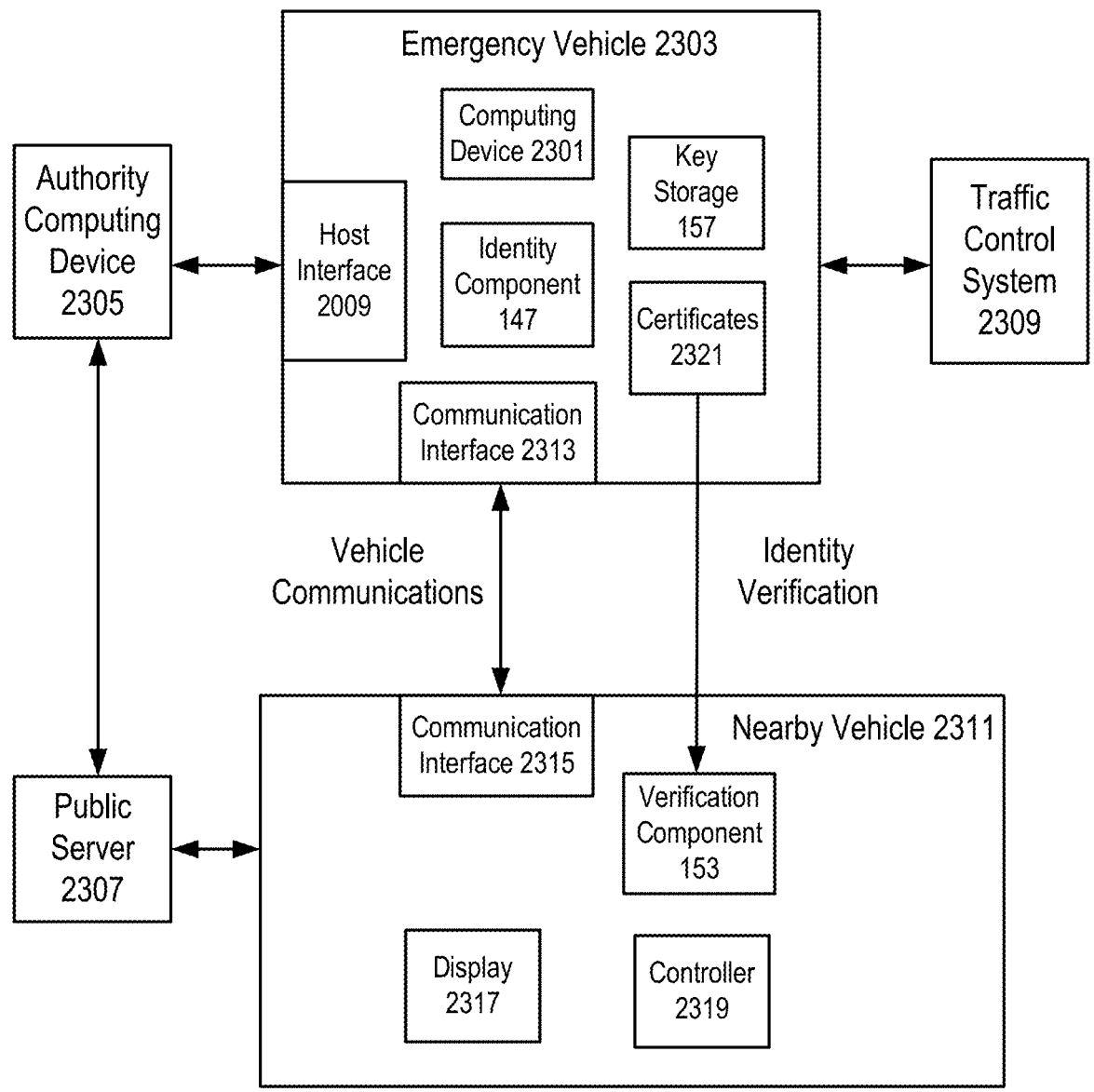
FIG. 23 shows a nearby vehicle verifying the identity of an emergency vehicle using one or more certificates, according to one embodiment.

FIG. 23 shows a nearby vehicle 2311 verifying the identity of an emergency vehicle 2303 using one or more certificates 2321, according to one embodiment. The identity of emergency vehicle 2303 has been previously assigned by authority computing device 2305. In one example, authority computing device 2305 sends a replace command to the computing device 2301 via host interface 2009.

In response to receiving a replace command, computing device 2301 stores a new device secret in memory of computing device 2301 and/or emergency vehicle 2303. Identity component 147 uses the new device secret to generate a certificate, which is stored as part of certificates 2321. In one example, identity component 147 generates a triple that includes the certificate. The generated triple also includes public keys that are stored in key storage 157.

In one embodiment, nearby vehicle 2311 is an autonomous vehicle that detects the presence of emergency vehicle 2303 in a nearby proximity (e.g., within a distance of 500 meters or less, or 50 meters or less, or 5 meters or less). In response to detecting the presence of the emergency vehicle 2303, nearby vehicle 2311 sends a communication to request an identity. In response to this request, one or more certificates 2321 are communicated to verification component 153 of nearby vehicle 2311. In one example, verification component 153 receives a triple, as discussed above for the DICE-RIoT protocol.

Verification component 153 verifies the identity of emergency vehicle 2303. In one example, the identity is assigned and then verified using the approach as described for FIGS. 5-7 and 9 above.

In one embodiment, after verifying the identity of emergency vehicle 2303, nearby vehicle 2311 can determine a class of vehicle associated with the identity. For example, the nearby vehicle 2311 may determine that the class corresponds to an emergency vehicle. In one embodiment, nearby vehicle 2311 can communicate with a public server 2307 that maintains a public database of public identifiers and corresponding classes. In one embodiment, authority computing device 2305 sends an update communication to public server 2307 each time that emergency vehicle 2303 is assigned a new identity via host interface 2009.

In other embodiments, emergency vehicle 2303 also communicates with traffic control infrastructure. For example, a traffic control system 2309 can detect a proximate presence of emergency vehicle 2303 (e.g., similarly as above for nearby vehicle 2311) and request an identity similarly as described above for nearby vehicle 2311. In response to verifying identity of emergency vehicle 2303, traffic control system 2309 can change state in order to permit free passage of the emergency vehicle 2303. For example, traffic control system 2309 can change a traffic control light from red to green to permit passage of the emergency vehicle.

After nearby vehicle 2311 has verified the identity of emergency vehicle 2303, nearby vehicle 2311 can use a public key received from emergency vehicle 2303 as part of a triple in order to perform subsequent secure communications using communication interfaces 2313 and 2315.

In one embodiment, controller 2319 of nearby vehicle 2311 executes software to implement verification component 153. In response to verifying an identity as being that of an emergency vehicle, the controller 2319 can change the configuration and/or operation of various systems of nearby vehicle 2311. For example, an alert can be presented on display 2317 to a driver and/or passenger. In addition, for example, the navigation path and/or speed of the vehicle can be changed. In addition, a system of the vehicle can be activated, such as a brake system to slow the vehicle.

Figure 24:
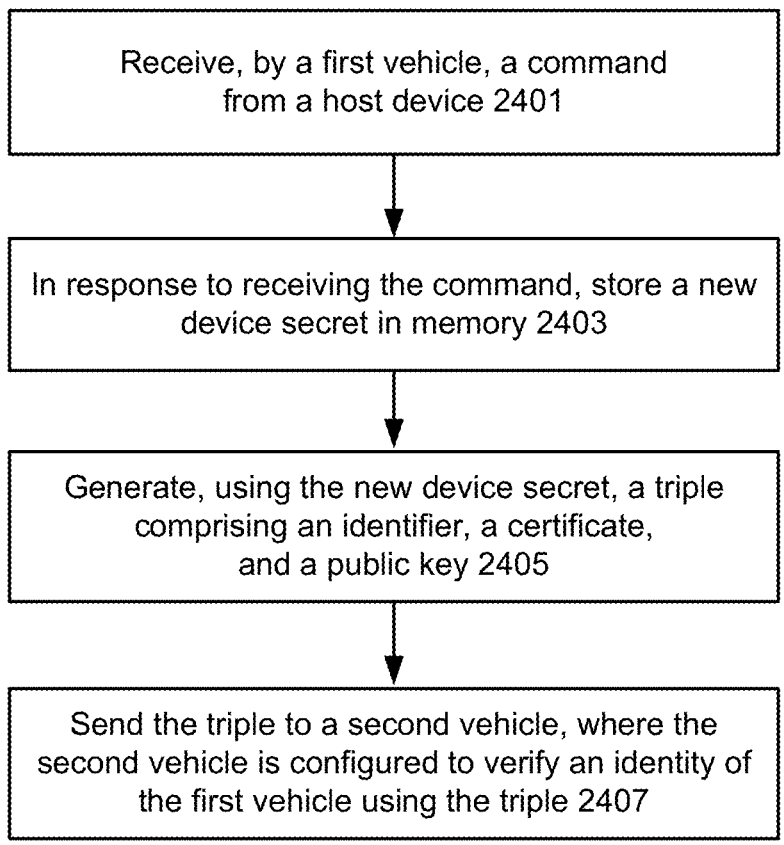
FIG. 24 shows a method for verifying an identity of a vehicle using an identifier, a certificate, and a public key, according to one embodiment.

FIG. 24 shows a method for verifying an identity of a vehicle using an identifier, a certificate, and a public key, according to one embodiment. For example, the method of FIG. 24 can be implemented in the system of FIGS. 1, 2, and 20.

The method of FIG. 24 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 24 is performed at least in part by processor 143 of FIG. 20.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 2401, a command is received by a first vehicle from a host device. For example, an authenticated command is received from authority computing device 2305 by computing device 2301 of emergency vehicle 2303.

At block 2403, in response to receiving the command, a new device secret is stored in memory. For example, the command is a replace command, and the computing device 2301 stores the new device secret (e.g., UDS) in memory. The new device secret replaces a previously-stored device secret. The new device secret can be received along with the command from authority computing device 2305. Alternatively, the new device secret can be generated by computing device 2301, for example, using a PUF.

In one example, authority computing device 2305 is a police vehicle. In response to the existence of an emergency, the police vehicle can promote the status of emergency vehicle 2303 from that of a normal passenger vehicle to a vehicle that is in a state of emergency. This can be an assignment that exists for only a predetermined amount of time, a distance, or until a specified destination is reached by the promoted vehicle.

At block 2405, a triple is generated using the new device secret. The triple comprises an identifier, certificate, and a public key. In one example, computing device 2301 uses identity component 147 to generate the triple, similarly as described for various embodiments above.

At block 2407, the triple is sent to a second vehicle. The second vehicle is configured to verify an identity of the first vehicle using the triple. For example, the triple includes a certificate 2321 and one or more corresponding keys (e.g., public key and public identifier) from key storage 157. Verification component 153 of nearby vehicle 2311 uses the triple to verify the identity of emergency vehicle 2303. In one embodiment, nearby vehicle 2311 is configured to perform an action in response to verifying the identity as being, for example, for a vehicle in an emergency state.

In one embodiment, a method comprises: receiving, by a computing device of a first vehicle (e.g., emergency vehicle 2303), a command from a host device (e.g., authority computing device 2305); in response to receiving the command, storing a new device secret in memory of the computing device; generating, by the computing device using the new device secret, a triple comprising an identifier, a certificate (e.g., certificate 2321), and a public key; and sending, by the computing device, the triple to a second vehicle (e.g., nearby vehicle 2311), wherein the second vehicle is configured to verify an identity of the first vehicle using the triple.

In one embodiment, the new device secret is: received from the host device; or generated by the computing device after receiving the command from the host device.

In one embodiment, the new device secret is associated with a predetermined status or class of the first vehicle. For example, the state is an emergency state.

In one embodiment, the second vehicle is configured to perform an action in response to verifying the identity of the first vehicle.

In one embodiment, the action is at least one of presenting an alert on a user display of the second vehicle, changing a path of navigation or speed of the second vehicle, or activating a brake system of the second vehicle.

In one embodiment, the method further comprises sending, by the computing device, the triple to a traffic control system (e.g., traffic control system 2309), wherein the traffic control system is configured to: verify the identity of the first vehicle using the triple; and in response to verifying the identity of the first vehicle, change a state of the traffic control system to allow passage of the first vehicle.

In one embodiment, the new device secret replaces, in the memory of the computing device, a previously-stored device secret.

In one embodiment, the method further comprises storing a secret key used to communicate with the host device, wherein the secret key is used as an input to a message authentication code to generate the new device secret.

In one embodiment, the command is authenticated using the secret key, and the method further comprises sending, by the computing device to the host device, a confirmation that the new device secret has been stored.

In one embodiment, the method further comprises, after the second vehicle has verified the identity of the first vehicle: encrypting, by the computing device using a private key, a message, wherein the private key and the public key are an associated pair generated using the new device secret; and sending, by the computing device, the encrypted message to the second vehicle, wherein the encrypted message includes a freshness.

In one embodiment, the message includes configuration data, the second vehicle is configured to perform an action in response to receiving the message, and the action is performed by the second vehicle in conformance with the configuration data.

In one embodiment, a system for use in a first vehicle comprises: at least one processor; and memory containing instructions configured to instruct the at least one processor to: receive a command from a host device; in response to receiving the command, store a new device secret; generate, using the new device secret, a certificate; and send the certificate to a second vehicle, wherein the second vehicle is configured to verify an identity of the first vehicle using the certificate.

In one embodiment, the new device secret is: received from the host device; or generated by the system after receiving the command from the host device.

In one embodiment, the system further comprises memory storing a secret key for communications with the host device, wherein the instructions are further configured to instruct the at least one processor to use the secret key as an input to a message authentication code to generate the new device secret.

In one embodiment, the second vehicle is configured to perform an action in response to verifying the identity of the first vehicle, and wherein the action is at least one of presenting an alert on a user display of the second vehicle, changing a path of navigation or speed of the second vehicle, or activating a brake system of the second vehicle.

In one embodiment, the new device secret is associated with a predetermined status or class of the first vehicle.

In one embodiment, a non-transitory computer storage medium stores instructions which, when executed on a computing device of a first vehicle, cause the computing device to at least: receive a command from a host device; in response to receiving the command, store a new device secret in memory; generate, using the new device secret, a triple comprising an identifier, a certificate, and a public key; and send the triple to a second vehicle, wherein the second vehicle is configured to verify the identity of the first vehicle using the triple.

In one embodiment, storing the new device secret in memory comprises replacing a previously-stored device secret with the new device secret, and the instructions further cause the computing device to send the identifier to the host device.

In one embodiment, the identifier is a public identifier, and a first asymmetric generator generates the public identifier and a private identifier as an associated pair; and a second asymmetric generator generates the public key and a private key as an associated pair.

In one embodiment, the triple comprises: receiving a message from the host device; concatenating the message with the public key to provide first data; encrypting the first data using the private identifier to provide second data; and encrypting the second data using the private key to provide the certificate.

In one embodiment, a UDS is assigned to one or more vehicles by a public authority or a private authority (e.g., using authority computing device 2305). Each authority can assign a particular $UDS_{authority}$ (or $UDS_{customer}$).

For example, the authority can connect a configurator (e.g., a laptop with software) to a vehicle bus (e.g., using SOTA, OTA, etc.). By using an authenticated command load, the new device secret (UDS) is stored as $UDS_{authority}$ into a register of a computing device (e.g., computing device 2301). The authentication is based on a secret key injected by the manufacturer and provided to the customer with a secure infrastructure, for example as described above. A freshness mechanism is implemented with a monotonic counter, as described above.

In one example, by using an authenticated replace command the $UDS_{authority}$ replaces the current UDS. However, it is not necessary that the UDS be replaced. The UDS assignment process can be the initial UDS stored in the computing device.

Each authenticated command execution is confirmed with an authenticated response from the computing device. Using the $UDS_{authority}$, the computing device generates a triple comprising a public identifier, a public certificate, and a public key. The computing device also generates a private key and a private identifier, as described above.

In one embodiment, a receiver vehicle (e.g., nearby vehicle 2311) verifies the identity of a vehicle to which an identity is assigned as described above. In one example, the vehicle is an emergency vehicle, and no Internet or wireless connection is needed to perform the verification. The emergency vehicle generates a well-known public triple $\{ID_{L1\ public},\ ID_{L1}\ certificate,\ K_{L1\ public}\}$ and signs all messages with $K_{L1\ private\ key}$. The receiver vehicle verifies the signature with the $K_{L1\ public}$ of the sender vehicle. This provides proof that the message comes from an authorized proper sender vehicle because only that vehicle knows the $K_{L1private\ key}$, which is the companion of $K_{L1\ public}$. The emergency vehicle's certificates can be preinstalled in all such vehicles to ensure the emergency vehicle recognition can be performed in case internet or other communication connection is lost.

In one example, the vehicles are controlled by a public utility service. An internet or other communication connection is used to communicate with the vehicles. If needed, a receiver vehicle can verify the triple $\{ID_{L1\ public},\ ID_{L1\ certificate},\ K_{L1\ public}\}$ in a secure public catalog (e.g., stored on public server 2307). All messages are signed with the $K_{L1private\ key}$, and the receiver vehicle verifies the signature with the $K_{L1\ public}$ of the sender vehicle.

In one example, the vehicles are private vehicles in a fleet controlled by a private company. Each vehicle generates a triple $\{ID_{L1\ public},\ ID_{L1\ certificate},\ K_{L1\ public}\}$ known to all vehicles of the fleet. The vehicles sign all messages with the $K_{L1private\ key}$, and the receiver vehicle verifies the signature with the $K_{L1\ public}$ of the sender vehicle.

In one embodiment, the communications between the vehicles are performed by exchanging packets. Each packet has a freshness field in order to avoid a replay attack. Examples of communication between vehicles include information such as stop, follow the sender vehicle, an accident exists somewhere, data regarding an accident location, a help-needed request, a road status information request, etc.

CLOSING

A non-transitory computer storage medium can be used to store instructions of the firmware 104, or to store instructions for processor 143 or processing device 131. When the instructions are executed by, for example, the controller 107 of the memory device 103 or computing device 603, the instructions cause the controller 107 to perform any of the methods discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully-functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
a first vehicle and a second vehicle, the first vehicle comprising:
a device comprising:
memory configured to store a device secret; and
a microprocessor configured to:
generate, based on the device secret, a first pair of asymmetric cryptographic keys including an identifier, as a public identifier, and a private identifier;
generate a second pair of asymmetric cryptographic keys including a public key and a private key;
generate a certificate using the private identifier, the private key, and the public key; and
transmit a triple, containing the identifier, the public key, and the certificate, to the second vehicle to instruct the second vehicle to perform an action after the second vehicle authenticates the device and verifies an identity of the first vehicle using the triple.

2. The system of claim 1, wherein the device secret is configured to represent a predetermined vehicle class.

3. The system of claim 2, wherein the predetermined vehicle class is emergency vehicles.

4. The system of claim 2, wherein the microprocessor is further configured to:
receive a command from a host system having authority in a traffic control system; and
store, in response to the command, the device secret in the memory.

5. The system of claim 4, wherein the device secret is received from the host system, or generated by the device responsive to the command.

6. The system of claim 5, wherein the microprocessor is further configured to authenticate the command using a secret key stored in the device.

7. The system of claim 2, wherein the device secret stored in the memory of the device is configured to be representative of the device having a classification of emergency vehicles.

8. The system of claim 2, wherein the action includes presenting an alert on a display of the second vehicle, changing a travel path or speed of the second vehicle, or activating a brake system of the second vehicle.

9. The system of claim 2, wherein the microprocessor is further configured to:
transmit the triple, containing the identifier, the public key, and the certificate, to a traffic control system to instruct the traffic control system to, upon authenticating the device using the triple, change a state of the traffic control system.

10. A method, comprising:
receiving, in a vehicle from a device storing a device secret in a further vehicle, a triple containing an identifier, a public key, and a certificate, wherein the device is configured to:
generate, based on the device secret, a first pair of asymmetric cryptographic keys including the identifier, as a public identifier, and a private identifier;
generate a second pair of asymmetric cryptographic keys including the public key and a private key; and
generate the certificate using the private identifier, the private key, and the public key;
authenticating, by the vehicle, the device using the triple; and
performing, by the vehicle, an action instructed by the device after the vehicle authenticates the device and verifies an identity of the further vehicle using the triple.

11. The method of claim 10, wherein the device secret is configured to represent a predetermined vehicle class.

12. The method of claim 11, wherein the predetermined vehicle class is emergency vehicle.

13. The method of claim 11, wherein the device is configured to store the device secret in response to a command from a host system having authority in a traffic control system.

14. The method of claim 13, wherein the device secret is received from the host system, or generated by the device responsive to the command.

15. The method of claim 14, wherein the device is configured to authenticate the command using a secret key stored in the device.

16. The method of claim 11, wherein the action includes presenting an alert on a display of the vehicle, changing a travel path or speed of the vehicle, or activating a brake system of the vehicle.

17. A system comprising a device and a non-transitory computer storage medium storing instructions which, when executed on a traffic control system, cause the traffic control system to perform a method, comprising:
receiving, from the device storing a device secret, a triple containing an identifier, a public key, and a certificate, wherein the device is configured to:
generate, based on the device secret, a first pair of asymmetric cryptographic keys including the identifier, as a public identifier, and a private identifier;
generate a second pair of asymmetric cryptographic keys including the public key and a private key; and
generate the certificate using the private identifier, the private key, and the public key;
authenticating the device using the triple; and
changing a state of the traffic control system based on the authenticating of the device and verifying an identity of a vehicle including the device using the triple.

18. The system of claim 17, wherein the device secret is configured to represent a predetermined vehicle class of emergency vehicles.

19. The system of claim 17, wherein the device is configured to store the device secret in response to a command from a host system having authority in the traffic control system.

20. The system of claim 19, wherein the device is configured to authenticate the command using a secret key stored in the device.

* * * * *